United States Patent
Rosenberg et al.

(10) Patent No.: US 9,582,077 B2
(45) Date of Patent: Feb. 28, 2017

(54) PROVIDING FORCE FEEDBACK TO A USER OF AN INTERFACE DEVICE BASED ON INTERACTIONS OF A USER-CONTROLLED COMPLAINT PADDLE WITH A SIMULATED OBJECT IN A GRAPHICAL ENVIRONMENT

(75) Inventors: Louis B. Rosenberg, Pleasanton, CA (US); Scott B. Brave, Cambridge, MA (US)

(73) Assignee: Immersion Corporation, San Jose, CA (US)

(*) Notice: Subject to any disclaimer, the term of this patent is extended or adjusted under 35 U.S.C. 154(b) by 1211 days.

(21) Appl. No.: 11/703,322

(22) Filed: Feb. 6, 2007

(65) Prior Publication Data

US 2007/0139375 A1 Jun. 21, 2007

Related U.S. Application Data

(63) Continuation of application No. 09/756,617, filed on Jan. 3, 2001, now Pat. No. 7,199,790, which is a
(Continued)

(51) Int. Cl.
*G06F 3/01* (2006.01)
*A63F 13/285* (2014.01)
(Continued)

(52) U.S. Cl.
CPC .............. *G06F 3/016* (2013.01); *A63F 13/06* (2013.01); *A63F 13/285* (2014.09); *G05G 9/047* (2013.01);
(Continued)

(58) Field of Classification Search
CPC ............ G06F 3/016; G06F 3/033; B25J 13/02
(Continued)

(56) References Cited

U.S. PATENT DOCUMENTS 4,359,223 A * 11/1982 Baer et al. .......................... 463/2
4,524,348 A * 6/1985 Lefkowitz .......................... 341/5
(Continued)

OTHER PUBLICATIONS

Iwata, Hiroo, "Artificial Reality With Force-Feedback: Development of Desktop Virtual Space With Compact Master Manipulator," Computer Graphics, vol. 24, No. 4, Aug. 1990, pp. 165-170.
(Continued)

*Primary Examiner* — Jonathan Horner
(74) *Attorney, Agent, or Firm* — Kilpatrick Townsend & Stockton LLP

(57) ABSTRACT

A method and apparatus for providing force feedback to a user operating a human/computer interface device in conjunction with a graphical user interface (GUI) displayed by a host computer system. A physical object, such as a joystick or a mouse, controls a graphical object, such as a cursor, within the GUI. The GUI allows the user to interface with operating system functions implemented by the computer system. A signal is output from the host computer to the interface device to apply a force sensation to the physical object using one or more actuators. This desired force sensation is associated with at least one of the graphical objects and operating system functions of the graphical user interface and is determined by a location of the cursor in the GUI with respect to targets that are associated with the graphical objects. The graphical objects include icons, windows, pull-down menus and menu items, scroll bars ("sliders"), and buttons. The force sensation assists the user to select a desired operating system function or physically informs the user of the graphical objects encountered by the cursor within the GUI. A microprocessor local to the interface apparatus and separate from the host computer can be used to control forces on the physical object.

18 Claims, 27 Drawing Sheets

Related U.S. Application Data continuation of application No. 08/571,606, filed on Dec. 13, 1995, now Pat. No. 6,219,032, which is a continuation-in-part of application No. 08/566,282, filed on Dec. 1, 1995, now Pat. No. 5,734,373.

(51) Int. Cl.
| | |
|---|---|
| *G06F 3/038* | (2013.01) |
| *A63F 13/20* | (2014.01) |
| *G05G 9/047* | (2006.01) |
| *G06F 3/0481* | (2013.01) |
| *H01H 3/00* | (2006.01) |
| *H04L 29/06* | (2006.01) |

(52) U.S. Cl.
CPC ............ *G06F 3/038* (2013.01); *G06F 3/0383* (2013.01); *G06F 3/04812* (2013.01); *A63F 2300/1025* (2013.01); *A63F 2300/1037* (2013.01); *G05G 2009/04766* (2013.01); *G05G 2009/04777* (2013.01); *G06F 2203/014* (2013.01); *G06F 2203/015* (2013.01); *H01H 2003/008* (2013.01); *H04L 67/38* (2013.01)

(58) Field of Classification Search
USPC .......................................... 345/156–161, 184
See application file for complete search history.

(56) References Cited

U.S. PATENT DOCUMENTS

| | | | | |
|---|---|---|---|---|
| 4,709,917 | A | * | 12/1987 | Yang ................................ 482/63 |
| 5,044,639 | A | * | 9/1991 | Egging et al. ................ 273/342 |
| 5,396,266 | A | * | 3/1995 | Brimhall ....................... 345/161 |
| 5,451,924 | A | | 9/1995 | Massimino et al. |
| 5,471,571 | A | | 11/1995 | Smith et al. |
| 5,519,618 | A | | 5/1996 | Kastner et al. |
| 5,555,894 | A | | 9/1996 | Doyama et al. |
| 5,570,111 | A | | 10/1996 | Barrett et al. |
| 5,625,576 | A | * | 4/1997 | Massie et al. .................... 703/6 |
| 5,629,594 | A | | 5/1997 | Jacobus et al. |
| 5,691,898 | A | | 11/1997 | Rosenberg et al. |
| 5,757,358 | A | | 5/1998 | Osga |
| 5,767,839 | A | | 6/1998 | Rosenberg |
| 5,808,601 | A | | 9/1998 | Leah et al. |
| 5,844,392 | A | | 12/1998 | Peurach et al. |
| 5,990,860 | A | | 11/1999 | Takeuchi |
| 5,999,185 | A | | 12/1999 | Kato et al. |
| 6,162,123 | A | | 12/2000 | Woolston |
| 6,219,032 | B1 | | 4/2001 | Rosenberg et al. |
| 7,061,467 | B2 | | 6/2006 | Rosenberg |

OTHER PUBLICATIONS

Minsky, Margaret et al., "Feeling and Seeing: Issues in Force Display," Dept. of Computer Science, 1990, pp. 235-242, 270.

Stanley, Michael C. et al., "Computer Simulation of Interacting Dynamic Mechanical Systems Using Distributed Memory Parallel Processors," DSC-vol. 42, Advances in Robotics, ASME 1992, pp. 55-61.

Su, S. Augustine et al., "The Virtual Panel Architecture: A 3D Gesture Framework," Computer Science Department, 1993, pp. 387-393.

* cited by examiner

RATE CONTROL COMMANDS

| FORCE ⟵302 | EXAMPLE OF COMMAND AND PARAMETERS ⟵304 | SUBCLASS ⟵310 |
|---|---|---|
| RESTORING | R_FORCE (MAGNITUDE, DURATION, STYLE, DEADBAND) ⟵308 | CONDITION |
| RESTORING SPRING | R_SPRING (COEFFICIENT, DURATION, STYLE, DEADBAND) | CONDITION |
| SLUGGISH STICK | SLUG (COEFFICIENT, DURATION, STYLE) | CONDITION |
| UNSTABLE | UNSTABLE (MAGNITUDE, DURATION, STYLE) | CONDITION |
| VECTOR | V_FORCE (MAGNITUDE, DURATION, DIRECTION) | OVERLAY |
| VIBRATION | V_VIBRATE (MAGNITUDE, DURATION, DIRECTION, FREQUENCY, STYLE) | OVERLAY |
| WOBBLE | WOBBLE (MAGNITUDE, DURATION, STYLE) | OVERLAY |
| BUTTON | B_FORCE (MAGNITUDE, DURATION, DIRECTION, BUTTON, AUTOFIRE) | OVERLAY/ CONDITION |
| JOLT | JOLT (MAGNITUDE, DURATION, DIRECTION) | OVERLAY |

*Figure 9*

POSITION CONTROL COMMANDS

| FORCE | EXAMPLE OF COMMAND AND PARAMETERS |
|---|---|
| VECTOR | P_FORCE (MAGNITUDE, DIRECTION) |
| GROOVE | GROOVE (MAGNITUDE, STYLE, SNAP-DISTANCE) |
| DIVOT | DIVOT (MAGNITUDE, STYLE, SNAP-DISTANCE) |
| TEXTURE | TEXTURE (MAGNITUDE, DENSITY, STYLE) |
| BARRIER | X_BARRIER (MAGNITUDE, LOCATION, SNAP-DISTANCE) |
| FIELD | FIELD (MAGNITUDE, ORIGIN, SENSE) |
| PADDLE | PADDLE (MASS, GRAVITY, COMPLIANCE, SENSE) |
| BUTTON | BUTTON (MAGNITUDE, DIRECTION, BUTTON, AUTOFIRE) |

*Figure 14*

PROVIDING FORCE FEEDBACK TO A USER OF AN INTERFACE DEVICE BASED ON INTERACTIONS OF A USER-CONTROLLED COMPLAINT PADDLE WITH A SIMULATED OBJECT IN A GRAPHICAL ENVIRONMENT

CROSS-REFERENCE TO RELATED APPLICATIONS

This application is a continuation of U.S. application Ser. No. 09/756,617, entitled "Providing Force Feedback to a User of an Interface Device Based on Interactions of a User-Controlled Cursor in a Graphical User Interface," filed Jan. 3, 2001, which is a continuation of U.S. application Ser. No. 08/571,606, entitled "Method for Providing Force Feedback to a User of an Interface Device Based on Interactions of a Controlled Cursor with Graphical Elements in a Graphical User Interface", filed Dec. 13, 1995, which issued as U.S. Pat. No. 6,219,032 on Apr. 17, 2001, which is a continuation-in-part of U.S. application Ser. No. 08/566,282, entitled "Method and Apparatus for Controlling Force Feedback Interface Systems Utilizing a Host Computer", filed Dec. 1, 1995, which issued as U.S. Pat. No. 5,734,373 on Mar. 31, 1998.

BACKGROUND OF THE INVENTION

The present invention relates generally to interface devices for allowing humans to interface with computer systems, and more particularly to computer systems and computer interface devices that provide force feedback to the user.

Computer systems are used extensively in many different industries to implement many applications, such as word processing, data management, simulations, games, and other tasks. These types of applications are very popular with the mass market of home consumers. A computer system typically displays a visual environment to a user on a display screen or other visual output device. Users can interact with the displayed environment to perform functions on the computer, play a game, experience a simulation or "virtual reality" environment, use a computer aided design (CAD) system, or otherwise influence events or images depicted on the screen. Such user interaction can be implemented through the use of a human-computer interface device, such as a joystick, mouse, trackball, stylus and tablet, "joypad" button controller, foot pedal, yoke hand grip, or the like, that is connected to the computer system controlling the displayed environment. The computer updates the environment in response to the user's manipulation of an object such as a joystick handle or mouse, and provides feedback to the user utilizing the display screen and, typically, audio speakers.

One visual environment that is particularly common is a graphical user interface (GUI). Information within GUI's are presented to users through purely visual and auditory means such as a video monitor and sound card to present images and sound effects which describe various graphical metaphors of the operating system. Common GUI's include the Windows® operating system from Microsoft Corporation and the System 7 operating system from Apple Computer, Inc. These interfaces allows a user to graphically select and manipulate functions of the operating system of the computer by using a mouse, trackball, joystick, or other input device. Other graphical computer environments are similar to GUI's. For example, graphical "pages" on the World Wide Web of the Internet communication network utilize features similar to that of GUI's to select and operate particular functions. Some CAD systems similarly provide graphical presentations. In addition, there has been some contemplation of three dimensional (3-D) GUI's that present simulated 3-D environments on a 2-D screen.

GUI's typically require users to carefully move and position a user-controlled graphical object, such as a cursor or pointer, across the screen and onto other displayed graphical objects or predefined regions on a computer screen. Such manual tasks can be described as "targeting" activities where a user physically manipulates a mouse, joystick, or other interface device in order to command the cursor to a desired location or displayed object, known as a "target" herein. Such targets can include, for example, icons for executing application programs and manipulating files; windows for displaying icons and other information; pull-down menus for selecting particular functions of the operating system or an application program; buttons for selecting presented options; and scroll bars or "sliders" for scrolling information in windows.

Upon moving the cursor to the desired target, the user must maintain the cursor at the acquired target while pressing a button, squeezing a trigger, depressing a pedal, or making some other gesture to command the execution of the given selection or operation. Examples of targeting tasks include positioning a cursor on a graphical icon, selecting and pressing a graphical representation of a button, choosing among numerous items within a graphical representation of a pull-down menu, setting a continuous analog value from a provided range of values by positioning an indicator within a graphical representation of a scroll bar, selecting a region of text by highlighting a region using the cursor, as well as a number of other common windows-based and text-based metaphors.

The movement of a cursor onto various displayed graphical objects of a GUI may require significant dexterity. Users may move the cursor too far over an object and have to backtrack their cursor. Or, particular graphical objects might be mistakenly selected when the user does not wish to select the object due to pressing a button or moving the cursor by accident. In addition, a user may become confused as to which window a cursor is positioned in if the user is viewing other data on the screen at the same time as moving the cursor.

In particular, persons with neuromotor disabilities who suffer from spastic manual control have much greater difficulty interacting with GUI's because they lack the fine motor coordination required to manually position the computer cursor accurately and efficiently. While manual targeting activities are adequately executed by persons with normal neuromotor functionality, persons with spastic hand motions find such tasks to be physically challenging if not impossible.

What is needed is a computer system and interface device that will allow all users to more accurately and efficiently perform cursor movement activities and manipulate operating system and other functions within a GUI.

SUMMARY OF THE INVENTION

The present invention is directed to controlling and providing force feedback to a user operating a human/computer interface device in conjunction with a graphical user interface (GUI) displayed by a host computer system. Force sensations are provided to the interface device to assist and/or inform the user of graphical objects encountered by a user-controlled cursor in the GUI.

More specifically, a method of the present invention for providing force feedback within a graphical user interface (GUI) environment of a computer system includes a step of receiving an indication of movement of a physical object that is manipulated by a user. This physical object, such as a joystick handle or a mouse, is included in an interface device that outputs the indication of movement to the computer system. A user-controlled graphical object, such as a cursor, is moved within a graphical user interface (GUI) based on the indication of the movement of the physical object. Preferably, a position control paradigm is implemented such that the location of the cursor in the GUI approximately corresponds to a location of the physical object with reference to an origin; alternatively, a rate control paradigm may be used. The cursor and the GUI are displayed on a display screen connected to the computer system, and the GUI allows the user to interface with operating system functions implemented by the computer system through graphical objects displayed on the screen. A signal is output from the computer system to the interface device to command the interface device to apply a desired force sensation to the physical object using one or more electrically controlled actuators. This desired force sensation is associated with at least one of the graphical objects and operating system functions of the graphical user interface.

Preferably, the force sensation applied to the physical object is at least partially determined by a location of the cursor in the GUI with respect to targets associated with the graphical objects in the GUI. These targets may include or be associated with such graphical objects as icons, windows, pull-down menus and menu items, scroll bars ("sliders"), and buttons. The force sensation output to the physical object is associated with targets that affect the cursor. This force preferably assists the user to select the desired operating system function that is associated with the force. For example, a target can provide an attractive force on the physical object and cursor so that the cursor is more easily moved onto the target. In addition, the force on the physical object may inform the user of the graphical object that the cursor has moved into or near. An operating system function may be performed as indicated by the location of the cursor and as indicated by a command from the user, such as a physical (or simulated) button press. Velocity or acceleration of the cursor may also affect the applied force.

Each of the targets is preferably associated with at least two different target force sensations that may affect the physical object and the cursor depending on the location of the cursor with respect to each target. The two different target force sensations include an internal target force sensation and an external target force sensation. The internal target force is applied to the physical object when the cursor is located within or moving in or out of the target. The external target force is applied to the physical object when the cursor is located outside the target. The targets are also preferably ordered in a hierarchy, and a target's level in the hierarchy determines if the target will provide forces on the physical object.

The magnitude, direction, duration, and other parameters of the internal and external forces of a target can depend on the type of the target. For example, the external force sensation of icons is an attractive force between the icon and the cursor, which is applied to the physical object when the cursor is within a predetermined distance of the icon. An internal capture force of an icon is preferably an attractive force when the cursor is moved into the icon, and a barrier force when the cursor is moved out of the icon. An internal dead region force is preferably zero near the center area of the icon so the cursor can be moved freely when inside the icon. Other graphical objects can be assigned forces in desired ranges within and external to the graphical objects. A damping force can be used as a dead region force for other graphical objects to provide resistance to the motion of the physical object. In addition, an inertia force can be applied to the physical object when a target is moved by the cursor in the GUI. The target can have a simulated mass that allows a resistive force to be applied to the physical object based on the mass, velocity, or other factors.

A system of the present invention for providing force feedback to a user manipulating an interface apparatus includes a host computer system. The host receives an input signal from the interface apparatus describing the location, velocity and/or acceleration of the physical object in a degree of freedom. The host provides a host output signal and updates the location of the cursor within the GUI displayed on the display screen based on the input signal. A microprocessor local to the interface apparatus and separate from the host receives the host output signal and provides a processor output signal. An actuator receives the processor output signal and provides a force along a degree of freedom to the physical object in accordance with the processor signal. A sensor detects motion of the physical object along the degree of freedom and outputs the input signal including information representative of the motion of the physical object. Preferably, the sensor outputs the input signal to the local microprocessor, which outputs the input signal to the host. The physical object can preferably be moved in one or more degrees of freedom using, for example, a gimbal or slotted yoke mechanism, where an actuator and sensor can be provided for each degree of freedom. A standard serial interface included on many computers, such as the Universal Serial Bus, can be used to interface the host computer system with the local microprocessor. A clock is preferably coupled to the host computer system and/or the local processor which can be accessed for timing data to help determine the force output by the actuator.

The host computer can receive the sensor information in a supervisory mode and output a high level host command to the microprocessor whenever a force sensation felt by the user is to be updated or changed. In accordance with the host command, the microprocessor reads sensor and timing data and outputs force values to the actuator according to a reflex process that is selected. The reflex process can include using force equations, reading force profiles of predetermined force values from a storage device, or other steps, and may be dependent on sensor data, timing data, host command data, or other data. Alternatively, the host can directly control the actuators of the interface device.

In another method of the present invention for providing force feedback for graphical objects in a game implemented on a computer system, a user-controlled first graphical object or "paddle" is displayed on a display screen of the computer system. The paddle moves on the display screen during a game in response to manipulations of a physical object of an interface device by a user. A second graphical object or "ball" is also displayed and moved on the display screen. When the paddle collides with the ball, a compression of the paddle is displayed at the location where the ball contacts the paddle. The paddle and ball each have a predetermined simulated mass and/or simulated compliance. A force command is also output to the interface device to apply a force to the physical object in at least one degree of freedom. The force is applied in the direction of the compression and has a magnitude in accordance with the simulated masses, compliances, and velocities of the graphical objects. In addition, factors such as gravity can affect the movement of the graphical objects on the screen and the forces applied to the physical object.

The method and apparatus of the present invention advantageously provides force feedback to a user in conjunction with movement of a cursor in a GUI. This allows the movement of the cursor to be affected by forces output on the physical object manipulated by the user. Thus, the forces can assist in manipulating operating system functions of the GUI and/or inform the user of the GUI spatial "landscape" of graphical objects, providing a more efficient GUI. Also, physically handicapped users have a far easier time moving a cursor to various graphical objects and regions of a GUI when the forces of the present invention are provided. In addition, a separate microprocessor local to the interface device can read and process sensor signals as well as output force command signals independently of the host computer, thus saving significant processing time on the host computer and providing more accurate force feedback when using a serial or other relatively low-bandwidth communication interface between the host and the interface device.

These and other advantages of the present invention will become apparent to those skilled in the art upon a reading of the following specification of the invention and a study of the several figures of the drawing.

BRIEF DESCRIPTION OF THE DRAWINGS

FIG. 9 is a table summarizing rate control commands of the present invention;

FIG. 14 is a table summarizing position control commands of the present invention;

DETAILED DESCRIPTION OF PREFERRED EMBODIMENTS

Figure 1:
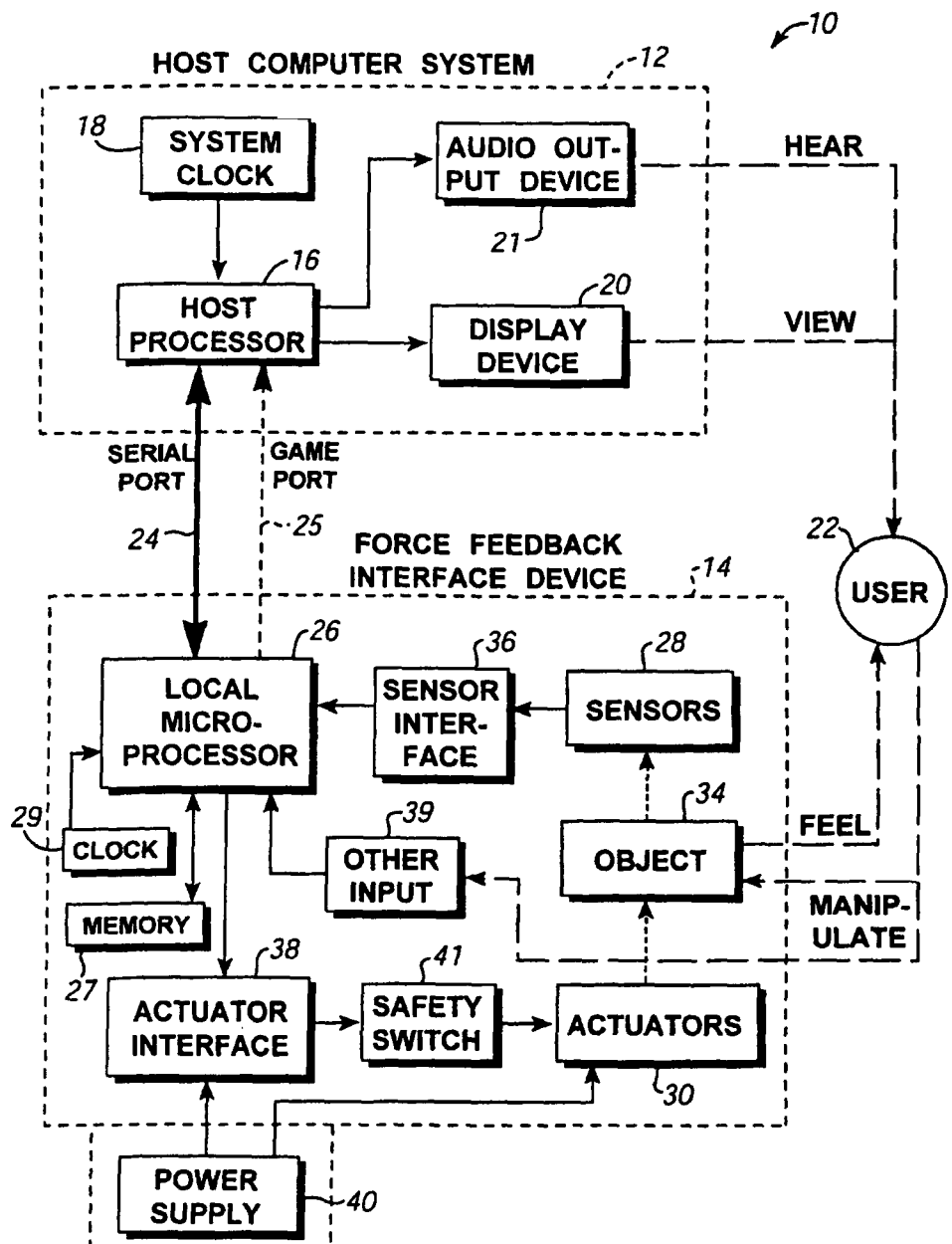
FIG. 1 is a block diagram of a control system in accordance with the present invention for controlling a force feedback interface device from a host computer.

FIG. 1 is a block diagram illustrating a generic control system 10 of the present invention for an interface device controlled by a host computer system. Control system 10 includes a host computer system 12 and an interface device 14.

Host computer system 12 is preferably a personal computer, such as an IBM-compatible or Macintosh personal computer, or a workstation, such as a SUN or Silicon Graphics workstation. For example, the host computer system can a personal computer which operates under the MS-DOS or Windows operating systems in conformance with an IBM PC AT standard. Alternatively, host computer system 12 can be one of a variety of home video game systems commonly connected to a television set, such as systems available from Nintendo, Sega, or Sony. In other embodiments, home computer system 12 can be a "set top box" which can be used, for example, to provide interactive television functions to users.

In the described embodiment, host computer system 12 implements a host application program with which a user 22 is interacting via peripherals and interface device 14. For example, the host application program can be a video game, medical simulation, scientific analysis program, or even an operating system or other application program that utilizes force feedback. Typically, the host application provides images to be displayed on a display output device, as described below, and/or other feedback, such as auditory signals.

Host computer system 12 preferably includes a host microprocessor 16, random access memory (RAM) 17, read-only memory (ROM) 19, input/output (I/O) electronics 21, a clock 18, a display screen 20, and an audio output device 21. Host microprocessor 16 can include a variety of available microprocessors from Intel, Motorola, or other manufacturers. Microprocessor 16 can be single microprocessor chip, or can include multiple primary and/or co-processors. Microprocessor preferably retrieves and stores instructions and other necessary data from RAM 17 and ROM 19, as is well known to those skilled in the art. In the described embodiment, host computer system 12 can receive sensor data or a sensor signal via a bus 24 from sensors of interface device 14 and other information. Microprocessor 16 can receive data from bus 24 using I/O electronics 21, and can use I/O electronics to control other peripheral devices. Host computer system 12 can also output a "force command" to interface device 14 via bus 24 to cause force feedback for the interface device.

Clock 18 is a standard clock crystal or equivalent component used by host computer system 12 to provide timing to electrical signals used by microprocessor 16 and other components of the computer system. Clock 18 is accessed by host computer system 12 in the control process of the present invention, as described subsequently.

Display screen 20 is coupled to host microprocessor 16 by suitable display drivers and can be used to display images generated by host computer system 12 or other computer systems. Display screen 20 can be a standard display screen or CRT, 3-D goggles, or any other visual interface. In a described embodiment, display screen 20 displays images of a simulation or game environment. In other embodiments, other images can be displayed. For example, images describing a point of view from a first-person perspective can be displayed, as in a virtual reality simulation or game. Or, images describing a third-person perspective of objects, backgrounds, etc. can be displayed. A user 22 of the host computer 12 and interface device 14 can receive visual feedback by viewing display screen 20.

Herein, computer 12 may be referred as displaying computer "objects" or "entities". These computer objects are not physical objects, but is a logical software unit collections of data and/or procedures that may be displayed as images by computer 12 on display screen 20, as is well known to those skilled in the art. For example, a cursor or a third-person view of a car might be considered player-controlled computer objects that can be moved across the screen. A displayed, simulated cockpit of an aircraft might also be considered an "object", or the simulated aircraft can be considered a computer controlled "entity".

Audio output device 21, such as speakers, is preferably coupled to host microprocessor 16 via amplifiers, filters, and other circuitry well known to those skilled in the art. Host processor 16 outputs signals to speakers 21 to provide sound output to user 22 when an "audio event" occurs during the implementation of the host application program. Other types of peripherals can also be coupled to host processor 16, such as storage devices (hard disk drive, CD ROM drive, floppy disk drive, etc.), printers, and other input and output devices.

An interface device 14 is coupled to host computer system 12 by a bi-directional bus 24. The bi-directional bus sends signals in either direction between host computer system 12 and the interface device. Herein, the term "bus" is intended to generically refer to an interface such as between host computer 12 and microprocessor 26 which typically includes one or more connecting wires or other connections and that can be implemented in a variety of ways, as described below. In the preferred embodiment, bus 24 is a serial interface bus providing data according to a serial communication protocol. An interface port of host computer system 12, such as an RS232 serial interface port, connects bus 24 to host computer system 12. Other standard serial communication protocols can also be used in the serial interface and bus 24, such as RS-422, Universal Serial Bus (USB), MIDI, or other protocols well known to those skilled in the art.

For example, the USB standard provides a relatively high speed serial interface that can provide force feedback signals in the present invention with a high degree of realism. USB can also source more power to drive peripheral devices. Since each device that accesses the USB is assigned a unique USB address by the host computer, this allows multiple devices to share the same bus. In addition, the USB standard includes timing data that is encoded along with differential data. The USB has several useful features for the present invention, as described throughout this specification.

An advantage of the present invention is that low-bandwidth serial communication signals can be used to interface with interface device 14, thus allowing a standard built-in serial interface of many computers to be used directly. Alternatively, a parallel port of host computer system 12 can be coupled to a parallel bus 24 and communicate with interface device using a parallel protocol, such as SCSI or PC Parallel Printer Bus. In a different embodiment, bus 24 can be connected directly to a data bus of host computer system 12 using, for example, a plug-in card and slot or other access of computer system 12. For example, on an IBM AT compatible computer, the interface card can be implemented as an ISA, EISA, VESA local bus, PCI, or other well-known standard interface card which plugs into the motherboard of the computer and provides input and output ports connected to the main data bus of the computer.

In another embodiment, an additional bus 25 can be included to communicate between host computer system 12 and interface device 14. Since the speed requirement for communication signals is relatively high for outputting force feedback signals, the single serial interface used with bus 24 may not provide signals to and from the interface device at a high enough rate to achieve realistic force feedback. In such an embodiment, bus 24 can be coupled to the standard serial port of host computer 12, while an additional bus 25 can be coupled to a second port of the host computer system. For example, many computer systems include a "game port" in addition to a serial RS-232 port to connect a joystick or similar game controller to the computer. The two buses 24 and 25 can be used simultaneously to provide a increased data bandwidth. For example, microprocessor 26 can send sensor signals to host computer 12 via a uni-directional bus 25 and a game port, while host computer 12 can output force feedback signals from a serial port to microprocessor 26 via a uni-directional bus 24. Other combinations of data flow configurations can be implemented in other embodiments.

Interface device 14 includes a local microprocessor 26, sensors 28, actuators 30, a user object 34, optional sensor interface 36, an optional actuator interface 38, and other optional input devices 39. Interface device 14 may also include additional electronic components for communicating via standard protocols on bus 24. In the preferred embodiment, multiple interface devices 14 can be coupled to a single host computer system 12 through bus 24 (or multiple buses 24) so that multiple users can simultaneously interface with the host application program (in a multi-player game or simulation, for example). In addition, multiple players can interact in the host application program with multiple interface devices 14 using networked host computers 12, as is well known to those skilled in the art.

Local microprocessor 26 is coupled to bus 24 and is preferably included within the housing of interface device 14 to allow quick communication with other components of the interface device. Processor 26 is considered "local" to interface device 14, where "local" herein refers to processor 26 being a separate microprocessor from any processors in host computer system 12. "Local" also preferably refers to processor 26 being dedicated to force feedback and sensor I/O of interface device 14, and being closely coupled to sensors 28 and actuators 30, such as within the housing for interface device or in a housing coupled closely to interface device 14. Microprocessor 26 can be provided with software instructions to wait for commands or requests from computer host 16, decode the command or request, and handle/control input and output signals according to the command or request. In addition, processor 26 preferably operates independently of host computer 16 by reading sensor signals and calculating appropriate forces from those sensor signals, time signals, and a reflex process (also referred to as a "subroutine" or "force sensation process" herein) selected in accordance with a host command. Suitable microprocessors for use as local microprocessor 26 include the MC68HC711E9 by Motorola and the PIC16C74 by Microchip, for example. Microprocessor 26 can include one microprocessor chip, or multiple processors and/or co-processor chips. In other embodiments, microprocessor 26 can includes a digital signal processor (DSP) chip. Local memory 27, such as RAM and/or ROM, is preferably coupled to microprocessor 26 in interface device 14 to store instructions for microprocessor 26 and store temporary and other data. Microprocessor 26 can receive signals from sensors 28 and provide signals to actuators 30 of the interface device 14 in accordance with instructions provided by host computer 12 over bus 24.

In addition, a local clock 29 can be coupled to the microprocessor 26 to provide timing data, similar to system clock 18 of host computer 12; the timing data might be required, for example, to compute forces output by actuators 30 (e.g., forces dependent on calculated velocities or other time dependent factors). In alternate embodiments using the USB communication interface, timing data for microprocessor 26 can be retrieved from USB signal. The USB has a clock signal encoded with the data stream which can be used. Alternatively, the Isochronous (stream) mode of USB can be used to derive timing information from the standard data transfer rate. The USB also has a Sample Clock, Bus Clock, and Service Clock that also may be used.

For example, in one embodiment, host computer 12 can provide low-level force commands over bus 24, which microprocessor 26 directly provides to actuators 30. This embodiment is described in greater detail with respect to FIG. 4. In a different embodiment, host computer system 12 can provide high level supervisory commands to microprocessor 26 over bus 24, and microprocessor 26 manages low level force control ("reflex") loops to sensors 28 and actuators 30 in accordance with the high level commands. This embodiment is described in greater detail with respect to FIG. 5.

Microprocessor 26 preferably also has access to an electrically erasable programmable ROM (EEPROM) or other memory storage device 27 for storing calibration parameters. The calibration parameters can compensate for slight manufacturing variations in different physical properties of the components of different interface devices made from the same manufacturing process, such as physical dimensions. The calibration parameters can be determined and stored by the manufacturer before the interface device 14 is sold, or optionally, the parameters can be determined by a user of the interface device. The calibration parameters are used by processor 26 to modify the input sensor signals and/or output force values to actuators 30 to provide approximately the same range of forces on object 34 in a large number of manufactured interface devices 14. The implementation of calibration parameters is well-known to those skilled in the art.

Microprocessor 26 can also receive commands from any other input devices included on interface apparatus 14 and provides appropriate signals to host computer 12 to indicate that the input information has been received and any information included in the input information. For example, buttons, switches, dials, or other input controls on interface device 14 or user object 34 can provide signals to microprocessor 26.

In the preferred embodiment, sensors 28, actuators 30, and microprocessor 26, and other related electronic components are included in a housing for interface device 14, to which user object 34 is directly or indirectly coupled. Alternatively, microprocessor 26 and/or other electronic components of interface device 14 can be provided in a separate housing from user object 34, sensors 28, and actuators 30. Also, additional mechanical structures may be included in interface device 14 to provide object 34 with desired degrees of freedom. Some embodiments of such mechanisms are described with reference to FIGS. 7-12.

Sensors 28 sense the position, motion, and/or other characteristics of a user object 34 of the interface device 14 along one or more degrees of freedom and provide signals to microprocessor 26 including information representative of those characteristics. Examples of embodiments of user objects and movement within provided degrees of freedom are described subsequently with respect to FIGS. 7 and 8. Typically, a sensor 28 is provided for each degree of freedom along which object 34 can be moved. Alternatively, a single compound sensor can be used to sense position or movement in multiple degrees of freedom. An example of sensors suitable for several embodiments described herein are digital optical encoders, which sense the change in position of an object about a rotational axis and provide digital signals indicative of the change in position. The encoder, for example, responds to a shaft's rotation by producing two phase-related signals in the rotary degree of freedom. Linear optical encoders similarly sense the change in position of object 34 along a linear degree of freedom, and can produces the two phase-related signals in response to movement of a linear shaft in the linear degree of freedom. Either relative or absolute sensors can be used. For example, relative sensors only provide relative angle information, and thus usually require some form of calibration step which provide a reference position for the relative angle information. The sensors described herein are primarily relative sensors. In consequence, there is an implied calibration step after system power-up wherein a sensor's shaft is placed in a known position within interface device and a calibration signal is provided to the system to provide the reference position mentioned above. All angles provided by the sensors are thereafter relative to that reference position. Alternatively, a known index pulse can be provided in the relative sensor which can provide a reference position. Such calibration methods are well known to those skilled in the art and, therefore, will not be discussed in any great detail herein. A suitable optical encoder is the "Softpot" from U.S. Digital of Vancouver, Wash.

Sensors 28 provide an electrical signal to an optional sensor interface 36, which can be used to convert sensor signals to signals that can be interpreted by the microprocessor 26 and/or host computer system 12. For example, sensor interface 36 receives the two phase-related signals from a sensor 28 and converts the two signals into another pair of clock signals, which drive a bi-directional binary counter. The output of the binary counter is received by microprocessor 26 as a binary number representing the angular position of the encoded shaft. Such circuits, or equivalent circuits, are well known to those skilled in the art; for example, the Quadrature Chip LS7166 from Hewlett Packard, California performs the functions described above. Each sensor 28 can be provided with its own sensor interface, or one sensor interface may handle data from multiple sensors. For example, the electronic interface described in parent U.S. Pat. No. 5,576,727 describes a sensor interface including a separate processing chip dedicated to each sensor that provides input data. Alternately, microprocessor 26 can perform these interface functions without the need for a separate sensor interface 36. The position value signals can be used by microprocessor 26 and are also sent to host computer system 12 which updates the host application program and sends force control signals as appropriate. For example, if the user moves a steering wheel object 34, the computer system 12 receives position and/or other signals indicating this movement and can move a displayed point of view of the user as if looking out a vehicle and turning the vehicle. Other interface mechanisms can also be used to provide an appropriate signal to host computer system 12. In alternate embodiments, sensor signals from sensors 28 can be provided directly to host computer system 12, bypassing microprocessor 26. Also, sensor interface 36 can be included within host computer system 12, such as on an interface board or card.

Alternatively, an analog sensor can be used instead of digital sensor for all or some of the sensors 28. For example, a strain gauge can be connected to measure forces on object 34 rather than positions of the object. Also, velocity sensors and/or accelerometers can be used to directly measure velocities and accelerations on object 34. Analog sensors can provide an analog signal representative of the position/velocity/acceleration of the user object in a particular degree of freedom. An analog to digital converter (ADC) can convert the analog signal to a digital signal that is received and interpreted by microprocessor 26 and/or host computer system 12, as is well known to those skilled in the art. The resolution of the detected motion of object 34 would be limited by the resolution of the ADC. However, noise can sometimes mask small movements of object 34 from an analog sensor, which can potentially mask the play that is important to some embodiments of the present invention (described subsequently).

Other types of interface circuitry 36 can also be used. For example, an electronic interface is described in U.S. Pat. No. 5,576,727, originally filed Jul. 16, 1993, on behalf of Louis B. Rosenberg et al., entitled, "Electromechanical Human-Computer Interface with Force Feedback," assigned to the same assignee as the present application, and which is hereby incorporated by reference herein. The interface allows the position of the mouse or stylus to be tracked and provides force feedback to the stylus using sensors and actuators. Sensor interface 36 can include angle determining chips to pre-process angle signals reads from sensors 28 before sending them to the microprocessor 26. For example, a data bus plus chip-enable lines allow any of the angle determining chips to communicate with the microprocessor. A configuration without angle-determining chips is most applicable in an embodiment having absolute sensors, which have output signals directly indicating the angles without any further processing, thereby requiring less computation for the microprocessor 26 and thus little if any pre-processing. If the sensors 28 are relative sensors, which indicate only the change in an angle and which require further processing for complete determination of the angle, then angle-determining chips are more appropriate.

Actuators 30 transmit forces to user object 34 of the interface device 14 in one or more directions along one or more degrees of freedom in response to signals received from microprocessor 26. Typically, an actuator 30 is provided for each degree of freedom along which forces are desired to be transmitted. Actuators 30 can include two types: active actuators and passive actuators.

Active actuators include linear current control motors, stepper motors, pneumatic/hydraulic active actuators, and other types of actuators that transmit a force to move an object. For example, active actuators can drive a rotational shaft about an axis in a rotary degree of freedom, or drive a linear shaft along a linear degree of freedom. Active transducers of the present invention are preferably bi-directional, meaning they can selectively transmit force along either direction of a degree of freedom. For example, DC servo motors can receive force control signals to control the direction and torque (force output) that is produced on a shaft. The motors may also include brakes which allow the rotation of the shaft to be halted in a short span of time. Other types of active motors can also be used, such as a stepper motor controlled with pulse width modulation of an applied voltage, pneumatic/hydraulic actuators, a torquer (motor with limited angular range), or a voice coil actuator, which are well known to those skilled in the art.

Passive actuators can also be used for actuators 30. Magnetic particle brakes, friction brakes, or pneumatic/hydraulic passive actuators can be used in addition to or instead of a motor to generate a damping resistance or friction in a degree of motion. An alternate preferred embodiment only including passive actuators may not be as realistic as an embodiment including motors; however, the passive actuators are typically safer for a user since the user does not have to fight generated forces. Passive actuators typically can only provide bi-directional resistance to a degree of motion. A suitable magnetic particle brake for interface device 14 is available from Force Limited, Inc. of Santa Monica, Calif.

In alternate embodiments, all or some of sensors 28 and actuators 30 can be included together as a sensor/actuator pair transducer. A suitable transducer for the present invention including both an optical encoder and current controlled motor is a 20 W basket wound servo motor manufactured by Maxon.

Actuator interface 38 can be optionally connected between actuators 30 and microprocessor 26. Interface 38 converts signals from microprocessor 26 into signals appropriate to drive actuators 30. Interface 38 can include power amplifiers, switches, digital to analog controllers (DACs), and other components. An example of an actuator interface for active actuators is described with reference to FIG. 2. An example of an actuator interface for passive actuators is described with reference to FIG. 3. In alternate embodiments, interface 38 circuitry can be provided within microprocessor 26 or in actuators 30.

Other input devices 39 can optionally be included in interface device 14 and send input signals to microprocessor 26. Such input devices can include buttons, dials, switches, or other mechanisms. For example, in embodiments where user object 34 is a joystick, other input devices can include one or more buttons provided, for example, on the joystick handle or base and used to supplement the input from the user to a game or simulation. The operation of such input devices is well known to those skilled in the art.

Power supply 40 can optionally be coupled to actuator interface 38 and/or actuators 30 to provide electrical power. Active actuators typically require a separate power source to be driven. Power supply 40 can be included within the housing of interface device 14, or can be provided as a separate component, for example, connected by an electrical power cord.

Alternatively, if the USB or a similar communication protocol is used, interface device 14 can draw power from the USB and thus have no need for power supply 40. This embodiment is most applicable to a device 14 having passive actuators 30, since passive actuators require little power to operate. Active actuators tend to require more power than can be drawn from USB, but this restriction can be overcome in a number of ways. One way is to configure interface 14 to appear as more than one peripheral to host computer 12; for example, each provided degree of freedom of user object 34 can be configured as a different peripheral and receive its own allocation of power. This would allow host 12 to allocate more power to interface device 14. Alternatively, power from the USB can be stored and regulated by interface device 14 and thus used when needed to drive actuators 30. For example, power can be stored over time and then immediately dissipated to provide a jolt force to the user object 34. A capacitor circuit, for example, can store the energy and dissipate the energy when enough power has been stored. Microprocessor may have to regulate the output of forces to assure that time is allowed for power to be stored. This power storage embodiment can also be used in non-USB embodiments of interface device 14 to allow a smaller power supply 40 to be used.

Safety switch 41 is preferably included in interface device to provide a mechanism to allow a user to override and deactivate actuators 30, or require a user to activate actuators 30, for safety reasons. Certain types of actuators, especially active actuators such as motors, can pose a safety issue for the user if the actuators unexpectedly move user object 34 against the user with a strong force. In addition, if a failure in the control system 10 occurs, the user may desire to quickly deactivate the actuators to avoid any injury. To provide this option, safety switch 41 is coupled to actuators 30. In the preferred embodiment, the user must continually activate or close safety switch 41 during operation of interface device 14 to activate the actuators 30. If, at any time, the safety switch is deactivated (opened), power from power supply 40 is cut to actuators 30 (or the actuators are otherwise deactivated) as long as the safety switch is deactivated. For example, a preferred embodiment of safety switch is an optical switch located on user object 34 (such as a joystick) or on a convenient surface of a housing enclosing interface device 14. When the user covers the optical switch with a hand or finger, the sensor of the switch is blocked from sensing ambient light, and the switch is closed. The actuators 30 thus will function as long as the user covers the switch. Other types of safety switches 41 can be provided in other embodiments. For example, an electrostatic contact switch can be used to sense contact, a button or trigger can be pressed, or a different type of sensor switch can be used.

User object 34 is preferably a device or article that may be grasped or otherwise contacted or controlled by a user and which is coupled to interface device 14. By "grasp", it is meant that users may releasably engage a grip portion of the object in some fashion, such as by hand, with their fingertips, or even orally in the case of handicapped persons. The user 22 can manipulate and move the object along provided degrees of freedom to interface with the host application program the user is viewing on display screen 20. Object 34 can be a joystick, mouse, trackball, stylus, steering wheel, medical instrument (laparoscope, catheter, etc.), pool cue, hand grip, knob, button, or other article.

Figure 2:
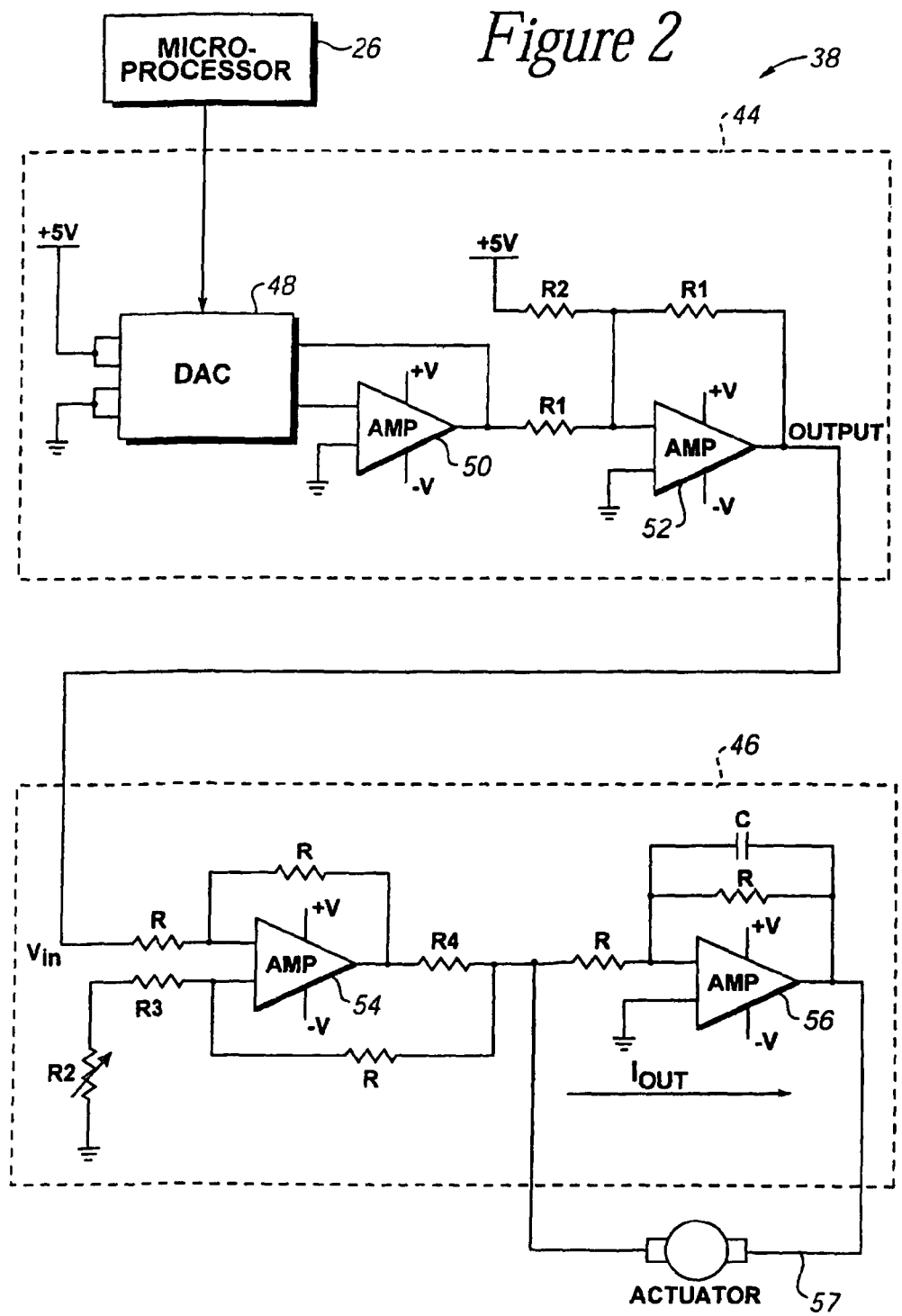
FIG. 2 is a schematic diagram of an actuator interface for providing control signals to an active actuator for the present invention.

FIG. 2 is a schematic diagram illustrating an example of an actuator interface 38 for an active actuator 30 of interface device 14. In this example, actuator 30 is a linear current controlled servo motor. Actuator interface 38 includes a DAC circuit 44 and a power amplifier circuit 46.

DAC circuit 44 is coupled to microprocessor 26 and preferably receives a digital signal representing a force value from the microprocessor 26. DAC 48 is suitable for converting an input digital signal to an analog voltage that is output to power amplifier circuit 46. A suitable DAC 48 is a parallel DAC, such as the DAC1220 manufactured by National Semiconductor, which is designed to operate with external generic op amp 50. Op amp 50, for example, outputs a signal from zero to −5 volts proportional to the binary number at its input. Op amp 52 is an inverting summing amplifier that converts the output voltage to a symmetrical bipolar range. Op amp 52 produces an output signal between −2.5 V and +2.5 V by inverting the output of op amp 50 and subtracting 2.5 volts from that output; this output signal is suitable for power amplification in amplification circuit 46. As an example, R1=200 kW and R2=400 kW. Of course, DAC circuit 44 is intended as one example of many possible circuits that can be used to convert a digital signal to a desired analog signal.

Power amplifier circuit 46 receives an analog low-power control voltage from DAC circuit 44 and amplifies the voltage to control actuators 30. Actuator 30 can be a high-power, current-controlled servo motor 30. The input voltage controls a transconductance stage composed of amplifier 54 and several resistors. The transconductance stage produces an output current proportional to the input voltage to drive motor 30 while drawing very little current from the input voltage source. The second amplifier stage, including amplifier 56, resistors, and a capacitor C, provides additional current capacity by enhancing the voltage swing of the second terminal 57 of motor 30. As example values for power amplifier circuit 46, R=10 kW, R2=500 W, R3=9.75 kW, and R4=1 W. Of course, circuit 46 is intended as one example of many possible circuits that can be used to amplify voltages to drive active actuators 30.

Figure 3:
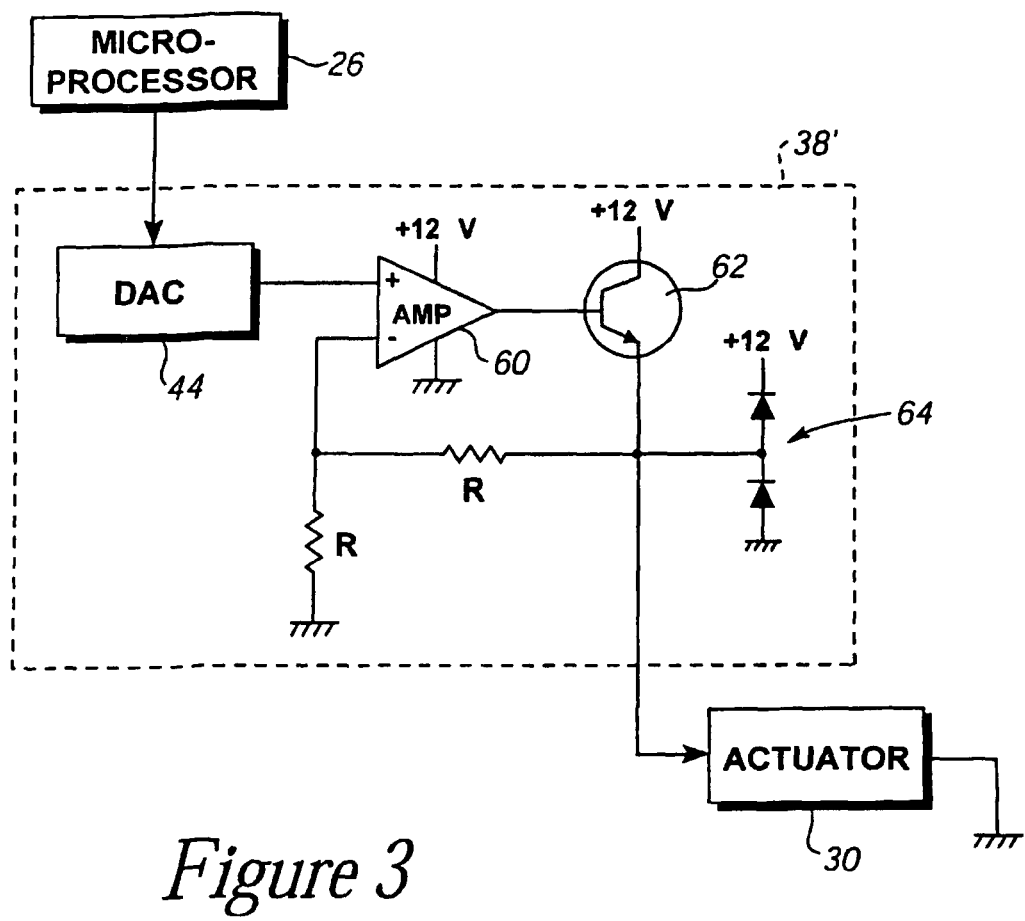
FIG. 3 is a schematic diagram of an actuator interface for providing control signals to a passive actuator for the present invention.

FIG. 3 is a schematic diagram illustrating an example of an actuator interface 38' that can be used in conjunction with passive actuators. Interface 38' is suitable for use with passive actuators (dampers) that are controlled with an analog voltage, such as magnetic particle brakes or a variable solenoid used with the fluid controlled passive dampers of U.S. Pat. No. 5,721,566. Interface 38' includes a DAC circuit 44, amplifier 60, transistor 62, and voltage protector 64. DAC circuit 44 is coupled to microprocessor 26 and receives a digital signal from the computer system representing a resistive force value to be applied to user object 34. DAC circuit 44 converts the digital signal voltages to analog voltages which are then output to amplifier 60. A suitable DAC is the MAX530ACNG manufactured by Maxim, or DAC circuit 44 as described above with reference to FIG. 2. Amplifier 60 receives the analog voltage from DAC 44 on a positive terminal and scales the voltage signal to a range usable by actuator 30. Amplifier 60 can be implemented as an operational amplifier or the like. Transistor 62 is coupled to the output of amplifier 60 and preferably operates as an amplifier to provide increased output current to actuator 30. Resistor R1 is coupled between amplifier 60 and the emitter of transistor 62, and resistor R2 is coupled between amplifier 60 and ground. For example, resistors R1 and R2 can have values of 180□ and 120 k□, respectively, and provide the proper biasing in the circuit. Voltage protector 64 is coupled to the emitter of transistor 62 and provides protection from voltage spikes when using inductive loads. Suitable passive actuators 30 for use with this circuitry includes variable solenoids or magnetic particle brakes. A separate DAC and amplifier can be used for each actuator 30 implemented in the interface apparatus so the microprocessor 26 and/or host computer system 12 can control each actuator separately for each provided degree of freedom. Interface 38' is intended as one example of many possible circuits that can be used to interface a computer system to actuators.

In an alternate embodiment, an on/off signal might only be needed, for example, for a solenoid driving an on/off valve of a fluid-controlled actuator as described in U.S. Pat. No. 5,721,566 and below in FIG. 10. In such an embodiment, for example, a transistor can be electrically coupled to microprocessor 26 at its base terminal to operate as an electrical switch for controlling the activation of a solenoid in the on/off actuator 30. A force signal such as a TTL logic signal can be sent to control the transistor to either allow current to flow through the solenoid to activate it and allow free movement of object 43, or to allow no current to flow to deactivate the solenoid and provide resistance to movement.

Figure 4:
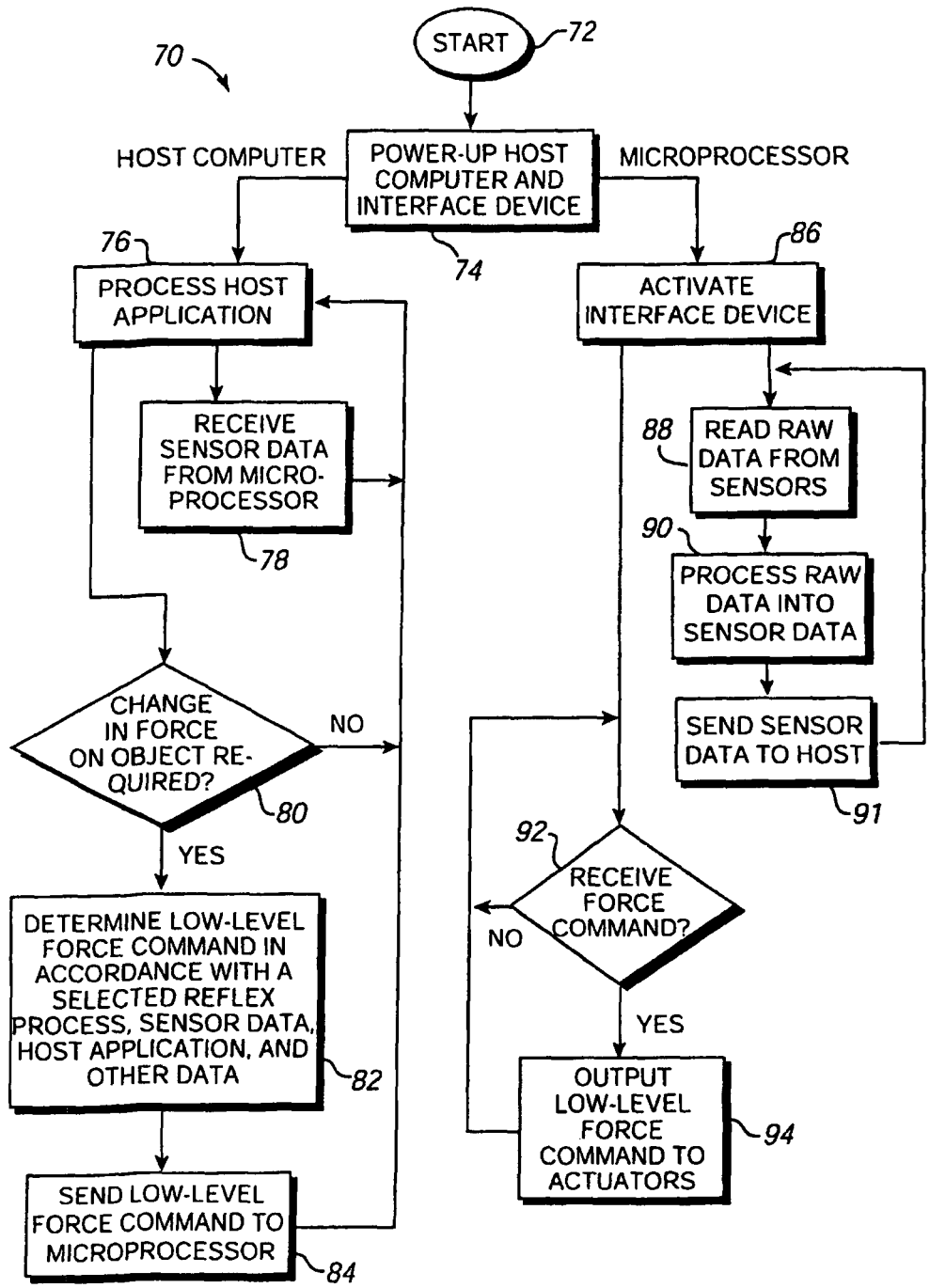
FIG. 4 is a flow diagram illustrating a first embodiment of a method of the present invention for controlling a force feedback interface device.

FIG. 4 is a flow diagram illustrating a first embodiment of a method 70 for controlling a force feedback interface device of the present invention. Method 70 is directed to a "host-controlled" embodiment, in which host computer system 12 provides direct, low-level force commands to microprocessor 26, and the microprocessor directly provides these force commands to actuators 30 to control forces output by the actuators.

For example, the host controlled mode is suitable for embodiments using a USB communication interface. Data rates are sufficiently high to allow the host to communicate at 500 Hz or greater and provide realistic force feedback to the user object 34. The USB Isochronous Data Transfer mode of USB is suitable to provide the necessary high data rate.

The process begins at 72. In step 74, host computer system 12 and interface device 14 are powered up, for example, by a user activating power switches. After step 74, the process 70 branches into two parallel (simultaneous) processes. One process is implemented on host computer system 12, and the other process is implemented on local microprocessor 26. These two processes branch out of step 74 in different directions to indicate this simultaneity.

In the host computer system process, step 76 is first implemented, in which an application program is processed or updated. This application can be a simulation, video game, scientific program, or other program. Images can be displayed for a user on output display screen 20 and other feedback can be presented, such as audio feedback.

Two branches exit step 76 to indicate that there are two processes running simultaneously (multitasking) on host computer system 12. In one process, step 78 is implemented, where sensor data is received by the host computer from local microprocessor 26. As detailed below in the microprocessor process, the local processor 26 continually receives signals from sensors 28, processes the raw data, and sends processed sensor data to host computer 12, Alternatively, local processor 26 sends raw data directly to host computer system 12. "Sensor data", as referred to herein, can include position values, velocity values, and/or acceleration values derived from the sensors 28 which detect motion of object 34 in one or more degrees of freedom. In addition, any other data received from other input devices 39 can also be received by host computer system 12 as sensor data in step 78, such as signals indicating a button on interface device 14 has been activated by the user. Finally, the term "sensor data" also can include a history of values, such as position values recorded previously and stored in order to calculate a velocity.

After sensor data is read in step 78, the process returns to step 76, where the host computer system 12 can update the application program in response to the user's manipulations of object 34 and any other user input received in step 78 as well as determine if forces need to be applied to object 34 in the parallel process. Step 78 is implemented in a continual loop of reading data from local processor 26.

The second branch from step 76 is concerned with the process of the host computer determining force commands to provide force feedback to the user manipulating object 34. These commands are described herein as "low-level" force commands, as distinguished from the "high-level" or supervisory force commands described in the embodiment of FIG. 5. A low level force command instructs an actuator to output a force of a particular magnitude. For example, the low level command typically includes a magnitude force value, e.g., equivalent signal(s) to instruct the actuator to apply a force of a desired magnitude value. Low level force commands may also designate a direction of force if an actuator can apply force in a selected direction, and/or other low-level information as required by an actuator.

The second branch starts with step 80, in which the host computer system checks if a change in the force applied to user object 34 is required. This can be determined by several types of criteria, the most important of which are the sensor data read by the host computer in step 78, timing data, and the implementation or "events" of the application program updated in step 76. The sensor data read in step 78 informs the host computer 12 how the user is interacting with the application program. From the position of object 34 sensed over time, the host computer system 12 can determine when forces should be applied to the object. For example, if the host computer is implementing a video game application, the position of a computer generated object within the game may determine if a change in force feedback is called for. If the user is controlling a simulated race car, the position of the user object joystick determines if the race car is moving into a wall and thus if a collision force should be generated on the joystick. In addition, the velocity and/or acceleration of the user object can influence whether a change in force on the object is required. If the user is controlling a tennis racket in a game, the velocity of a user object joystick in a particular degree of freedom may determine if a tennis ball is hit and this if an appropriate force should be applied to the joystick. Also, other input, such as a user activating buttons or other controls on interface device 14, can change the forces required on object 34 depending on how those controls have been programmed to affect the application program.

Other criteria for determining if a change in force is required includes events in the application program. For example, a game application program may (perhaps randomly) determine that another object in the game is going to collide with an object controlled by the user, regardless of the position data of the user object 34. Forces should thus be applied to the user object dependent on this collision event to simulate an impact. Forces can be required on the user object depending on a combination of such an event and the sensor data read in step 78. Other parameters in the application program can determine if a change in force to the user object is necessary, such as other input devices or user interface devices connected to host computer system 12 and inputting data to the application program (other interface devices can be directly connected, connected remotely through a network, etc.).

If no change in force is currently required in step 80, then the process returns to step 76 to update the host application and return to step 80 to again check until such a change in force is required. When such a change is required, step 82 is implemented, in which host computer 12 determines appropriate low-level force commands to be sent to the actuators 30 of interface device 14, these force commands being dependent on a selected force sensation process, sensor data, the host application, and the clock 18.

The low-level force commands can be determined, in part, from a selected force sensation process. A "reflex process" or "force sensation process", as referred to herein, is a set of instructions for providing force commands dependent on other parameters, such as sensor data read in step 78 and timing data from clock 18. In the described embodiment force sensation processes can include several different types of steps and/or instructions. One type of instruction is a force algorithm, which includes an equation that host computer 12 can use to calculate or model a force value based on sensor and timing data. Several types of algorithms can be used. For example, algorithms in which force varies linearly (or non-linearly) with the position of object 34 can be used to provide a simulated force like a spring. Algorithms in which force varies linearly (or nonlinearly) with the velocity of object 34 can be also used to provide a simulated damping force or other forces. Algorithms in which force varies linearly (or nonlinearly) with the acceleration of object 34 can also be used to provide, for example, a simulated inertial force on a mass (for linear variation) or a simulated gravitational pull (for nonlinear variation). Several types of simulated forces and the algorithms used to calculate such forces are described in "Perceptual Design of a Virtual Rigid Surface Contact," by Louis B. Rosenberg, Center for Design Research, Stanford University, Report number AL/CF-TR-1995-0029, April 1993, which is incorporated by reference herein.

For force values depending on the velocity and acceleration of user object 34, the velocity and acceleration can be provided in a number of different ways. The sensor data read by host computer 12 in step 78 can include position data, velocity data, and acceleration data. In a preferred embodiment, the velocity and acceleration data was calculated previously by microprocessor 26 and then provided to the host computer 12. The host computer can thus use the velocity and acceleration data directly in an algorithm to calculate a force value. In an alternate embodiment, the sensor data read in step 78 includes position data and no velocity or acceleration data, so that host computer 12 is required to calculate the velocity and acceleration from the position data. This can be accomplished by recording a number of past position values, recording the time when each such position value was received using the system clock 18, and calculating a velocity and/or acceleration from such data.

For example, a kinematic equation which calculates a force based on the velocity of the user object multiplied by a damping constant can be used to determine a damping force on the user object. This type of equation can simulate motion of object 34 along one degree of freedom through a fluid or similar material. A procedure for calculating a damping force on object 34 is described in co-pending patent application Ser. No. 08/400,233, filed Mar. 3, 1995, entitled "Method and Apparatus for Providing Passive Force Feedback", which is hereby incorporated by reference herein. For example, a damping constant can first be selected which indicates the degree of resistance that object 34 experiences when moving through a simulated material, such as a liquid, where a greater number indicates greater resistance. For example, water would have a lower damping constant than oil or syrup. The host computer recalls the previous position of user object 34 (along a particular degree of freedom), examines the current position of the user object, and calculate the difference in position. From the sign (negative or positive) of the difference, the direction of the movement of object 34 can also be determined. The force is then set equal to the damping constant multiplied by the change in position. Commands that controlled an actuator based on this algorithm would produce a force proportional to the user object's motion to simulate movement through a fluid. Movement in other mediums, such as on a bumpy surface, on an inclined plane, etc., can be simulated in a similar fashion using different methods of calculating the force.

The determination of force commands is preferably influenced by timing data accessed from system clock 18. For example, in the damping force example described above, the velocity of the user object 34 is determined by calculating the different of positions of the user object and multiplying by the damping constant. This calculation assumes a fixed time interval between data points, i.e., it is assumed that the position data of the object 34 is received by host computer 12 in regular, predetermined time intervals. However, this may not actually occur due to different processing speeds of different computer platforms or due to processing variations on a single host microprocessor 16, such as due to multi-tasking. Therefore, in the present invention, the host computer preferably accesses clock 12 to determine how much time has actually elapsed since the last position data was received. In the damping force example, the host computer could take the difference in position and divide it by a time measure to account for differences in timing. The host computer can thus use the clock's timing data in the modulation of forces and force sensations to the user. Timing data can be used in other algorithms and force sensation processes of the present invention to provide repeatable and consistent force feedback regardless of type of platform or available processing time on host computer 12.

Other instructions can also be included in a force sensation process. For example, conditions can be included to provide forces only in desired directions or under other particular circumstances. For example, to simulate a virtual obstruction such as a wall, forces should be applied in only one direction (uni-directional). For many passive actuators, only bi-directional resistance forces can be applied. To simulate uni-direction resistance, conditions can be included in the virtual obstruction force sensation process. An example of such conditions in a virtual obstruction force sensation process is described with respect to FIG. 12. Also, a "null" reflex process can be available that instructs host computer 12 (or microprocessor 26 in the embodiment of FIG. 5) to issue a low level command or force values to provide zero forces (i.e. remove all forces) on user object 34.

Another type of force sensation process does not use algorithms to model a force, but instead uses force values that have been previously calculated or sampled and stored as a digitized "force profile" in memory or other storage device. These force values may have been previously generated using an equation or algorithm as described above, or provided by sampling and digitizing forces. For example, to provide a particular force sensation to the user, host computer 12 can be instructed by a force sensation process to retrieve successive force values from a certain storage device, such as RAM, ROM, hard disk, etc. These force values can be sent directly to an actuator in a low-level command to provide particular forces without requiring host computer 12 to calculate the force values. In addition, previously-stored force values can be output with respect to other parameters to provide different types of forces and force sensations from one set of stored force values. For example, using system clock 18, the stored force values can be output in sequence according to a particular time interval that can vary depending on the desired force. Or, different retrieved force values can be output depending on the current position of user object 34.

Host computer 12 can determine a force command in step 82 according to a newly-selected reflex process, or to a previously selected reflex process. For example, if this is a second or later iteration of step 82, the same reflex process as in the previous iteration can be again implemented if parameters (such as the position of object 34) allow it, as determined by the host application program.

The force command determined in step 82 can also depend on instructions that check for other parameters. These instructions can be included within or external to the above-described reflex processes. One such parameter are values provided by the implemented host application program (if any). The application program may determine that a particular force command should be output or reflex process implemented based on events occurring within the application program or other instructions. Force commands or values can be provided by the host application program independently of sensor data. Also, the host application program can provide its own particular position, velocity, and/or acceleration data to a selected reflex process to calculate or provide a force that is not based on the manipulation of user object 34, but is provided to simulate an event in the application program. Such events may include collision events, such as occur when a user-controlled computer image impacts a virtual surface or structure. Also, other input devices connected to host computer 12 can influence events and, therefore, the forces applied to user object 34. For example, the sensor data from multiple interface devices 14 connected to a single host computer can influence the forces felt on other connected interface devices by influencing events and computer-controlled images/objects of the host application program.

Also, the force commands determined in step 82 can be based on other inputs to host computer 12, such as activations of buttons or other input devices in (or external to) interface device 14. For example, a particular application program might require that a force be applied to a joystick whenever a user presses a fire button on the joystick.

The above-described reflex processes and other parameters can be used to provide a variety of haptic sensations to the user through the user object 34 to simulate many different types of tactile events. For example, typical haptic sensations may include a virtual damping (described above), a virtual obstruction, and a virtual texture. Virtual obstructions are provided to simulate walls, obstructions, and other uni-directional forces in a simulation, game, etc. When a user moves a computer image into a virtual obstruction with a joystick, the user then feels a physical resistance as he or she continues to move the joystick in that direction. If the user moves the object away from the obstruction, the uni-directional force is removed. Thus the user is given a convincing sensation that the virtual obstruction displayed on the screen has physical properties. Similarly, virtual textures can be used to simulate a surface condition or similar texture. For example, as the user moves a joystick or other user object along an axis, the host computer sends a rapid sequence of commands to repetitively 1) apply resistance along that axis, and 2) to then immediately apply no resistance along that axis, as according to a reflex process. This frequency is based upon the travel of the joystick handle and is thus correlated with spatial position. Thus, the user feels a physical sensation of texture, which can be described as the feeling of dragging a stick over a grating.

In next step 84, a low-level force command determined in step 82 is output to microprocessor 26 over bus 24. This force command typically includes a force value that was determined in accordance with the parameters described above. The force command can be output as an actual force signal that is merely relayed to an actuator 30 by microprocessor 26; or, the force command can be converted to an appropriate form by microprocessor 26 before being sent to actuator 30. In addition, the low-level force command preferably includes information indicating to microprocessor 26 which actuators are to receive this force value (if multiple actuators are included on interface device 14). The process then returns to step 76 to process/update the host application program. The process continues to step 80, where the host computer checks if a different force command should be output as determined by the parameters described above. If so, a new force command is determined and output in step 84. If no change of force is required, host computer 12 does not issue another command, since microprocessor 26 can continues to output the previous force command to actuators 30 (alternatively, host computer 12 can continue to output commands, even if no change of force is required). Subsequent force commands output in step 84 can be determined in accordance with the same reflex process, or a different reflex process, depending on the parameters of step 82.

In addition, the host computer 12 preferably synchronizes any appropriate visual feedback, auditory feedback, or other feedback related to the host application with the application of forces on user object 34. For example, in a video game application, the onset or start of visual events, such as an object colliding with the user on display screen 20, should be synchronized with the onset or start of forces felt by the user which correspond to or complement those visual events. The onsets visual events and force events are preferably occur within about 30 milliseconds (ms) of each other. This span of time is the typical limit of human perceptual ability to perceive the events as simultaneous. If the visual and force events occur outside this range, then a time lag between the events can usually be perceived. Similarly, the output of auditory signals, corresponding to the onset of auditory events in the host application, are preferably output synchronized with the onset of output forces that correspond to/complement those auditory events. Again, the onsets of these events occur preferably within about 30 ms of each other. For example, host computer system 12 can output sounds of an explosion from speakers 21 as close in time as possible to the forces felt by the user from that explosion in a simulation. Preferably, the magnitude of the sound is in direct (as opposed to inverse) proportion to the magnitude of the forces applied to user object 34. For example, during a simulation, a low sound of an explosion in the far (virtual) distance can cause a small force on user object 34, while a large, "nearby" explosion might cause a loud sound to be output by the speakers and a correspondingly large force to be output on object 34.

The local microprocessor 26 implements the process branching from step 74 and starting with step 86 in parallel with the host computer process described above. In step 86, the interface device 14 is activated. For example, signals can be sent between host computer 12 and interface device 14 to acknowledge that the interface device is now active. From step 86, two processes branch to indicate that there are two processes running simultaneously (multi-tasking) on local processor 26. In one process, step 88 is implemented, in which the processor 26 reads raw data (sensor readings) from sensors 28. Such raw data preferably includes position values describing the position of the user object along provided degrees of freedom. In the preferred embodiment, sensors 28 are relative sensors that provide position values describing the change in position since the last position read. Processor 26 can determine the absolute position by measuring the relative position from a designated reference position. In alternate embodiments, sensors 28 can include velocity sensors and accelerometers for providing raw velocity and acceleration values of object 34. The raw data read in step 88 can also include other input, such as from an activated button or other control 39 of interface device 14.

In next step 90, processor 26 processes the received raw data into sensor data, if applicable. In the preferred embodiment, this processing includes two steps: computing velocity and/or acceleration values from raw position data (if velocity and/or acceleration are needed to compute forces), and filtering the computed velocity and acceleration data. The velocity and acceleration values are computed from raw position data received in step 88 and stored position and time values. Preferably, processor 26 stores a number of position values and time values corresponding to when the position values were received. Processor 26 can use its own or a local system clock (not shown in FIG. 1) to determine the timing data. The velocity and acceleration can be computed using the stored position data and timing data, as is well known to those skilled in the art. The calculated velocity and/or acceleration values can then be filtered to remove noise from the data, such as large spikes that may result in velocity calculations from quick changes in position of object 34. Thus, the sensor data in the described embodiment includes position, velocity, acceleration, and other input data. In an alternate embodiment, circuitry that is electrically coupled to but separate from processor 26 can receive the raw data and determine velocity and acceleration. For example, an application-specific integrated circuit (ASIC) or discrete logic circuitry can use counters or the like to determine velocity and acceleration to save processing time on microprocessor 26.

Alternatively, step 90 can be omitted, and the processor 26 can provide raw position data to host computer 12 (and other input data from other input devices 39). This would require host computer 12 to filter and compute velocity and acceleration from the position data. Thus, it is preferred that processor 26 do this processing to reduce the amount of processing performed on host computer 12. In other embodiments, the filtering can be performed on host computer 12 while the velocity and acceleration calculation can be performed on the processor 26. Also, in embodiments where velocity and/or acceleration sensors are used to provide raw velocity and acceleration data, the calculation of velocity and/or acceleration can be omitted. After step 90, step 91 is implemented, in which the processor 26 sends the processed sensor data to the host computer 12 via bus 24. The process then returns to step 88 to read raw data. Steps 88, 90 and 91 are thus continuously implemented to provide current sensor data to host computer system 12.

The second branch from step 86 is concerned with processor 26 controlling the actuators 30 to provide forces calculated by host computer 12 to object 34. The second branch starts with step 92, in which processor 26 checks if a low-level force command has been received from host computer 12 over bus 24. If not, the process continually checks for such a force command. When a force command has been received, step 94 is implemented, in which processor 26 outputs a low-level processor force command to the designated actuators to set the output force to the desired magnitude, direction, etc. This force command may be equivalent to the received low-level command from the host computer, or, the processor 26 can optionally convert the force command to an appropriate form usable by actuator 30 (or actuator interface 38 can perform such conversion). The process then returns to step 92 to check for another force command from the host computer 12.

Figure 5:
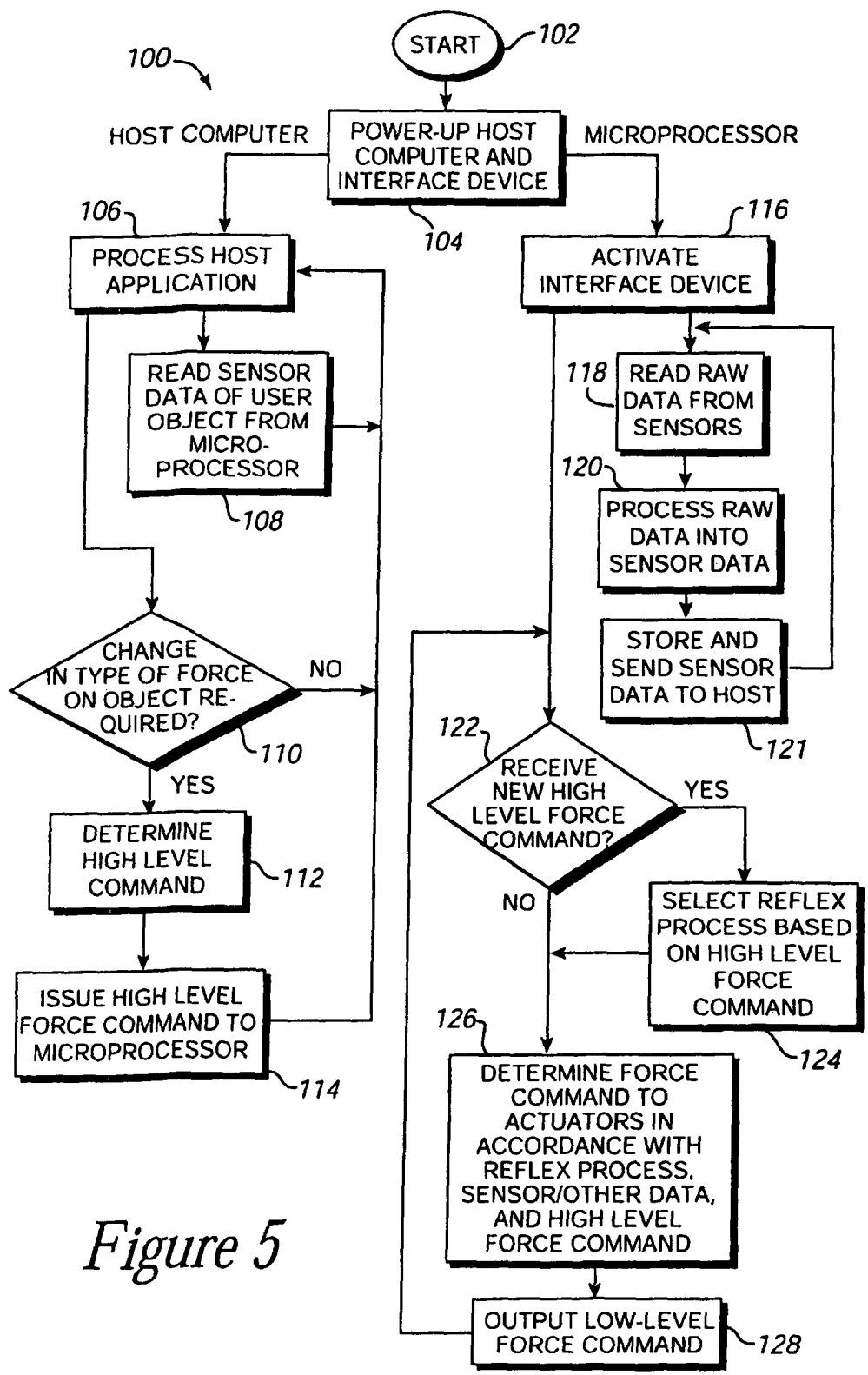
FIG. 5 is a flow diagram illustrating a second embodiment of a method of the present invention for controlling a force feedback interface device.

FIG. 5 is a flow diagram illustrating a second embodiment of a method 100 for controlling force feedback interface device 14 of the present invention. Method 100 is directed to a "reflex" embodiment, in which host computer system 12 provides only high-level supervisory force commands ("host commands") to microprocessor 26, while the microprocessor independently determines and provides low-level force commands (force values) to actuators 30 as an independent "reflex" to control forces output by the actuators.

The process of FIG. 5 is suitable for low speed communication interfaces, such as a standard RS-232 serial interface. However, the embodiment of FIG. 5 is also suitable for high speed communication interfaces such as USB, since the local microprocessor relieves computational burden from host processor 16. In addition, this embodiment can provide a straightforward command protocol, an example of which is described with respect to FIGS. 9 and 14, and which allow software developers to easily provide force feedback in a host application. In this embodiment, for example, the slower "interrupt data transfers" mode of USB can be used.

The process begins at 102. In step 104, host computer system 12 and interface device 14 are powered up, for example, by a user activating power switches. After step 104, the process 100 branches into two parallel processes. One process is implemented on host computer system 12, and the other process is implemented on local microprocessor 26.

In the host computer system process, step 106 is first implemented, in which an application program is processed. This application can be a simulation, video game, scientific program, or other program. Images can be displayed for a user on output display screen 20 and other feedback can be presented, such as audio feedback.

Two branches exit step 106 to indicate that there are two processes running simultaneously (multi-tasking, etc.) on host computer system 12. In one of the processes, step 108 is implemented, where sensor data from the user object is received by the host computer from local microprocessor 26. Similarly to step 78 of the process of FIG. 4, host computer system 12 receives either raw data (e.g., position data and no velocity or acceleration data) or processed sensor data (position, velocity and/or acceleration data) from microprocessor 26. In addition, any other data received from other input devices 39 can also be received by host computer system 12 from microprocessor 26 in step 108, such as signals indicating a button on interface device 14 has been pressed by the user.

Unlike the previous embodiment of FIG. 4, the host computer does not calculate force values from the received sensor data in step 108. Rather, host computer 12 monitors the sensor data to determine when a change in the type of force is required. This is described in greater detail below. Of course, host computer 12 also uses the sensor data as input for the host application to update the host application accordingly.

After sensor data is received in step 108, the process returns to step 106, where the host computer system 12 can update the application program in response to the user's manipulations of object 34 and any other user input received in step 108. Step 108 is then implemented again in a continual loop of receiving sets of sensor data from local processor 26. Since the host computer does not need to directly control actuators based on sensor data, the sensor data can be provided at a much lower speed. For example, since the host computer updates the host application and images on display screen 20 in response to sensor data, the sensor data need only be read at 60-70 Hz (the refresh cycle of a typical display screen) compared to the much higher rate of about 500-1000 Hz (or greater) needed to realistically provide low-level force feedback signals from sensor signals. Host computer 12 also preferably synchronizes visual, audio, and force events similarly as described above with reference to FIG. 4.

The second branch from step 106 is concerned with the process of the host computer determining high-level force commands ("host commands") to provide force feedback to the user manipulating object 34. The second branch starts with step 110, in which the host computer system checks if a change in the type of force applied to user object 34 is required. The "type" of force is a force sensation or profile produced by a particular reflex process or force value which the local microprocessor 26 can implement independently of the host computer. The host computer 12 determines whether a change in the type of force is required depending on the sensor data read by the host computer in step 108 and depending on the events of the application program updated in step 106. As explained with reference to FIG. 4, the sensor data informs the host computer when forces should be applied to the object based on the object's current position, velocity, and/or acceleration. The user's manipulations of object 34 may have caused a new type of force to required. For example, if the user is moving a virtual race car within a virtual pool of mud in a video game, a damping type of force should be applied to the object 34 as long as the race car moves within the mud. Thus, damping forces need to be continually applied to the object, but no change in the type of force is required. When the race car moves out of the pool of mud, a new type of force (i.e. a removal of damping force in this case) is required. The events of the application program may also require a change in the type of force applied. For example, if the user's car is traveling through mud and another car collides into the user's car, then a new type of force (collision force) should be applied to the user object. Forces may be required on the user object depending on a combination of an application event and the sensor data read in step 108. Also, other input, such as a user activating buttons or other input devices 39 on interface device 14, can change the type of forces required on object 34.

If no change in the type of force is currently required in step 110, then the process returns to step 106 to update the host application and return to step 110 to again check until such a change the type of force is required. When such a change is required, step 112 is implemented, in which host computer 12 determines an appropriate host command to send to microprocessor 26. The available host commands for host computer 12 may each correspond to an associated reflex process implemented by microprocessor 26. For example, host commands to provide a damping force, a spring force, a gravitational pull, a bumpy surface force, a virtual obstruction force, and other forces can be available to host computer 12. These host commands can also include a designation of the particular actuators 30 or degrees of freedom which are to apply this desired force on object 34. The host commands can also include other command parameter information which might vary the force produced by a particular reflex process. For example, a damping constant can be included in a host command to designate a desired amount of damping force. The host command may also preferably override the reflex operation of the processor 26 and include low-level force values. A preferred command protocol and detailed description of a set of host commands is described in greater detail below with respect to FIGS. 9 and 14. In next step 114, the host computer sends the host command to the microprocessor 26 over bus 24. The process then returns to step 106 to update the host application and to return to step 110 to check if another change in force is required.

The local microprocessor 26 implements the process branching from step 104 and starting with step 116 in parallel with the host computer process described above. In step 116, the interface device 14 is activated. For example, signals can be sent between host computer 12 and interface device 14 to acknowledge that the interface device is now active and can be commanded by host computer 12. From step 116, two processes branch to indicate that there are two processes running simultaneously (multi-tasking) on local processor 26. In one process, step 118 is implemented, in which the processor 26 reads raw data from sensors 28. As described in step 88 of FIG. 4, processor 26 preferably reads position data and no velocity or acceleration data from sensors 28; In alternate embodiments, sensors 28 can include velocity sensors and accelerometers for providing velocity and acceleration values of object 34. The sensor data read in step 118 can also include other input, such as from an activated button or other control of interface device 14.

In next step 120, processor 26 processes the received raw data into sensor data. As described in step 90 of FIG. 4, this processing preferably includes the two steps of computing velocity and acceleration data from the filtered position data and filtering the velocity and acceleration data. Processor 26 can use its own local clock 21 to determine the timing data needed for computing velocity and acceleration. In addition, a history of previous recorded values, such as position or velocity values, can be used to calculate sensor data. In embodiments where velocity and/or acceleration sensors are used, the calculation of velocity and/or acceleration is omitted. In next step 121, the processor 26 sends the processed sensor data to host computer 12 and also stores the data for computing forces, as described in the second branch process of processor 26. The process then returns to step 118 to read raw data. Steps 118, 120 and 121 are thus continuously implemented to provide current sensor data to processor 26 and host computer 12.

The second branch from step 116 is concerned with an "actuator process" in which processor 26 controls the actuators 30 to provide forces to object 34. The second branch starts with step 122, in which processor 26 checks if a host command has been received from host computer 12 over bus 24. If so, the process continues to step 124, where a reflex process associated with the host command is selected. Such reflex processes can be stored local to microprocessor 26 in, for example, memory 27 such as RAM or ROM (or EPROM, EEPROM, etc.). Thus, the microprocessor might select a damping reflex process if the high level command indicated that the damping force from this reflex process should be applied to object 34. The available reflex processes are preferably similar to those described above with reference to FIG. 4, and may include algorithms, stored force profiles or values, conditions, etc. In some embodiments, steps 118, 120, and 121 for reading sensor data can be incorporated in the reflex processes for the microprocessor, so that sensor data is only read once a reflex process has been selected. Also, the host command may in some instances simply be a low-level force command that provides a force value to be sent to an actuator 30 (as in the embodiment of FIG. 4), in which case a reflex process need not be selected.

After a reflex process has been selected in step 124, or if a new host command has not been received in step 122, then step 126 is implemented, in which processor 26 determines a processor low-level force command (i.e. force value). The force value is derived from the reflex process and any other data required by the reflex process as well as command parameters included in relevant host commands. As explained above, the needed data can include sensor data and/or timing data from local clock 29. Thus, if no new high level command was received in step 122, then the microprocessor 26 determines a force command according to the same reflex process that it was previously using in step 126. In addition, the host command can include other command parameter information needed to determine a force command. For example, the host command can indicate the direction of a force along a degree of freedom.

In step 128, processor 26 outputs the determined processor force command to actuators 30 to set the output force to the desired level. Before sending out the force command, processor 26 can optionally convert the force command to an appropriate form usable by actuator 30, or actuator interface 38 can perform such conversion. The process then returns to step 122 to check if another host command has been received from the host computer 12.

The actuator process of microprocessor 26 (steps 118, 120, 122, 124, 126, and 128) thus operates to provide forces on object 34 independently of host computer 12 according to a selected reflex process and other parameters. The reflex process determines how the processor force command is to be determined based on the most recent sensor data read by microprocessor 26. Since a reflex process indicates how forces should be applied depending on the position and other parameters of user object 34, the processor can issue low-level force commands, freeing the host computer to process the host application and determine only when a new type of force needs to be output. This greatly improves communication rates between host computer 12 and interface device 14.

In addition, the host computer 12 preferably has the ability to override the reflex operation of microprocessor 26 and directly provide calculated or other force values as described above with reference to FIG. 4. For example, the host command can simply indicate a force value to be sent to an actuator 30. This override mode can also be implemented as a reflex process. For example, the microprocessor 26 can select a reflex process that instructs it to relay low-level force commands received from host computer 12 to an actuator 30.

Another embodiment using the local microprocessor 26 to implement reflex processes from a host command is described by U.S. Pat. No. 5,739,811, filed Sep. 27, 1995 on behalf of Rosenberg, entitled "Method and Apparatus for Controlling Human-computer Interface Systems Providing Force Feedback, and U.S. Pat. No. 5,734,373, entitled "Method and Apparatus for Controlling Force Feedback Interface Systems Utilizing a Host Computer," filed Dec. 1, 1995 on behalf of Louis B. Rosenberg et al., both assigned to the assignee of this present application, and both hereby incorporated by reference herein.

Figure 6:
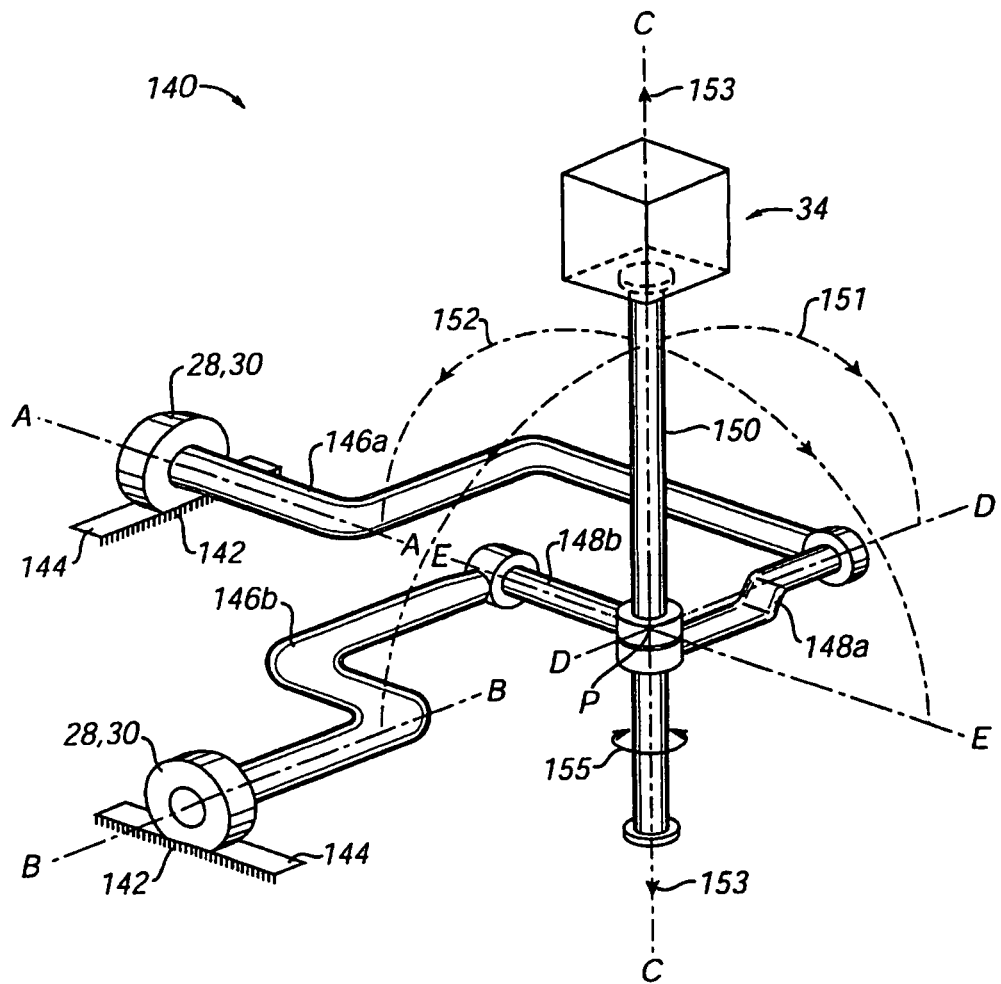
FIG. 6 is a schematic diagram of a closed loop five bar linkage mechanism for providing two degrees of freedom to the user object of the interface device.

FIG. 6 is a schematic diagram of an example of a user object 34 that is coupled to a gimbal mechanism 140 for providing two or more rotary degrees of freedom to object 34. Gimbal mechanism 140 can be coupled to interface device 14 or be provided with sensors 28 and actuators 30 separately from the other components of interface device 14. A gimbal device as shown in FIG. 6 is described in greater detail in co-pending patent application Ser. No. 08/400,233, filed on Mar. 3, 1995, and U.S. Pat. No. 5,731,804, filed Jan. 18, 1995, and both of which are hereby incorporated by reference herein.

Gimbal mechanism 140 can be supported by a grounded surface 142, which can be a surface of the housing of interface device 14, for example (schematically shown as part of member 144). Gimbal mechanism 140 is preferably a five-member linkage that includes a ground member 144, extension members 146a and 146b, and central members 148a and 148b. Ground member 144 is coupled to a base or surface which provides stability for mechanism 140. The members of gimbal mechanism 140 are rotatably coupled to one another through the use of bearings or pivots, wherein extension member 146a is rotatably coupled to ground member 144 and can rotate about an axis A, central member 148a is rotatably coupled to extension member 146a and can rotate about a floating axis D, extension member 146b is rotatably coupled to ground member 144 and can rotate about axis B, central member 148b is rotatably coupled to extension member 146b and can rotate about floating axis E, and central member 148a is rotatably coupled to central member 148b at a center point P at the intersection of axes D and E. The axes D and E are "floating" in the sense that they are not fixed in one position as are axes A and B. Axes A and B are substantially mutually perpendicular.

Gimbal mechanism 140 is formed as a five member closed chain. Each end of one member is coupled to the end of a another member. The five-member linkage is arranged such that extension member 146a, central member 148a, and central member 148b can be rotated about axis A in a first degree of freedom. The linkage is also arranged such that extension member 146b, central member 148b, and central member 148a can be rotated about axis B in a second degree of freedom.

User object 34 is a physical object that can be coupled to a linear axis member 150, or linear axis member 150 can be considered part of object 34. Linear member 150 is coupled to central member 148a and central member 148b at the point of intersection P of axes D and E. Linear axis member 150 is coupled to gimbal mechanism 140 such that it extends out of the plane defined by axis D and axis E. Linear axis member 150 can be rotated about axis A (and E) by rotating extension member 146a, central member 148a, and central member 148b in a first revolute degree of freedom, shown as arrow line 151. Member 150 can also be rotated about axis B (and D) by rotating extension member 50b and the two central members about axis B in a second revolute degree of freedom, shown by arrow line 152. In alternate embodiments, linear axis member is also translatably coupled to the ends of central members 148a and 148b, and thus can be linearly moved along floating axis C, providing a third degree of freedom as shown by arrows 153. Axis C can, of course, be rotated about one or both axes A and B as member 150 is rotated about these axes. In addition, linear axis member 150 in some embodiments can rotated about axis C, as indicated by arrow 155, to provide an additional degree of freedom. These additional degrees of freedom can also be provided with sensors and actuators to allow processor 26/host computer 12 to read the position/motion of object 34 and apply forces in those degrees of freedom.

Sensors 28 and actuators 30 can be coupled to gimbal mechanism 140 at the link points between members of the apparatus and provide input to and output as described above. Sensors and actuators can be coupled to extension members 146a and 146b, for example.

User object 34 is coupled to mechanism 140. User object 44 may be moved in both (or all three or four) degrees of freedom provided by gimbal mechanism 140 and linear axis member 150. As object 34 is moved about axis A, floating axis D varies its position, and as object 34 is moved about axis B, floating axis E varies its position.

Figure 7:
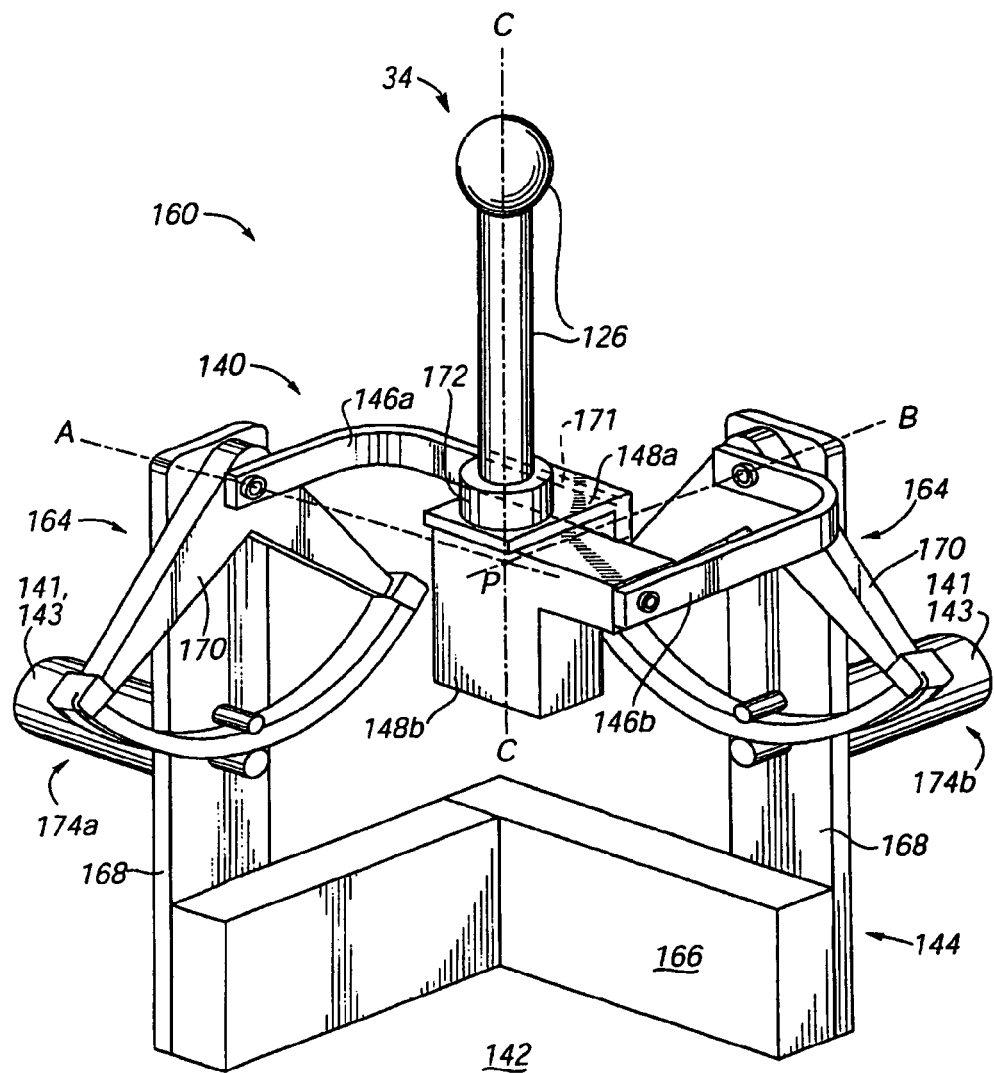
FIG. 7 is a perspective view of a preferred embodiment of the linkage mechanism shown in FIG. 6.

FIG. 7 is a perspective view of a specific embodiment of an apparatus 160 including gimbal mechanism 140 and other components of interface device 14 for providing mechanical input and output to host computer system 12. Apparatus 160 includes gimbal mechanism 140, sensors 141 and actuators 143. User object 34 is shown in this embodiment as a joystick having a grip portion 162 and is coupled to central member 148a. Apparatus 160 operates in substantially the same fashion as gimbal mechanism 140 described with reference to FIG. 6.

Gimbal mechanism 140 provides support for apparatus 160 on grounded surface 142, such as a table top or similar surface. The members and joints ("bearings") of gimbal mechanism 140 are preferably made of a lightweight, rigid, stiff metal, such as aluminum, but can also be made of other rigid materials such as other metals, plastic, etc. Gimbal mechanism 140 includes ground member 144, capstan drive mechanisms 164, extension members 146a and 146b, central drive member 148a, and central link member 148b. Ground member 144 includes a base member 166 and vertical support members 168. Base member 166 is coupled to grounded surface 142. A vertical support member 168 is coupled to each of these outer surfaces of base member 166 such that vertical members 168 are in substantially 90-degree relation with each other.

A capstan drive mechanism 164 is preferably coupled to each vertical member 168. Capstan drive mechanisms 164 are included in gimbal mechanism 140 to provide mechanical advantage without introducing friction and backlash to the system. The capstan drive mechanisms 164 are described in greater detail in co-pending patent application Ser. No. 08/400,233.

Extension member 146a is rigidly coupled to a capstan drum 170 and is rotated about axis A as capstan drum 170 is rotated. Likewise, extension member 146b is rigidly coupled to the other capstan drum 170 and can be rotated about axis B. Central drive member 148a is rotatably coupled to extension member 146a, and central link member 148b is rotatably coupled to an end of extension member 146b. Central drive member 148a and central link member 148b are rotatably coupled to each other at the center of rotation of the gimbal mechanism, which is the point of intersection P of axes A and B. Bearing 172 connects the two central members 148a and 148b together at the intersection point P.

Gimbal mechanism 140 provides two degrees of freedom to an object 34 positioned at or near to the center point P of rotation. An object at or coupled to point P can be rotated about axis A and B or have a combination of rotational movement about these axes. In alternate embodiments, object 34 can also be rotated or translated in other degrees of freedom, such as a linear degree of freedom along axis C or a rotary degree of freedom about axis C.

Sensors 141 and actuators 143 are preferably coupled to gimbal mechanism 140 to provide input and output signals between apparatus 160 and microprocessor 26. In the described embodiment, sensors 141 and actuators 143 are combined in the same housing as grounded transducers 174. Preferably, transducers 174a and 174b are bi-directional transducers having optical encoder sensors 141 and active DC servo motors 143. Passive actuators can also be used. The housing of each grounded transducer 174a is preferably coupled to a vertical support member 168 and preferably includes both an actuator 143 for providing force in or otherwise influencing the first revolute degree of freedom about axis A and a sensor 141 for measuring the position of object 34 in or otherwise influenced by the first degree of freedom about axis A. A rotational shaft of actuator 174a is coupled to a pulley of capstan drive mechanism 164 to transmit input and output along the first degree of freedom. Grounded transducer 174b preferably corresponds to grounded transducer 174a in function and operation. Transducer 174b is coupled to the other vertical support member 168 and is an actuator/sensor which influences or is influenced by the second revolute degree of freedom about axis B.

The transducers 174a and 174b of the described embodiment are advantageously positioned to provide a very low amount of inertia to the user handling object 34. Transducer 174a and transducer 174b are decoupled, meaning that the transducers are both directly coupled to ground member 144 which is coupled to ground surface 142, i.e. the ground surface carries the weight of the transducers, not the user handling object 34. The weights and inertia of the transducers 174a and 174b are thus substantially negligible to a user handling and moving object 34. This provides a more realistic interface to a virtual reality system, since the computer can control the transducers to provide substantially all of the forces felt by the user in these degrees of motion. Apparatus 160 is a high bandwidth force feedback system, meaning that high frequency signals can be used to control transducers 174 and these high frequency signals will be applied to the user object with high precision, accuracy, and dependability. The user feels very little compliance or "mushiness" when handling object 34 due to the high bandwidth. In contrast, in typical prior art arrangements of multi-degree of freedom interfaces, one actuator "rides" upon another actuator in a serial chain of links and actuators. This low bandwidth arrangement causes the user to feel the inertia of coupled actuators when manipulating an object.

Object 34 is shown in FIG. 3 as a joystick having a grip portion 126 for the user to grasp. A user can move the joystick about axes A and B. The movements in these two degrees of freedom are sensed by processor 26 and host computer system 12. Forces can be applied preferably in the two degrees of freedom to simulate various haptic sensations. Optionally, other objects 34 can be coupled to gimbal mechanism 140, as described above. For example, medical instruments, such as laparoscopic tools or catheters, can be used to simulate medical procedures. A laparoscopic tool sensor and force feedback device is described in U.S. Pat. No. 5,623,582, filed Jul. 14, 1994 and entitled "Method and Apparatus for Providing Mechanical I/O for Computer Systems" assigned to the assignee of the present invention and incorporated herein by reference in its entirety.

Figure 8:
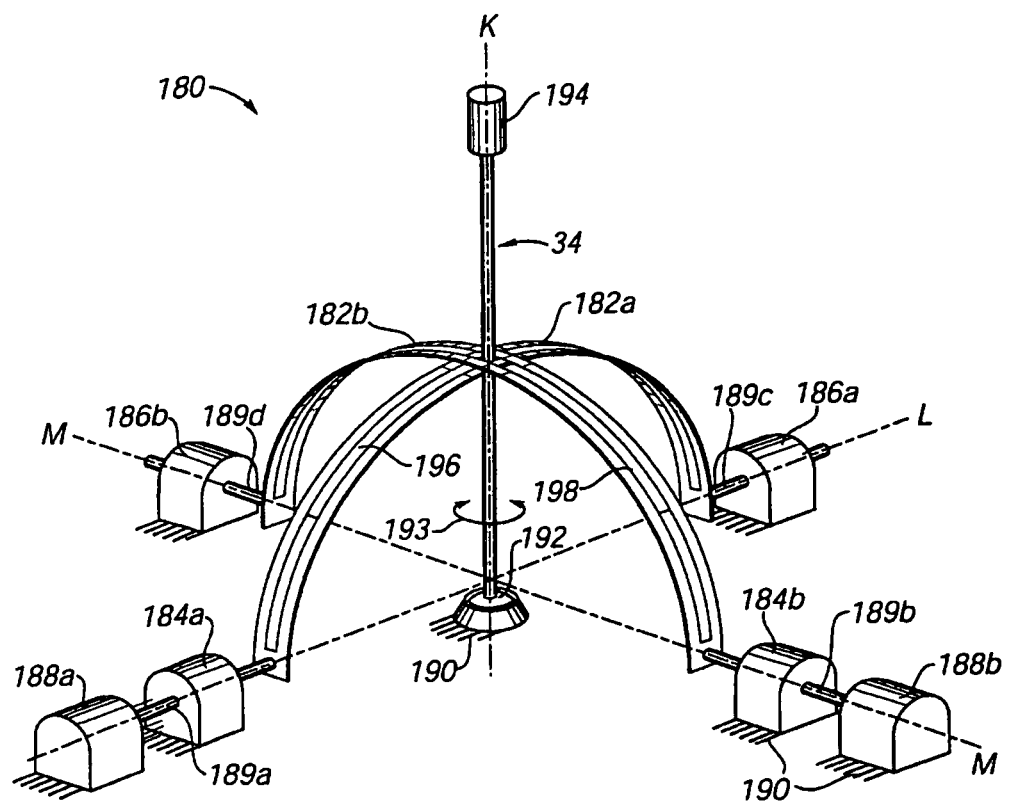
FIG. 8 is a perspective view of a slotted yoke joystick embodiment of a mechanical interface for the user object.

FIG. 8 is a perspective view of a different embodiment of object 34 and supporting mechanism 180 that can be used in conjunction with interface device 14. Mechanism 180 includes a slotted yoke configuration for use with joystick controllers that is well-known to those skilled in the art. Mechanism 180 includes slotted yoke 182a, slotted yoke 182b, sensors 184a and 184b, bearings 186a and 186b, actuators 188a and 188b, and joystick 34. Slotted yoke 182a is rigidly coupled to shaft 189a that extends through and is rigidly coupled to sensor 184a at one end of the yoke. Slotted yoke 182a is similarly coupled to shaft 189c and bearing 186a at the other end of the yoke. Slotted yoke 182a is rotatable about axis L and this movement is detected by sensor 184a. Actuator 188a can be an active or passive actuator. In alternate embodiments, bearing 186a and be implemented as another sensor like sensor 184a.

Similarly, slotted yoke 182b is rigidly coupled to shaft 189b and sensor 184b at one end and shaft 189d and bearing 186b at the other end. Yoke 182b can rotated about axis M and this movement can be detected by sensor 184b.

Object 34 is a joystick that is pivotally attached to ground surface 190 at one end 192 so that the other end 194 typically can move in four 90-degree directions above surface 190 in two degrees of freedom (and additional directions in other embodiments). Joystick 34 extends through slots 196 and 198 in yokes 182a and 182b, respectively. Thus, as joystick 34 is moved in any direction, yokes 182a and 182b follow the joystick and rotate about axes L and M. Sensors 184a-d detect this rotation and can thus track the motion of joystick 34. Actuators 188a and 188b allow the user to experience force feedback when handling joystick 34. Alternatively, other types of objects 34 can be used in place of the joystick, or additional objects can be coupled to the joystick. In yet other embodiments, additional degrees of freedom can be provided to joystick 34. For example, the joystick can be provided with a rotary degree of freedom about axis K, as indicated by arrow 193. Sensors and/or actuators can also be included for such additional degrees of freedom.

In alternate embodiments, actuators can be coupled to shafts 189c and 189d to provide additional force to joystick 34. Actuator 188a and an actuator coupled to shaft 189c can be controlled simultaneously by microprocessor 26 or host computer 12 to apply or release force from bail 182a. Similarly, actuator 188b and an actuator coupled to shaft 189d can be controlled simultaneously.

Other embodiments of mechanical interface apparatuses and transducers can also be used in interface device 14 to provide mechanical input/output for user object 34. For example, mechanical apparatuses which provide one, two, or three (or more) linear degrees of freedom to user object 34 can be used. In addition, passive actuators having an amount of "play" can be provided to implement different reflex processes. These and other suitable embodiments of actuators and mechanical interfaces are described in co-pending patent application Ser. No. 08/400,233, filed Mar. 3, 1995; U.S. Pat. No. 5,731,804, filed Jan. 18, 1995; U.S. Pat. No. 5,721,566, filed Jun. 9, 1995, entitled "Method and Apparatus for Providing Passive Fluid Force Feedback"; and Ser. No. 08/560,091, filed Nov. 17, 1995 on behalf of Rosenberg and Schena, entitled, "Method and Apparatus for Providing Low Cost Force Feedback and Mechanical I/O for Computer Systems," all assigned to the same assignee as the present application and all of which are hereby incorporated by reference herein.

FIG. 9 is a table 300 showing a number of preferred host commands that can be used in the embodiment of FIG. 5, where host computer 12 sends high level host commands to local microprocessor 26, which implements local reflex processes or reflex processes in accordance with the host commands. As discussed previously, low communication rates on bus 24 (FIG. 1) can impede performance, specifically the accuracy and realism, of force feedback. The local microprocessor can implement reflex processes based on host commands independently of the host computer, thus requiring less signals to be communicated over bus 24. Preferably, a communication language or force feedback protocol should be standardized for the transfer of host commands from the host processor 16 to the local processor 26. Ideally, as discussed with reference to FIG. 5, the format will permit the efficient transmission of high level supervisory commands (host commands) to local processor 26 as in step 114 of FIG. 5. By providing a relatively small set of commands and command parameters which are translated into a panoply of forces, the format further shifts the computational burden from the host computer to the local microprocessor 26. In addition, a programmer or developer of force feedback application software for host computer 12 is provided with a high level, standard, efficient force feedback command protocol.

In one embodiment, the host command is permitted to include command parameters generic to a wide variety of force models implemented by the microprocessor 26 to control the actuators 30. For instance, force magnitude and force direction are two generic command parameters. Force duration, or force model application time, is another generic command parameter. It may also be advantageous to further define a command parameter for other input device 39, such as a button. The button, when activated, can trigger different forces or force models.

A preferred embodiment contains two primary modes or "control paradigms" of operation for force feedback interface device 14: rate control and position control. These modes imply a classification scheme for host commands parametrized by the command parameters. While the difference between rate control and position control is generally subtle to the user while he or she interacts with an application, the difference may be profound when representing force feedback information. While certain force feedback entities may be implemented under both control modes, classifying the force feedback commands into two sets can help to avoid confusion among programmers. Some of the commands can be used as either rate control or position control commands.

Exemplary force feedback commands in accordance with the present invention will be described below. The rate control force feedback commands will be discussed first, followed by the position control commands. Of course, other force feedback commands may be constructed in addition to, or as alternatives to, the following sample force feedback commands.

Rate control refers to a user object mapping in which the displacement of the user object 34 along one or more provided degrees of freedom is abstractly mapped to motion of a computer-simulated entity under control, such as an airplane, race car, or other simulated "player" or player-controlled graphical object. Rate control is an abstraction which makes force feedback less intuitive because there is not a direct physical mapping between object motion and commanded motion of the simulated computer entity. Nevertheless, many interesting force feedback sensations can be implemented within rate control paradigms. In contrast, position control refers to a user object mapping in which displacement of the joystick handle or other user manipulable object directly dictates displacement of a simulated computer entity, so that the fundamental relation between joystick displacements and computer displacements is present. Thus, most rate control paradigms are fundamentally different from position control in that the user object (joystick) can be held steady at a given position but the simulated entity under control is in motion at a given commanded velocity, while the position control paradigm only allows the entity under control to be in motion if the user object is in motion. Position control host commands are described in greater detail below with respect to FIG. 14, while rate control commands are described presently with reference to FIG. 9.

For example, a common form of rate control is a velocity derived abstraction in which displacement of the user object, such as a joystick handle, dictates a velocity of the simulated computer entity, such as a vehicle or other graphical object displayed on display screen 20, in a simulated environment. The greater the joystick handle is moved from the original position, the greater the velocity of the controlled vehicle or player-controlled graphical object. Such control paradigms are very popular in computer games where velocity of a spacecraft or race car is dictated by the displacement of the joystick. Like most rate control paradigms, velocity control allows the joystick to be held steady at a given position while the entity under control is in motion at a given commanded velocity. Other common rate control paradigms used in computer games are acceleration controlled. An acceleration controlled paradigm is termed "thrust" control by those skilled in the art. While velocity control dictates the speed of the entity under control, thrust control dictates the rate of change of speed. Under thrust control, the joystick can be still and centered at zero displacement, yet the commanded computer entity can be in motion.

In force feedback schemes, rate control force feedback commands roughly correspond to forces which would be exerted on a vehicle or other simulated entity controlled by the simulated environment through the force feedback interface device 14. Such forces are termed vehicle-centric forces. For example, in a thrust control paradigm, a user's simulated speed boat may move into thick mud, but the user would not directly feel the mud. However, the user would feel the speed boat's engine straining against a force opposing the boat's motion. These opposing forces are relayed to the user through interface device 14. Other simulated characteristics or objects in the simulated environment can have an effect on the player-controlled simulated entity and thus affect the forces output to the user.

Herein, rate control commands are divided into "conditions" and "overlays," although other classifications may be used in alternate embodiments. Conditions set up a basic physical model or background sensations about the user object including simulated stiffness, simulated damping, simulated inertias, deadbands where simulated forces diminish, and directional constraints dictating the physical model's functionality. Multiple conditions may be specified in a single command to effectively superpose condition forces. Overlays, in contrast, are forces that may be applied in addition to the conditions in the background. Any number of overlays can preferably be provided in addition to condition forces. A condition can be specified by one condition command or by multiple condition commands.

Descriptions will now be provided for several types of forces 302, as referenced in table 300, that can be implemented by microprocessor 26 from host commands. These forces include: restoring force, restoring spring, vector force, vibration, sluggish stick, wobble, unstable, button reflex jolt, and ratchet force. The restoring force, restoring spring, sluggish stick, and unstable forces are considered condition forces. The vector force, vibration, wobble, button reflex jolt, and ratchet forces are considered overlay forces.

The forces 302 shown in table 300 can be implemented with host commands provided by host computer 12 to microprocessor 26. Examples 304 of host commands and their syntax are shown in table 300 for each type of force 302. In the described embodiment, host commands 304 preferably include a command portion 306 and a number of command parameters 308. Commands 304 indicate the type of force which the host computer 12 is instructing the processor 26 to implement. This command portion may have a corresponding reflex process which the processor 26 can retrieve from memory 27 and implement; this process is described in greater detail below. Command portions 306 can be specified in virtually any form in other embodiments; in table 300, a command is typically provided in a high-level form, close to English, so that the type of force which the command implements can be easily recognized by a programmer or software developer.

Command parameters 304 are values or indicators provided by the host computer 12 which customize and/or modify the type of force indicated by command portion 304. Many of the commands use magnitude, duration, or direction command parameters. Some commands include a style parameter which often modifies a force's direction. Other particular command parameters are provided for specific forces, as described in detail below.

For the following preferred rate control embodiments, most of the command parameters control different forces in the same way. The magnitude parameter is a percentage of a maximum magnitude corresponding to a maximum force able to be output by actuators 30. The duration parameter usually corresponds to a time interval for applying the particular force model. However, it is sometimes set to a predetermined value, such as zero or −1, to extend indefinitely the force model's application time. The force model would thus remains in effect until the host computer 12 provides a new host command with a new force or sends a clear command. The style parameter may select a direction in which to apply the force model, and/or a degree of freedom along which to apply the force model. For example, valid directions usually include one of a common joystick's two axes or a diagonal specified as a combination of the two. Of course, the style parameter could specify the force application along any degree of freedom or combination of degrees of freedom. Alternatively, separate force commands could be used for each degree of freedom or force commands. The style parameter can vary depending on the particular force model commanded, as described below.

Although not listed in FIG. 9, all of the described types of forces 302 can have additional parameters or incorporate other properties into the listed parameters. A "deadband" parameter could specify a size of a region where a force would be small or zero. A parameter can be included indicating whether a force is bi-directional or unidirectional along a degree of freedom. Note that uni-directional forces can have either a positive or negative sense. For some host commands, the deadband and bi-directional/uni-directional parameter can be included in the style parameter.

Subclass 310 indicates a classification of the types of forces 302. Forces 302 are shown as either conditions or overlays, as explained above. The condition commands are described below before the overlay commands.

Figure 10A:
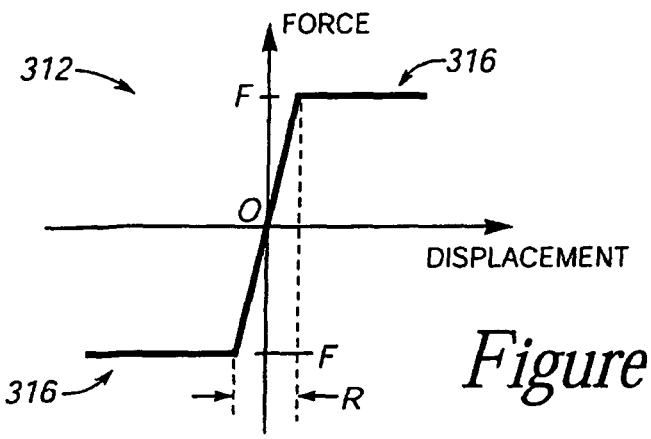
FIGS. 10a-c are diagrammatic representations of restoring force profiles.
Figure 10B:
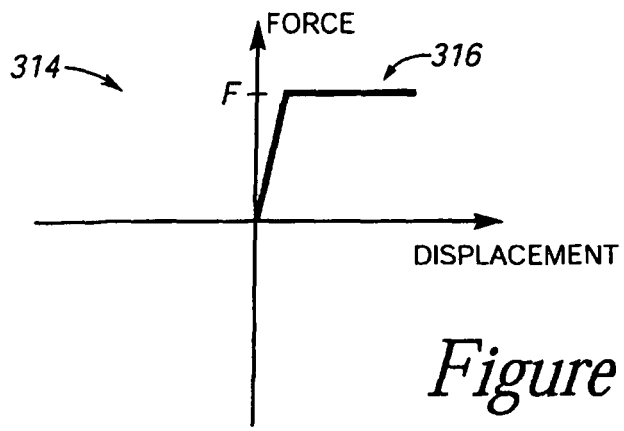
Figure 10C:
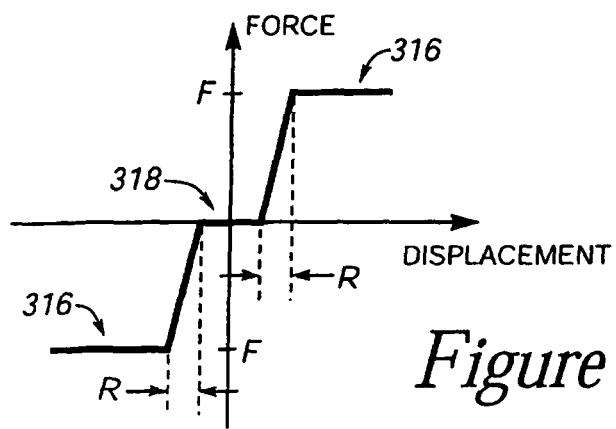

FIGS. 10a-c are graphs illustrating force versus displacement profiles for a restoring force. The force in graph 312 of FIG. 10a is bi-directional, where the force on the right side of the vertical axis is applied in one direction along a degree of freedom, and the force on the left side of the vertical axis is applied in the opposite direction along that degree of freedom. The force shown in graph 314 of FIG. 10b is unidirectional. Preferably, whether the force is uni-directional or bi-directional is specified with, for example, the style parameter 308 of the command 306 shown in table 300 of FIG. 8 (and, if uni-direction, a positive or negative sense to indicate the particular direction). In addition, the desired degrees of freedom along which the restoring force is to be applied are also preferably specified in the style parameter. For example, an "X" parameter could indicate the "X" degree of freedom, while an "XY" parameter can indicate a restoring force along both X and Y degrees of freedom (e.g., a diagonal restoring force).

A restoring force applied to user object 34 always points back towards an origin position O (or "neutral position") of the user object along a degree of freedom. For example, the origin position for a joystick can be the joystick's center position, as shown in FIGS. 7 and 8. The magnitude of restoring force, specified by the magnitude command parameter, generally remains constant in either direction for the range 316 along the degree of freedom of the user object. The maximum force magnitude F is preferably limited to about 75% of the maximum possible output force in a the selected degree of freedom, so that jolts and vibrations can be overlaid on top of the restoring sensation (described below). As the object is moved toward the origin position O, the applied force is constant until the user object is moved within a localized region R about the origin position. When the user object is in the localized region R, the applied force rapidly drops to zero or a small value. Thus, the restoring force profile provides a constant "restoring sensation" that forces the user object back to the origin position when the object is in range 316. This restoring forces then diminishes or vanishes as the object nears and reaches the origin position. The restoring force's direction can be automatically controlled by the local microprocessor 26.

In FIG. 10c, the restoring force is shown similarly to the force in FIG. 1a, except that the applied force is about zero in an extended region 318, about the origin position. Region 318 is known as a "deadband", and allows the user to have some freedom to move object 34 for a short distance around the origin before forces are applied. The specification of deadband 318 for an applied restoring force can be a value included, for example, as a separate deadband command parameter, or, alternatively, as part of the style parameters 308 of the restoring force host command.

A restoring force sensation can be very ably applied in a rate control paradigm to the situation of hitting a wall or some other obstruction while controlling a simulated vehicle. The restoring force indicates a resistance against commanding a velocity in a direction of motion. This force drops off when the user object is returned to the origin position because the user is no longer commanding a velocity in the direction of motion. If there is no obstruction in the reverse direction, the restoring force would be unidirectional.

Figure 11A:
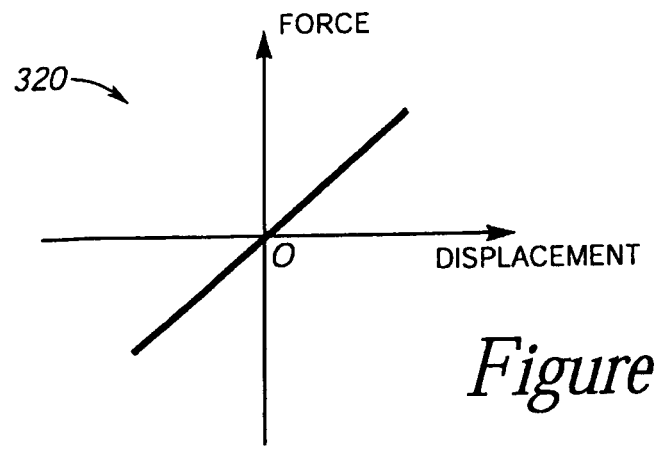
FIGS. 11a-c are diagrammatic representations of restoring spring force profiles.
Figure 11B:
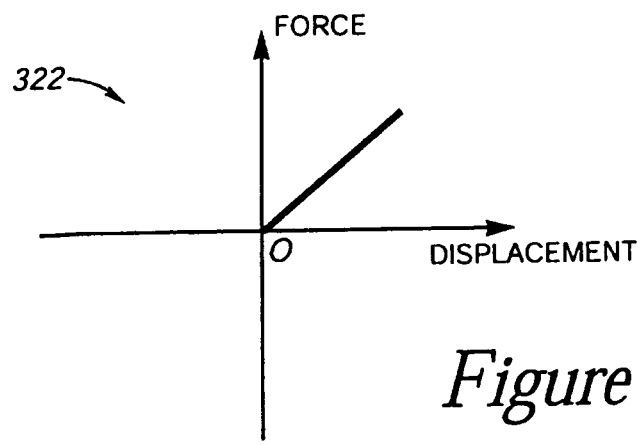
Figure 11C:
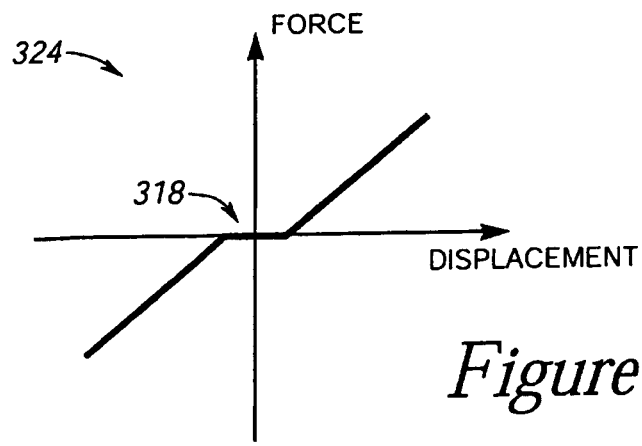

FIGS. 11a-11c are graphs illustrating force versus displacement profiles for a restoring spring force. Rather than maintaining a constant magnitude over its positive or negative displacement, as provided by the restoring force of FIGS. 10a-10c, a restoring spring force varies linearly over an appreciable portion of the user object's displacement, and is proportional to the object 34's distance from the origin position O. A restoring spring force applied to the user object always points back towards the neutral position along a degree of freedom. In FIGS. 11a-11c the restoring spring force reaches its maximum at maximum displacement of object 34 from the origin position O. Graph 320 of FIG. 11a shows the bi-directional case, and graph 322 of FIG. 11b shows the uni-directional case. A deadband specified by a deadband parameter is provided about the origin position, as shown in graph 324 of FIG. 11c.

The parameters for the restoring spring force can, for example, be substantially similar to the parameters for the restoring force as described above. Alternatively, instead of a magnitude parameter, the restoring spring force can have a spring coefficient parameter to describe a desired "stiffness" of the object 34. The spring coefficient parameter can be used in well known equations to calculate the force on the user object. Either the coefficient or magnitude parameter may be used.

The sluggish force creates a damping force on user object 34 having a magnitude proportional to the velocity of the user object when moved by the user. An example of this type of damping force is described above with respect to step 82 of FIG. 4. The degree of "viscosity" of the sluggish force can be specified by a viscous damping coefficient included as a command parameter in the host command. Since the sluggish stick force depends directly upon velocity, the coefficient command parameter can be expressed as a percentage of a maximum damping coefficient, and replaces the magnitude parameter of previously discussed host commands. The style command parameter for the sluggish host command can include the specified degrees of freedom to apply the sluggish force, as well as a uni-directional or bi-directional indication. The sluggish stick force is particularly suited for rate control applications to simulate controlling, for example, a very heavy vehicle that is poorly responsive to the movement of the user object.

The unstable force creates an inverted pendulum style instability. Alternatively, the unstable force is modeled on a spring having a negative spring constant (an unstable or diverging spring). A force is applied to the user object in a direction away from the object's origin position and is increased as the user object is moved further away from the origin position. This creates a force that makes it difficult for the user to bring the object to the origin position. The command parameters for an unstable host command can include similar parameters to the restoring forces described above; for example, a command parameter indicating the percentage of maximum degree of "instability" can be provided, where the instability can be defined in terms of a maximum output force. This force can be used as another vehicle-related sensation, and could replace a restoring spring force when, for example, a simulated vehicle guidance control is damaged. The instability would typically make a computer game very hard to play.

In alternative embodiments, the condition forces described above can be commanded using only one host command with a number of parameters to control the characteristics of the condition forces. For example, a host command such as COND_X (K+, K−, DB, B+, B−, N_Offset, Sat+, Sat−, m)

can be sent to microprocessor 26 from host computer 12. This command specifies certain physical parameters of a model of the user object in one degree of freedom. The K parameters indicate a proportional stiffness for displacements of the user object in two directions along a degree of freedom. The DB parameter indicates the deadband range as a percentage of a maximum allowed deadband distance. The B parameters indicate a velocity proportional damping for the velocity of the user object in two directions along a degree of freedom. The N_offset parameter can be specified as the offset from the modeled neutral position of the springs (defined by the K parameters). The Sat parameters indicate the maximum (saturation) allowed force value for displacements of the user object, expressed, for example, as a percentage of the maximum possible force. The m parameter indicates a simulated mass of the user object which can be applied in the physical model for computing gravitational or inertial forces on the user object, for example. A condition command as provided above can be used for each provided degree of freedom of user object 34; for example, COND_X can provide the condition forces in the degree of freedom about the x-axis. The command can implement the restoring force, restoring spring force, sluggish force, and unstable force by adjusting the various command parameters.

The condition commands can be provided in the background while overlay commands are applied in addition to or "over" the condition forces. For example, a sluggish damping force can be provided as a background force to the user object, and a "jolt" overlay force can be commanded over the sluggish force to provide a quick, jerky motion on the user object for a few seconds. Of course, overlay forces may also be applied exclusively when no other forces are being applied, or may cancel other previously-commanded forces if desired. The example overlay forces shown in FIG. 9 are described below.

Figure 12:
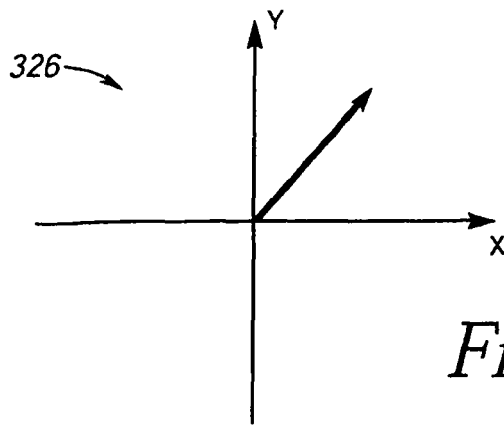
FIG. 12 is a diagrammatic representation of a vector force.

FIG. 12 is a graph 326 illustrating a vector force model. A vector force is an overlay command, and thus can be applied in addition to the condition forces described above. It is a general force applied to the joystick in a given direction specified by a direction command parameter. The direction command parameter can be provided, for example, as an angle in the X-Y plane for a two-degree-of-freedom interface apparatus. As for many of the condition force commands, the magnitude of the vector force can be specified as a percentage of a maximum magnitude. FIG. 12 shows a two-dimensional representation of the vector force in an example direction in the X-Y plane of a user object having two degrees of freedom.

Figure 13A:
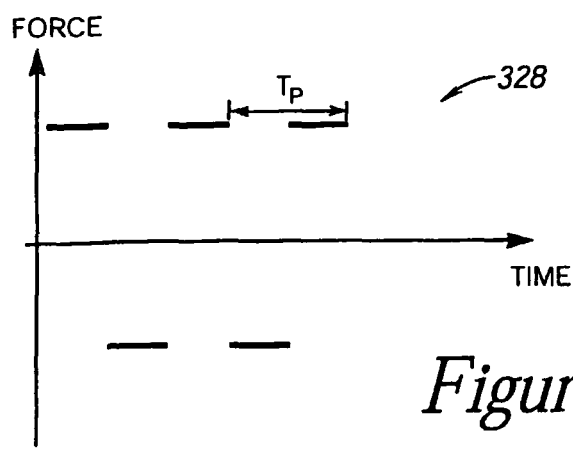
FIGS. 13a-b are diagrammatic representations of vibration force profiles.
Figure 13B:
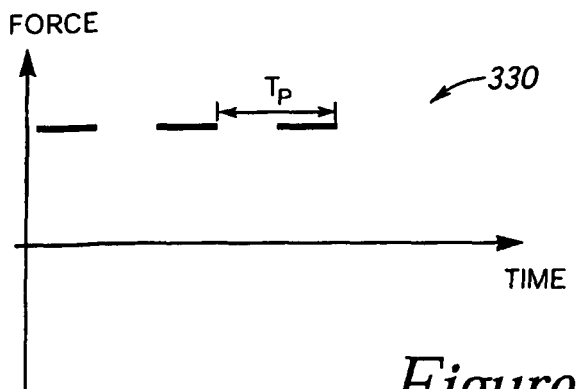

FIGS. 13*a*-13*b* are graphs illustrating force versus time profiles for a vibration force. FIG. 13*a* is a graph 328 showing a bi-directional vibration force while FIG. 13*b* is a graph 330 showing a uni-directional vibration force. The vibration command shown in FIG. 9 accepts magnitude, frequency, style, direction, and duration command parameters. The frequency parameter can be implemented as a percentage of a maximum frequency and is inversely proportional to a time interval of one period, $T_P$. The direction command parameter can be implemented as an angle, as described above with reference to FIG. 12. The style parameter can indicate whether the vibration force is uni-directional or bi-directional. In addition, a duty cycle parameter can be provided in alternate embodiments indicating the percentage of a time period that the vibration force is applied. Also, a command parameter can be included to designate the "shape" or profile of the vibration waveform in the time axis, where one of a predetermined number of shapes can be selected. For example, the force might be specified as a sinusoidal force, a sawtooth-shaped force, a square waveform force, etc.

A wobble force paradigm is another overlay force that can be commanded by host computer 12. This force creates a random (or seemingly random to the user), off-balance force sensation on the user object. For example, it can simulate an erratic control for a damaged vehicle. The magnitude, duration, and style command parameters can be similar to parameters for the above host commands. The style parameter might also specify a type of wobble force from a predetermined list of different types. The wobble force can be implemented using a variety of methods. For example, a preprogrammed "force profile" stored in memory can be implemented to cause a force sensation that seems random. Or, an equation can be used to calculate a force based on a sine wave or other function or a random result.

The jolt force is typically a short, high magnitude force that is output on the user object, and can be used, for example, to notify the user of an event or simulated object in the computer environment. The jolt force can be used as an overlay force which can be felt in addition to any condition forces in effect. Typical parameters include the magnitude of the force of the jolt, the duration of the jolt, and direction(s) or degree(s) of freedom in which the jolt is applied, which can be specified as an angle or particular degrees of freedom. The magnitude command parameter preferably specifies the magnitude of the jolt force in addition to (above) any other condition or overlay force magnitudes, i.e., the magnitude is a differential magnitude "above" the steady state forces. Thus, the actual magnitude output by actuators 30 may be greater than the jolt force magnitude.

The button force is not an actual force but may be used as a command to trigger other forces when an input device 39 is activated by the user. In many game situations, for example, it may be advantageous to trigger a force as a direct response to pressing a button or other input device 39 on the interface apparatus 14 rather than generating the force from a host command after processing the pressed button on the host computer 12. The other forces triggered by the pressing of the button can be specified as a command parameter in the button command; alternatively, a specific button command can be provided for each type of force.

For example, a common force to use in conjunction with a button command is the jolt force. A specific command, e.g., BUTTON_JOLT, can be provided to cause a jolt force whenever a specified button is pressed, and which includes button and jolt command parameters. Alternatively, a button command with a JOLT command parameter may be implemented. When the button jolt command is received by microprocessor 26, the microprocessor can run a button check as a background process until commanded to terminate the button background process. Thus, when the microprocessor 26 determines that the user has pressed a button from the sensor data, the jolt force can be overlaid on any existing forces that are output.

The button command sets up the microprocessor 26 to output a force when the other input device 39 has been activated. The button command may accept a number of command parameters including, for example, button and autofire frequency parameters (in addition to any command parameters specific to the desired force to be output when the button is pressed). The button parameter selects the particular button(s) which the microprocessor 26 will check to be activated by the user and which will provide the desired forces. For example, a joystick may have multiple buttons, and the software developer may want to provide a force only when a particular one of those buttons is pressed. A duration parameter can determine how long the jolt lasts after the button is pressed. The "autofire" frequency parameter designates the frequency of a repeating force when the user holds down a button. For example, if the user holds down a particular button, the microprocessor can automatically repeat a jolt force after a predetermined time interval has passed after the user first pressed the button. The autofire parameter can also optionally designate whether the autofire feature is being used for a particular button and the desired time interval before the repeating forces are applied.

Other rate control commands not shown in the table of FIG. 9 can also be implemented. For example, if actuators 30 are passive actuators, a "ratchet" force can be provided by sending a ratchet command and appropriate command parameters. This command can simulate an obstruction which causes, for example, a user-controlled vehicle to strain in a given degree of freedom. Thus, a force may be applied when the user moves the joystick in one direction, then no force is applied when the user moves the joystick in the opposite direction, and force is again applied when the joystick is moved in the original direction. This simulates an obstruction force at any retraction point, like a ratchet. The style parameters for such a command can indicate a fixed obstruction or a ratchet-style obstruction.

This concludes the description of rate control commands and force models.

FIG. 14 is a table 332 showing a number of preferred position control host commands that can be used in the embodiment of FIG. 5. Herein, "position control" refers to a mapping of a user object in which displacement of the joystick handle or other user object directly dictates displacement of a computer-simulated entity or object. The mapping can have an arbitrary scale factor or even be non-linear, but the fundamental relation between user object displacements and computer object or entity displacements should be present. Under a position control mapping, the computer-controlled entity does not move unless the user object is in motion; a static user object dictates static commands to microprocessor 26 from host computer 12.

Position control is not a popular mapping for traditional computer games, but may be used in other applications such as medical procedure simulations or graphical user interfaces. Position control is an intuitive and effective metaphor for force feedback interactions because it is a direct physical mapping rather than an abstract control paradigm. In other words, because the user object experiences the same physical manipulations as the entity being controlled within the computer, position control allows physical computer simulations to be directly reflected as realistic force feedback sensations. Examples of position control in computer environments might be controlling a paddle in a pong-style tennis game or controlling a cursor in a windows desktop environment.

Contrasted with rate control's vehicle-centric forces, position control force feedback roughly corresponds to forces which would be perceived directly by the user. These are "user-centric" forces. For example, a paddle displayed on display screen 20 and directly controlled by a user might move through simulated thick mud. Via the force feedback interface device 14, the user would perceive the varying force associated with movement through a viscous solution. Corresponding to the realistic physical situation, the force varies with the speed of motion of the joystick (and displayed paddle) and orientation of the paddle face.

Descriptions will now be provided for several types of position control forces 334, as referenced in table 332, that can be implemented by microprocessor 26 from host commands. These forces include: vector, groove, divot, texture, barrier, field, paddle, and button reflex jolt. Many of the examples 336 of host commands corresponding to these forces use magnitude and style parameters as discussed with reference to the rate control paradigms. As with the rate control commands, command parameters of the same name generally have the same properties for different host commands. However, the duration parameter is typically not used for position control commands as much as for rate control commands, since the duration of the position control forces are typically applied depending on the current position of the user object. The position control force models thus generally remain in effect until the host computer 12 issues a new host force command or a clear command. In alternate embodiments, a duration parameter can be used.

Preferred parametrizations for described position control commands are summarized in FIG. 14. All the forces listed below can include additional command parameters, such as deadband parameters, or incorporate other properties into the parameters listed in FIG. 14. Similar to the host commands shown in FIG. 9, host commands 336 preferably include a command portion 338 and a number of command parameters 340. Commands 336 indicate the type of force which the host computer 12 is instructing the processor 26 to implement. This command portion may have a corresponding reflex process which the processor 26 can retrieve from memory 27 and implement. Command portions 338 can be specified in virtually any form in other embodiments.

A vector force is a general force having a magnitude and direction. Refer to FIG. 12 for a polar representation of the vector force. Most position control sensations will be generated by the programmer/developer using a vector force command and appropriate instructions and programming constructs. A duration parameter is typically not needed since the host 12 or microprocessor 26 can terminate or modify the force based on user object motions, not time.

Figure 15:
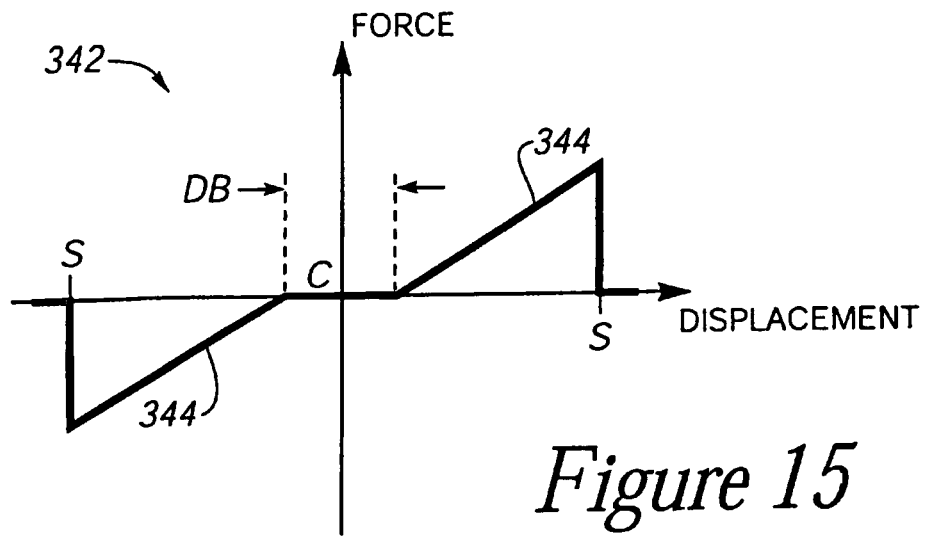
FIG. 15 is a diagrammatic representation of a groove force profile.

FIG. 15 is a graph 342 showing a force versus displacement relationship for a groove force of the present invention. The groove force provides a linear detent sensation along a given degree of freedom, shown by ramps 344. The user object feels like it is captured in a "groove" where there is a restoring force along the degree of freedom to keep the stick in the groove. This restoring force groove is centered about a center groove position C located at the current location of the user object when the host command was received. Alternatively, the location of the center groove position can be specified from a command parameter along one or more degrees of freedom. Thus, if the user attempts to move the user object out of the groove, a resisting force is applied.

The magnitude (stiffness) parameter specifies the amount of force or resistance applied. Optionally, a "snap-out" feature can be implemented within the groove reflex process where the groove forces turn off when the user object deviates from the groove by a given snap-out distance, shown as distance S. Thus, the microprocessor 26 would receive a groove command having a snap distance magnitude. When the microprocessor detects the user object moving outside this snap distance, it turns off the groove forces. This snap-out feature can be implemented equally well by the host computer 12 sending a clear command to turn off forces. Also, a deadband DB can also be provided to allow the user object to move freely near the center groove position C, specified with a deadband command parameter. A style command parameter indicates the orientation of the groove along one or more degrees of freedom (e.g., horizontal, vertical, diagonal). For example, horizontal and vertical grooves can be useful to provide forces for scroll bars in windows. A user moving a cursor in a graphical user interface can feel groove forces moving the cursor and user object toward the middle of the scroll bar. The deadband gives the user room to move the cursor within the scroll bar region. The snap-out distance can be used to free the cursor/user object from forces once the cursor is moved out of the scroll bar region.

A divot is essentially two (or more) orthogonal grooves that provide restoring forces in more than one degree of freedom. This provides the sensation of a point detent along a given degree of freedom. If the divot is provided in two degrees of freedom, for example, then the user object feels as it if has been captured in a circular depression. The user object is captured at a point where there is a restoring force along both axes to keep the user object at the point. The snap-out feature of the groove force can also be implemented for the divot. In addition, the deadband feature of the groove can be provided for the divot command.

A texture force simulates a surface property, as described above with reference to FIG. 4. A texture is a spatially varying force (as opposed to vibration, a time varying force) that simulates the force felt, for example, when a stick is moved over a grating. Other types of textures can also be simulated. The user object has to be moved to feel the texture forces, i.e., each "bump" of the grating has a specific position in the degree of freedom. The texture force has several characteristics that can be specified by a programmer/developer using the host command and command parameters. These command parameters preferably include a magnitude, a grit, and a style. The magnitude specifies the amount of force applied to the user object at each "bump" of the grating. The grit is basically the spacing between each of the grating bumps. The style command parameter can specify an orientation of the texture. For example, the style can specify a horizontal grating, a vertical grating, or a diagonal grating (or a superposition of these gratings). Furthermore, the style parameter can specify if the texture is felt bi-directionally or uni-directionally along a degree of freedom. Alternatively, additional command parameters can be provided to control the position of the "bumps" of the texture force. For example, information can be included to instruct the distance between bumps to vary exponentially over a distance, or vary according to a specified formula. Alternatively, the texture spacing could vary randomly. In yet other embodiments, the command parameters can specify one of several available standard texture patterns that microprocessor 26 can retrieve from memory.

Figure 16:
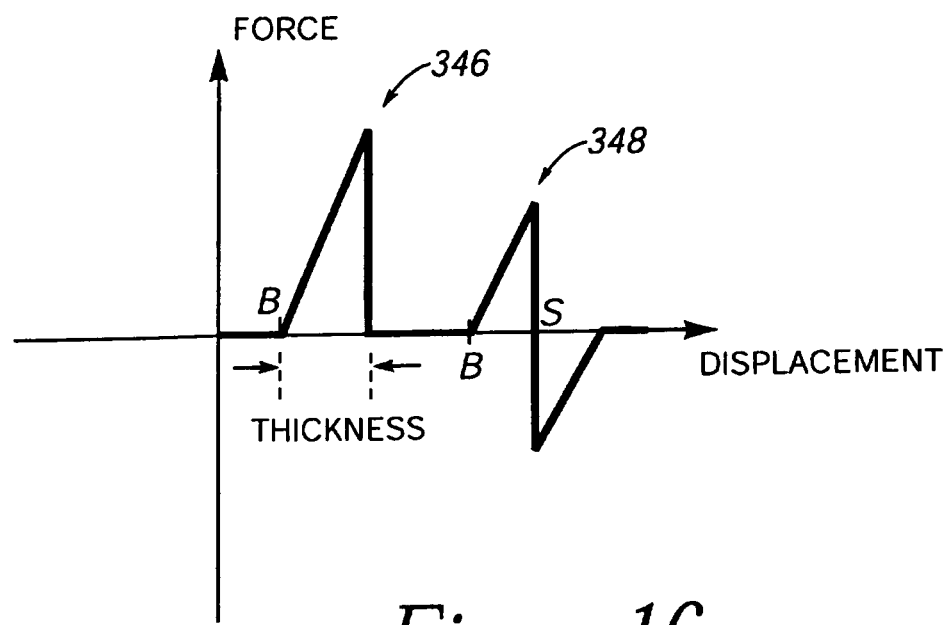
FIG. 16 is a diagrammatic representation of a barrier force profile.

A barrier force, when commanded, simulates a wall or other obstruction placed at a location in user object space, and is described above with reference to FIG. 4. The host command can specify the hardness of the barrier (magnitude of the force applied), the location of the barrier along the degree of freedom, and the snap distance or thickness of the barrier. A barrier can also be provided with a compliance or springiness using a spring constant. Horizontal barriers and vertical barriers can be provided as separate host commands, if desired. As indicated in graph 346 of FIG. 16, a barrier force only has a finite thickness. The force increases steeply as the user object is moved closer into the barrier (past point B). The snap-through distance defines the size of the region where the barrier is felt by the user. If the user object is moved into a barrier, and then is moved past the thickness of the barrier, the barrier force is turned off. The barrier force can act as a hard obstruction, where the microprocessor provides maximum force magnitude to the user object 34, or as a bump or softer barrier, where a smaller force magnitude is applied (as specified by the magnitude command parameter). The barrier can remain for an extended period unless removed or moved to a new location. Multiple barriers can also be provided in succession along a degree of freedom.

Alternatively, the barrier force can be provided by sending a host command having only two command parameters, hardness and location. The hardness parameter can specify the height and slope of the resistive force. As shown in graph 348 of FIG. 16, the user object can move from left to right along the distance axis. The user object feels a resistive force when hitting the barrier at point B. After the user object has been moved to point S (the snap-distance), the force is applied to the user object in the opposite direction (a negative magnitude force), which decreases as the user object is moved in the same direction. This simulates a bump or hill, where the force is resistive until the user object is moved to the top of the bump, where the force becomes an assisting force as the object is moved down the other side of the bump.

A force field type force attracts or repulses the user object with respect to a specific position. This force can be defined by command parameters such as a field magnitude and the specific field origin position which the force field is applied with respect to. A sense parameter can be included to indicate an attractive field or a repulsive field. For example, the force field can be an attractive field to simulate a force of gravity between the field origin position and a user-controlled cursor or graphical object. Although the field origin position can be thought of as a gravitational mass or an electric charge, the attractive force need not depend on the inverse square of displacement from the specific position; for example, the force can depend on an inverse of the displacement. The attractive force field also attempts to maintain the user object at the field origin position once the user object has been moved to that position. A repulsive field operates similarly except forces the user object away from a specified field origin position. In addition, ranges can be specified as additional command parameters to limit the effect of a force field to a particular distance range about the field origin position.

FIGS. 17a-17i are diagrammatic illustrations of a "paddle" computer object 350 interacting with a "ball" computer object or similar object 352. These computer objects can be displayed on display screen 20 by host computer 16. The force interactions between the ball and paddle can be controlled by a software developer using a host command, as explained below. In the described example, paddle object 350 is controlled by a player by a position control paradigm such that the movement of paddle object 350 is directly mapped to movement of user object 34. In alternate embodiments, ball object 352 or both objects can be controlled by players.

Figure 17A:
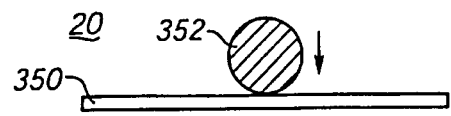
FIGS. 17a-17i are diagrammatic illustrations of a paddle and ball interaction controlled by a paddle command of the present invention.
Figure 17B:
Figure 17C:

FIGS. 17a-17h show how paddle object 350 interacts with a moving ball object 352 as ball object 352 collides with the paddle object. In FIG. 17a, ball 352 first impacts paddle 350. Preferably, an initial force is applied to user object 34 in the appropriate direction. In FIGS. 17b and 17c, ball 352 is moving into the compliant paddle or "sling". Preferably, a force based on a simulated mass of ball 352 is felt by the user through user object 34 which is appropriate to the simulated velocity of the ball (and or the paddle), the simulated compliance of the paddle (and/or the ball), and the strength and direction of simulated gravity. These factors (and other desired physical factors) can preferably be set using a host command with the appropriate parameters. For example, the following host command can be used:

PADDLE (B_mass, B_vel_x, B_vel_y, Gravity, Sense, Compliance_X, Compliance_Y, style)

where the command parameter B_mass indicates the simulated mass of the ball, B_vel_x and B_vel_y are the velocity of the ball, gravity is the strength of gravity, sense is the direction of gravity, and Compliance_X and Compliance_Y are the simulated compliance or stiffness of the paddle object 34. Other parameters can also be included to control other physical aspects of the computer environment and interaction of objects. For example, a simulated mass of the paddle can also be specified. Also, the ball 352 can be displayed as a compressed object when it impacts paddle 350, with, for example, a reduced height and an oval shape. In addition, damping parameters in the x and y axes can also be included in the paddle command to add a damping force to the collision between the ball and paddle in addition to the compliance (spring) force. Also, the parameters such as the compliance and/or damping of the paddle might be allowed to be adjusted by the user with other input 39 or a third degree of freedom of user object 34. The style parameter of the paddle command might select one of several different predetermined paddle configurations that are available and stored in, for example, memory 27. The configurations can have different paddle lengths, widths, compliances, or other displayed and/or force characteristics of a paddle.

Figure 17D:
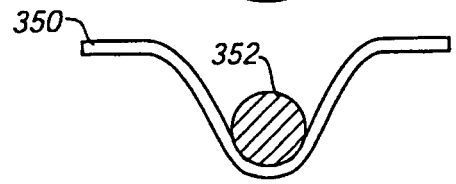
Figure 17E:
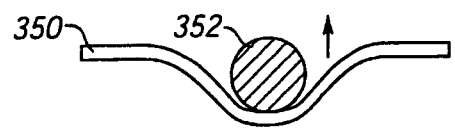
Figure 17F:
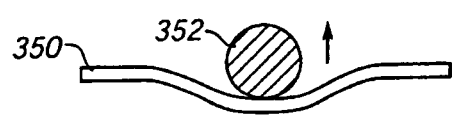
Figure 17G:
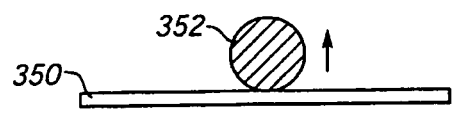
Figure 17H:
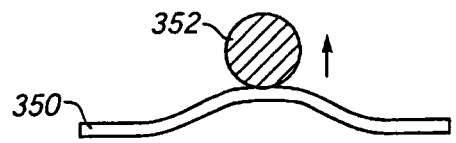

In FIG. 17d, the ball has reached a maximum flexibility point of paddle 34 and can no longer move in the same direction. As shown in FIGS. 17e through 17g, the ball is forced in the opposite direction due to the compliance of the paddle. In addition, the user may preferably exert force on user object 34 to direct the ball in a certain direction and to add more velocity to the ball's movement. This allows the user a fine degree of control and allows a significant application of skill in directing the ball in a desired direction. The force feedback paddle is thus an improved component of "pong" type and other similar video games. In addition, the paddle 350 can optionally flex in the opposite direction as shown in FIG. 17h. An interface apparatus providing two linear (X and Y) degrees of freedom to user object 34 as well as a rotating ("spin") third degree of freedom about the Z axis (or C axis is FIG. 6) is quite suitable for the paddle-ball implementation. Linear degree of freedom apparatuses are disclosed in co-pending application Ser. No. 08/560,091, filed Nov. 17, 1995 on behalf of Rosenberg and Schena, entitled, "Method and Apparatus for Providing Low Cost Force Feedback and Mechanical I/O for Computer Systems," and U.S. Pat. No. 5,721,566 previously incorporated herein.

Figure 17I:
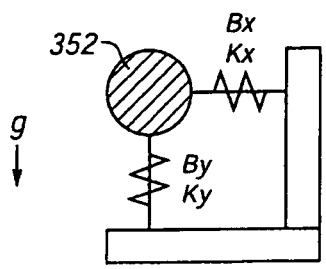

A schematic model of the forces interacting between ball 352 and paddle 350 is shown in FIG. 17i. A spring force indicated by spring constant K is provided in both degrees of freedom X and Y to indicate the springiness of the paddle 350; g is a gravity direction. In addition, a damping force indicated by damping constant B is also provided to slow the ball 352 down once it contacts paddle 350. The spring and damping forces can also be applied in one degree of freedom.

The paddle control algorithm is a dynamic algorithm in which microprocessor 26 computes interaction forces while a ball compresses the paddle and then releases from the paddle. The paddle command is sent by host computer 12 when the ball contacts the paddle. The paddle command reports ball location to the host computer so that the host can update graphics displayed on display screen 20 during the interaction period. In presently preferred embodiments, the updates only need to be provided at about 60 Hz to the host, since most displays 20 can only display at that rate. However, the forces should be computed and output at about 500 Hz or more to provide a realistic "feel" to the interaction. Thus the local microprocessor can compute the forces quickly while occasionally reporting the sensor readings of the paddle to the host at a slower rate. Other types of video game or simulation interactions can also be commanded with a high-level host command in a similar fashion. In addition, in alternative embodiments, host computer 12 can control the actuators 30 directly to implement the paddle and ball force feedback, without sending any high level host commands.

Figure 17J:
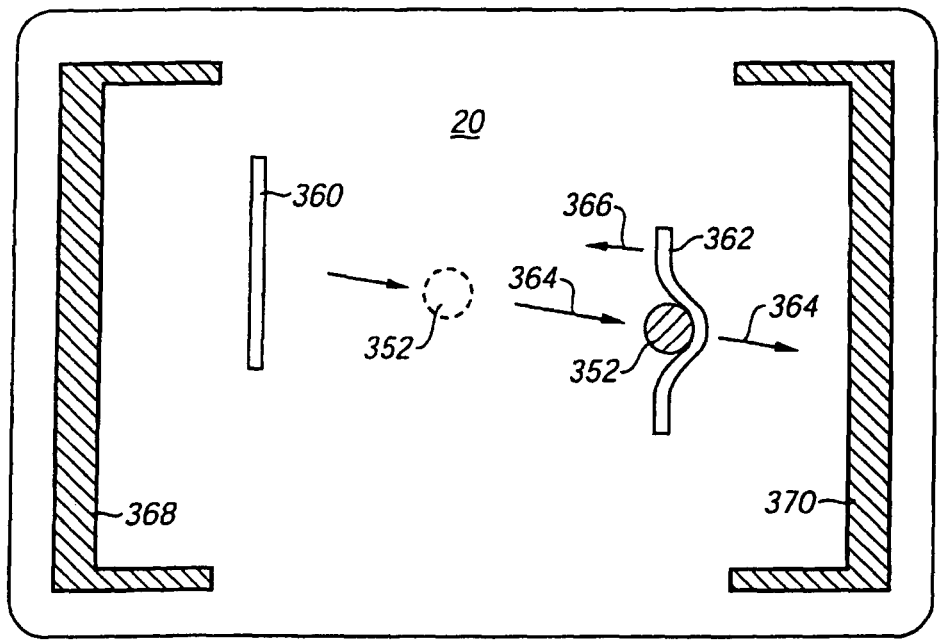
FIGS. 17j-k are diagrammatic illustrations of paddle and ball embodiments displayed on a display screen.
Figure 17K:
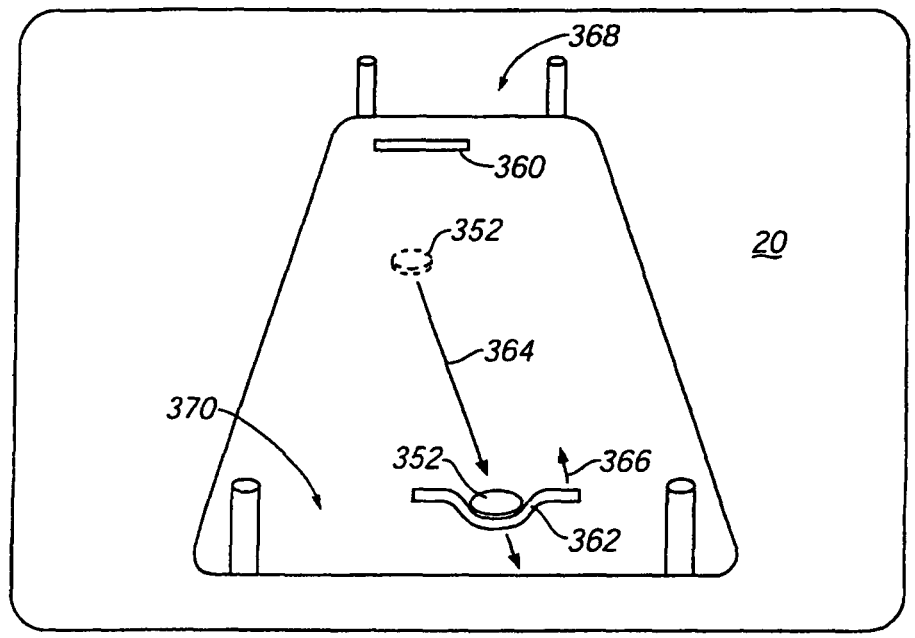

FIG. 17j is a diagrammatic illustration of a 2-D implementation of displayed graphical objects on display screen 20 which can be implemented with the paddle host command described above. Paddle 360 can be controlled by host computer system 12, and paddle 362 can be controlled by the user by physically manipulating the user object. Ball 352 can be moved on display screen 20 according to simulated physical parameters, such as velocity, acceleration, gravity, compliance of objects, and other parameters as discussed previously. When the ball 352 collides with paddle 362, the paddle flexes, and the user feels the collision force. For example, if ball 352 is moving in direction 364, then the user feels a force in the equivalent degrees of freedom of user object 34. In some embodiments, both the paddle 362 and the ball 364 can be moved in direction 364 to simulate the paddle being pushed back by the ball. FIG. 17k shows a similar embodiment in which a perspective view (or simulated 3-D view) of the graphical objects is shown on display screen 20.

The user can also move the user object so that the paddle moves in a direction 366. The user will thus feel like he or she is "carrying" the weight of the ball, as in a sling. The ball will then be released from the paddle and move toward the other paddle 360. As is well known, a goal in such a game might be to direct the ball into the opposing goal. Thus, the user can try to direct the ball into goal 368, and the host computer can control paddle 360 to direct the ball into goal 370. Paddles 360 and 362 are used to block the ball from moving into the defended goal and to direct the ball back at the desired goal. By moving the paddle in a combination of direction 366 and up and down movement, the user can influence the movement of the ball to a fine degree, thus allowing a player's skill to influence game results to a greater degree than in previous games without force feedback. In addition, other features can be included to further influence the ball's direction and the forces felt by the user. For example, the orientation of the paddle can be changed by rotating the paddle about a center point of the paddle. This rotation might be sensed from a "spin" degree of freedom of the user object about an axis C, as described above with reference to FIGS. 6 and 7. Force feedback could thus be appropriately applied in that spin degree of freedom. Other features can also be provided, such as allowing a ball to "stick" to a paddle when the two objects collide and/or when a button is pressed by the user. The user could then activate the button, for example, to release the ball at a desired time.

In addition, paddle 360 can be controlled by another user rather than host computer 12. For example, a second interface device 14 can be connected to another input/output port of host computer 12 and can be used to control paddle 360 by a second user. Each player would therefore feel the forces on their respective paddle from the ball directed by the other player. In addition, if the two paddles 360 and 362 were brought into contact with one another, each player could feel the direct force of the other player on each player's user object. That is, a first user's force on his user object would cause his paddle 362 to move into the other paddle 360, which would cause both the first and second users to feel the collision force. If the first paddle 362 were allowed to push the other paddle 360 across the screen, then the second user would feel the first user's pushing force. The first user would feel similar forces from the second user. This creates the effect as if each player were pushing the other player directly. Such pushing or "tug of war" games between two users can take several different embodiments.

Furthermore, the second interface device 14 need not be connected to computer 12. Instead, host computer 12 can be coupled to a second host computer through a direct or network interface, as is well to those skilled in the art. The movement of a first user object would thus be communicated from the first host computer to the second host computer, which would then command forces on the second user object; and vice-versa The embodiment of FIG. 17k is appropriate for such an embodiment, where each user can view paddle 362 as the paddle under his own control on his own display screen 20 and paddle 360 as the other player's paddle.

This concludes the description of position control paradigms.

In addition, a clear command is preferably available to the host computer. This command can include a parameter specifying particular degrees of freedom and allows the host computer to cancel all forces in the specified degrees of freedom. This allows forces to be removed before other forces are applied if the programmer does not wish to superimpose the forces.

Also, a configuration host command can be provided. This command can initially set up the interface device 14 to receive particular communication parameters and to specify which input and output will be used for a particular application, e.g. the host computer can instruct local microprocessor 26 to report specific information to the host computer and how often to report the information. For example, host computer 12 can instruct microprocessor 26 to report position values from particular degrees of freedom, button states from particular buttons of interface device 14, and to what degree to report errors that occur to the host computer. A "request information" command can also be sent by host computer 12 to interface device 14 to receive information stored on the interface device 14 at the time of manufacture, such as serial number, model number, style information, calibration parameters and information, resolution of sensor data, resolution of force control, range of motion along provided degrees of freedom, etc. This information may be necessary to the host computer so that the commands it outputs to the local processor 26 can be adjusted and customized to the particular type of interface device 14. If the USB communication interface is used, other information necessary to that interface can be provided to the host upon a request command, such as vendor identification, device class, and power management information.

In addition, the above described forces can be superimposed. The host computer can send a new host command while a previous host command is still in effect. This allows forces applied to the user object to be combined from different controlling commands. The microprocessor 26 or host computer may prevent certain commands that have contradictory effects from being superimposed (such as a restoring force and a restoring spring). For example, the latest host command sent can override previous commands if those previous commands conflict with the new command. Or, the conflicting commands can be assigned priorities and the command with the highest priority overrides the other conflicting commands.

It should be noted that the high-level host commands and command parameters described above are merely examples for implementing the forces of the present invention. For example, command parameters that are described separately can be combined into single parameters having different portions. Also, the distinct commands shown can be combined or separated in different ways, as shown above with the example of the condition command for providing multiple rate control condition forces.

In addition to common interface devices with one or two rectangular or spherical degrees of freedom, such as standard joysticks, other interface devices can be provided with three or more degrees of freedom. When the third degree of freedom is about an axis along the stick itself, those skilled in the art call it "spin" or "twist." Each degree of freedom of a user object can have its own dedicated high-level host command. By independently associating high-level host commands to each degree of freedom, many possible combinations of position control, rate control, and other abstract mappings can be implemented with interface devices.

For example, for a common joystick with two degrees of freedom, a computer game might allow the joystick to control flight of a spacecraft. Forward-backward motion of the joystick handle might implement thrust control to dictate an acceleration of the spacecraft. Left-right motion of the joystick might implement direction control to dictate an angular velocity of the spacecraft's trajectory. This particular thrust-direction paradigm is particularly popular in current games, but there are many variations. For example, in a flight simulator, the forward-backward motion of the joystick might control the pitch of an aircraft while the left-right motion might control roll of the aircraft. In a driving game, the forward-backward motion of the stick might be a rate control mapping to an acceleration of the car, while the left-right motion might be a position control mapping to a location of the car across a span of road.

Multiple control paradigms may also be mixed in a single degree of freedom. For example, a joystick may have position control for small deviations from the origin in a degree of freedom and rate control for large deviations from the origin in the same degree of freedom. Such a mixed control paradigm can be referred to as a local position/global rate control paradigm.

Figure 18:
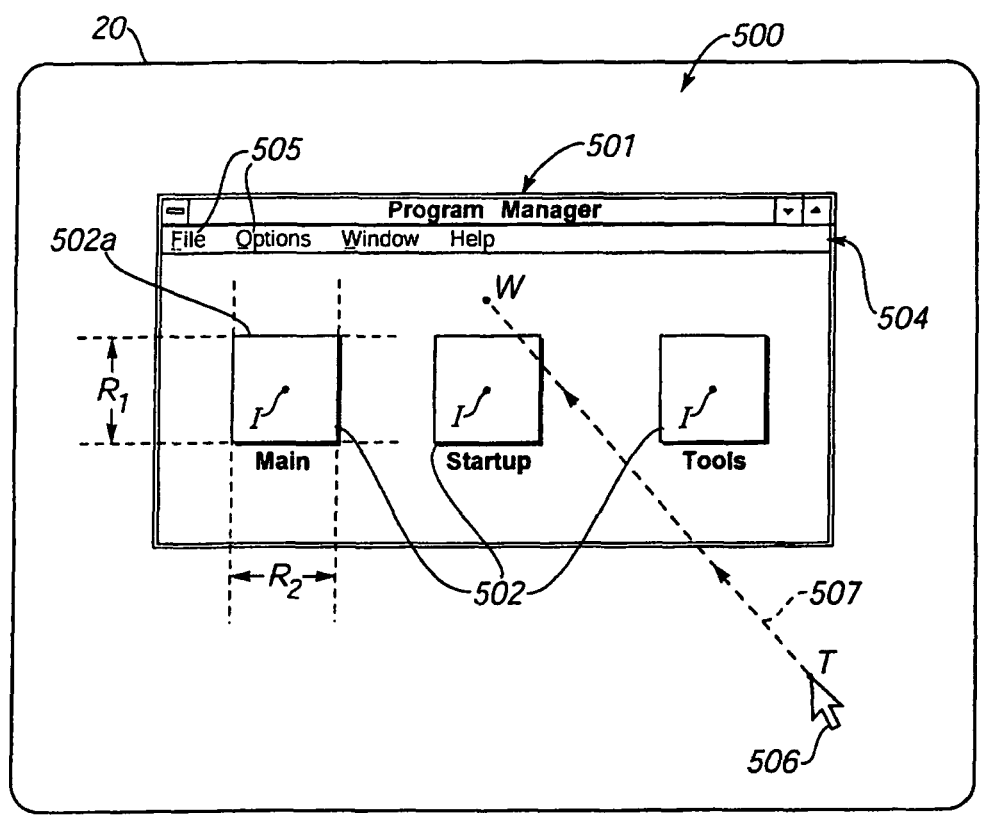
FIG. 18 is a diagrammatic illustration of a display screen showing a graphical user interface (GUI) and the interaction of forces of the present invention with a user-controlled cursor.

FIG. 18 is a diagrammatic illustration of display screen 20 displaying a graphical user interface (GUI) 500 used for interfacing with an operating system implemented by computer system 12. A preferred embodiment of the present invention implements force feedback technologies to embellish a graphical user interface with physical sensations. By communicating with force feedback interface device 14 or a similar apparatus that provides force feedback to the user, the computer 12 can present not only visual and auditory information to the user, but also physical forces. These physical forces can be carefully designed to enhance manual performance by, for example, reducing the difficulty of required "targeting" tasks. Such force feedback sensations can be used to facilitate interaction with computer operating systems for all users. In addition, those users who suffer from spastic hand motion and other dexterity-debilitating conditions reap great reward from the addition of these force feedback sensations.

The addition of computer generated force feedback sensations to a windows operating system environment can enhance manual performance in at least two ways. First, physical forces can be used to provide haptic sensory cues on user object 34 which increase a users perceptual understanding of the GUI spatial "landscape" portrayed on display screen 20. For example, sensations of physical bumps or textures which are applied to user object 34 as the user moves a cursor across the screen can be used to indicate to the user that he has positioned the cursor within a given region or crossed a particular boundary.

Second, computer-generated forces can be used to provide physical constraints or assistive biases which actually help the user acquire and maintain the cursor at a given target displayed on screen 20 within GUI 500. For example, an attractive force field can be used to physically attract user object 34, and thus the cursor controlled by user object 34, to the location associated with a given target such as an icon. Using such an attractive field, a user simply needs to move a cursor on the screen close to the desired target, and the force feedback interface device 14 will assist the user in moving the cursor to the target. Many other abstract force feedback sensations can be used to enhance and embellish the wide variety of GUI-based metaphors.

Herein, the manual tasks of the user to move a cursor displayed on screen 20 by physically manipulating user object 34 (also referred to as a "physical object") in order to command the cursor to a desired location or displayed object, are described as "targeting" activities. "Targets", as referenced herein, are defined regions in the GUI 500 to which a cursor may be moved by the user that are associated with one or more forces and which are typically associated with graphical objects of GUI 500. Such targets can be associated with, for example, graphical objects such as icons, pull-down menu items, and buttons. A target usually is defined as the exact dimensions of its associated graphical object, and is superimposed and "attached" to its associated graphical object such that the target has a constant spatial position with respect to the graphical object (i.e., when the graphical object is moved, its target also moves the same distance and direction). Usually, "graphical objects" are those images appearing on the display screen which the user may select with a cursor to implement an operating system function, such as displaying images, executing an application program, or performing another computer function. For simplicity, the term "target" may refer to the entire graphical object with which the target is associated. Thus, an icon or window itself is often referred to herein as a "target". However, more generally, a target need not follow the exact dimensions of the graphical object associated with the target. For example, a target can be defined as either the exact displayed area of an associated graphical object, or the target can be defined as only a portion of the graphical object. The target can also be a different size and/or shape than its associated graphical object, and may even be positioned a distance away from its associated graphical object. The entire screen or background of GUI 500 can also be considered a "target" which may provide forces on user object 34. In addition, a single graphical object can have multiple targets associated with it. For example, a window might have one target associated with its entire area, and a separate target associated with the title bar or corner button of the window.

Upon moving the cursor to the desired target, the user typically maintains the cursor at the acquired target while providing a "command gesture" associated with a physical action such as pressing a button, squeezing a trigger, depressing a pedal, or making some other gesture to command the execution of a particular operating system function associated with the graphical object/target. In the preferred embodiment, the command gesture can be provided as other input 39 as shown in FIG. 1. For example, the "click" (press) of a physical button positioned on a mouse or joystick while the cursor is on an icon allows an application program that is associated with the icon to execute. Likewise, the click of a button while the cursor is on a portion of a window allows the user to move or "drag" the window across the screen by moving the user object. The command gesture can be used to modify forces or for other functions in the present invention as well. For example, a button on the user object can be designated to remove the forces applied in a certain region or target in GUI 500.

In other embodiments, the "command gesture" can be provided by manipulating the physical object of the interface device within provided degrees of freedom and/or with graphical objects displayed on the screen. For example, if a user object has a third degree of freedom, such as linear translation along axis C of FIG. 6, then movement in this direction can indicate a command gesture. In other embodiments, graphical objects on the screen can provide a command gesture when manipulated by a user. For example, if a pull-down menu is displayed, a small button can be displayed on or near each menu item. The user could then move the cursor onto the appropriate button to select that menu item. Also, a side view of button could be displayed, where the user moves the cursor into the button to "press" it and provide the command gesture. A spring force on user object 34 can be associated with this pressing motion to provide the feel of a mechanical button.

The discussion below will build upon a concept of GUI targets being included in a particular hierarchy of levels in relation to each other. A first target that is included or grouped within a second target is considered a "child" of the second target and lower in the hierarchy than the second target. For example, the display screen 20 may display two windows. Windows are typically considered to be at the same hierarchy level, since windows typically are not grouped inside other windows. However, a window that is grouped within a higher level window, such as a window included within a Program Manager window (see FIG. 19), is considered to be at a lower level in the hierarchy than the grouping window. Within each window may be several icons. The icons are children at a lower hierarchy level than the window that groups them, since they are grouped within and associated with that window. These target concepts will become clearer below. It should be noted that one target may be displayed "within" or over another target and still be at the same hierarchy as the other target. For example, a window can be displayed within the outer perimeter of another window yet still not be grouped within that other window, so that the windows have the same hierarchy level.

The GUI permits the user to access various operating system functions implemented by an operating system running on computer system 12. For example, the Windows operating system can be running on computer system 12 to implement operating system functions. Operating system functions typically include, but are not limited to, peripheral input/output functions (such as writing or reading data to disk or another peripheral), selecting and running application programs and other programs that are independent of the operating system, selecting or managing programs and data in memory, viewing/display functions (such as scrolling a document in a window, displaying and/or moving a cursor or icon across the screen, displaying or moving a window, displaying menu titles and selections, etc.), and other functions implemented by computer system 12. For simplicity of discussion, the functions of application programs such as word processors, spreadsheets, and other applications will be subsumed into the term "operating system functions", although the functions of an application program are usually considered to be independent of the operating system. Typically, application programs make use of operating system functions to interface with the user; for example, a word processor will implement a window function of an operating system to display a text file in a window on the display screen. An operating system function may typically be selected by the "type" of graphical object; for example, an icon may generally execute an application program, a window generally displays collections of other graphical objects, a slider bar scrolls images on the screen, a menu item may perform a variety of operating system functions depending on its label, etc.

In addition, other types of interfaces are similar to GUI's and can be used with the present invention. For example, a user can set up a "page" on the World Wide Web which is implemented by a remote computer or server. The remote computer is connected to host computer 12 over a network such as the Internet and the Web page can be accessed by different users through the network. The page can include graphical objects similar to the graphical objects of a GUI, such as icons, pull-down menus, etc., as well as other graphical objects, such as "links" that access a different page or portion of the World Wide Web or other network when selected. These graphical objects can have forces associated with them to assist in selecting objects or functions and informing the user of the graphical layout on the screen. In such an embodiment, the speed of data transfer between the host computer and a network node can often be slow. Therefore, the reflex embodiment as described above with reference to FIG. 5 is quite suitable, since the local microprocessor 26 can implement reflex processes controlled by commands received from the remote computer implementing the Web page and/or from the host computer 12. In yet other embodiments, a simulated three-dimensional GUI can be implemented with the present invention, in which an isometric Or perspective view of a GUI environment and its graphical objects can be displayed. Alternatively, a "first person" view of a GUI interface can be implemented to allow a user to select operating system functions within a simulated 3-D virtual environment.

GUI 500 is preferably implemented on host computer 12 using program instructions. The use of program instructions to perform operations on a host computer and microprocessor is well known to those skilled in the art, and can be stored on a "computer readable medium." Herein, such a medium includes by way of example memory such as RAM and ROM coupled to host computer 12, memory 27, magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile item such as a hard disk drive.

In FIG. 18, the display screen 20 displays a GUI 500, which can, for example, be implemented by a Microsoft Windows® operating system, a Macintosh operating system, or any other available operating system incorporating a GUI. In the example shown, a program manager window 501 contains various icons 502 that are grouped by window 501, here labeled as "Main", "Startup", and "Tools", although other or different icons may be grouped within window 501. A menu bar 504 may be included in window 501 which permits pull-down menus to appear by selecting menu heading targets 505 with a user-controlled graphical object 506, such as a cursor, that is controlled by the user via a user-manipulable device such as the user object 34. For example, a user may select any of the "File", "Options", "Window", and "Help" menu headings 505 to display an associated pull-down menu of menu items (shown in FIG. 19). Typically, a command gesture such as a button press or other input 39 (as in FIG. 1) is also required to display a pull-down menu when cursor 506 is positioned at a menu heading 505. In alternate embodiments, a pull down menu might be automatically displayed (without a command gesture) when cursor 505 is positioned at the associated menu heading 505. In the subsequent description, the terms "user-controlled graphical object" and "cursor" will be used interchangeably.

The present invention provides force feedback to the user through user object 34 based on a location, a velocity, an acceleration, a history of one or more of these values, and/or other characteristics of the cursor 506 within the GUI 500 environment. Other "events" within the GUI may also provide forces, as described above with reference to FIGS. 4 and 5. Several preferred embodiments of different forces or "force sensations" applied to the user object 34 are described below. As described above in the embodiments of FIGS. 4 and 5, the host computer can provide a signal to local processor 26 (or directly to actuators 30) to apply different force sensations on user object 34. These "force sensations" can be forces of a single magnitude in one direction, or they may be an interaction or sequence of forces, for example, to create the sensation of a texture, a damping force, a barrier, etc. The terms "force" and "force sensation" (i.e. "type" of force) are used interchangeably herein, where it is assumed that single forces and/or sequences/interactions of forces can be provided.

In one preferred embodiment of FIG. 18, the force feedback depends upon a distance between cursor 506 and a target, such as window 501, using one of the aforementioned force models. The distance can be measured from one or more points within the window 501 or its perimeter. As depicted in FIG. 18, the window 501 is considered to be the highest level target displayed in GUI 500 (in actuality, the entire screen area of GUI 500 is preferably considered the highest level target, as described below). Icons 502 and menu bar 504 are targets that have a lower level in the hierarchy. In other situations, the window 501 could be grouped within with a higher level target, and the icons 502 and menu bar 504 could include additional targets lower in hierarchy than the icons and menu bar. Alternatively, icons 502 and menu bar 504 can be the same hierarchical level as window 501, if, for example, icons 502 were positioned outside of window 501 and were considered on the "desktop", i.e., not grouped in any particular window. In addition, none of the associated targets are restricted to be the same size or shape as their corresponding graphical objects, e.g. a target can be defined as a particular portion of a graphical object.

Herein, it is assumed that a position control paradigm is implemented by the GUI 500 and interface device 14. For example, the position of cursor 506 is directly related to the position of user object 34 in provided degrees of freedom of the user object. Thus, when cursor 506 is moved left on screen 20, user object 34 is moving in a corresponding direction. The distance that user object 34 moves may not be same distance that cursor 506 moves on screen 20, but it is typically related by predetermined function. When describing the position of cursor 506 herein, the position of user object 34 within provided degrees of freedom is assumed to correlate with the cursor's position. When forces are described herein as "affecting", "influencing" or "being applied to" cursor 506, it should be assumed that these forces are actually being applied to user object 34 by actuators 30, which in turn affects the position of cursor 506.

In alternate embodiments, a rate control paradigm can be used in GUI 500. For example, a user can push a joystick in one direction to cause the cursor to move in that direction, where the further the joystick is moved in that direction, the faster the cursor will move across the screen (in one implementation of rate control). In such an embodiment, for example, the user might move the joystick from the origin position and then stop moving the joystick, and the cursor would continue moving across the screen at a constant speed. Forces can be applied to user object 34 dependent on the position of cursor 506 similarly to the position control embodiment. Another example where a rate control paradigm would be appropriate is the button-like stick or knob that is positioned between keys of the keyboard on many portable computers, and which uses rate control to move a cursor within a GUI.

In a preferred embodiment, the host commands as described above with reference to FIGS. 9-17 can be used to provide the various forces used for a GUI 500 environment. The "reflex" mode of using the host computer 12 only for high-level supervisory commands can be helpful in increasing the response time for forces applied to the user object, which is essential in creating realistic and accurate force feedback. For example, it may be convenient for host computer 12 to send a "spatial representation" to microprocessor 26, which is data describing the layout of all the graphical objects displayed in the GUI which are associated with forces and the types of these graphical objects (in the Web page embodiment, the layout/type of graphical objects can be downloaded from the remote computer providing the page). The microprocessor can store such a spatial representation in memory 27. In addition, the microprocessor 26 can be provided with the necessary instructions or data to correlate sensor readings with the position of the cursor on the display screen. The microprocessor would then be able to check sensor readings, determine cursor and target positions, and determine output forces independently of host computer 12. The host could implement operating system functions (such as displaying images) when appropriate, and low-speed handshaking signals can be communicated between processor 26 and host 12 to correlate the microprocessor and host processes. Also, memory 27 can be a permanent form of memory such as ROM or EPROM which stores predetermined force sensations (force models, values, reflexes, etc.) for microprocessor 26 that are to be associated with particular types of graphical objects.

Other methods besides the use of the reflex embodiment can also be used to provide the forces within the GUI environment. For example, host computer 12 can be connected directly to sensors 28 and actuators 30 of interface device 14 by a fast communication interface to control the force feedback on user object 34, thus eliminating the need for local microprocessor 26.

In the described embodiment, targets such as window 501, icons 502 and menu headings 505 have force fields associated with them to influence and enhance the user's ability to move cursor 506 to or around the targets. For example, icons 502 may have an attractive force associated with them. This attractive force originates from a desired point I within each icon 502, which may be located at the center position of the icon. Alternatively, point I can be located at a different area of icon 502, such as near the perimeter of the icon. Likewise, window 501 preferably has an attractive force associated with it which originates from a point W within window 501, which may be at the center of the window. Points I and W are considered to be "field origin points". Alternatively, force fields can originate from a point or region not shown on the screen. These attractive forces are known as "external forces" since they affect the cursor 506 when the cursor is positioned externally to the targets. External and internal forces of targets are described in greater detail with respect to FIG. 20a.

In alternate embodiments, the field origin need not be a point, but can be a region or other defined area. For example, as shown in FIG. 18, the entire area of an icon 502a can be considered the "field origin region" for an attractive force. In such an embodiment, the cursor may be able to be moved freely in a certain dimension when within a region defined by the borders of the target. For example, if cursor 506 is in region R1 defined by the top and bottom borders of icon 502a, then horizontal forces might attract the cursor toward icon 502a, but no vertical forces would be applied. Similarly, if cursor 506 is in region R2 defined by the left and right borders of icon 502a, then only vertical attractive forces might affect the cursor.

The attractive forces associated with window 501 and icons 502 are applied to user object 34 to influence the movement of user object 34 and cursor 506. Thus, an attractive force associated with window 501 will cause host computer 12 to command the actuators 30 of interface device 14 to apply appropriate forces on user object 34 to move or bias the user object. Forces are applied to user object 34 in a direction such that cursor 506 is correspondingly moved in a direction toward field origin point W of window 501. It should be noted that the forces to user object 34 do not actually have to move the user object in the appropriate direction; for example, when using passive actuators, the user object cannot be physically moved by the actuators. In this case, resistive forces can be applied so that user object 34 is more easily moved by the user in the appropriate direction, and is blocked or feels resistance when moving in other directions away from or tangent to point W (passive actuator embodiments are described in greater detail with respect to FIG. 20c). The attractive force applied to user object 34, which would move or bias cursor 506 toward point W, is represented by dotted line 507 in FIG. 18. Preferably, the force is applied with reference to a single reference point of cursor 506, which is the tip point T in the preferred embodiment. In alternate embodiments, the reference point can be located at the center or other location on cursor 506 or other user-controlled graphical object. The attractive forces can be computed, for example, with a 1/R or $1/R^2$ relationship between field origin point W or I and cursor tip T to simulate gravity, as described above with reference to FIG. 14.

For other types of targets, repulsive fields may be associated with a field origin point. For example, it may be desired to prevent cursor 506 from moving to or accessing particular regions or targets on the screen within GUI 500. These regions might be displaying data that is processing in the background or other data that is desired to not be selected by cursor 506. If window 501 is one such target, for example, a repulsive field in the opposite direction to that represented by line 507 can be associated with window 501 and can originate at field origin point W. The force would move user object 34 and cursor 506 away from the target, making it more difficult for the user to move cursor 506 onto the target.

In the preferred embodiment, the position of cursor 506 determines which field forces will affect the cursor 506 and user object 34. As described in greater detail subsequently, targets preferably are associated with internal and external forces in relation to cursor 506. Preferably, attractive forces are external forces and thus affect user object 34 and cursor 506 only when the cursor 506 is positioned externally to the target. In the preferred embodiment, only the external forces of the highest level targets that are external to cursor 506 will affect the cursor 506 and object 34. Thus, in FIG. 18, only the attractive force of window 501 will affect cursor 506 and user object 34, since the icons 502 and menu headings 505 are at a lower level in the hierarchy. If cursor 506 were positioned within window 501, only the attractive fields of icons 502 and menu headings 505 would affect cursor 506 and user object 34 and the attractive force 507 would preferably be removed. This relationship is described in greater detail with respect to FIG. 20a. In alternate embodiments, the forces from various targets can be combined or excluded in different ways.

Figure 19:
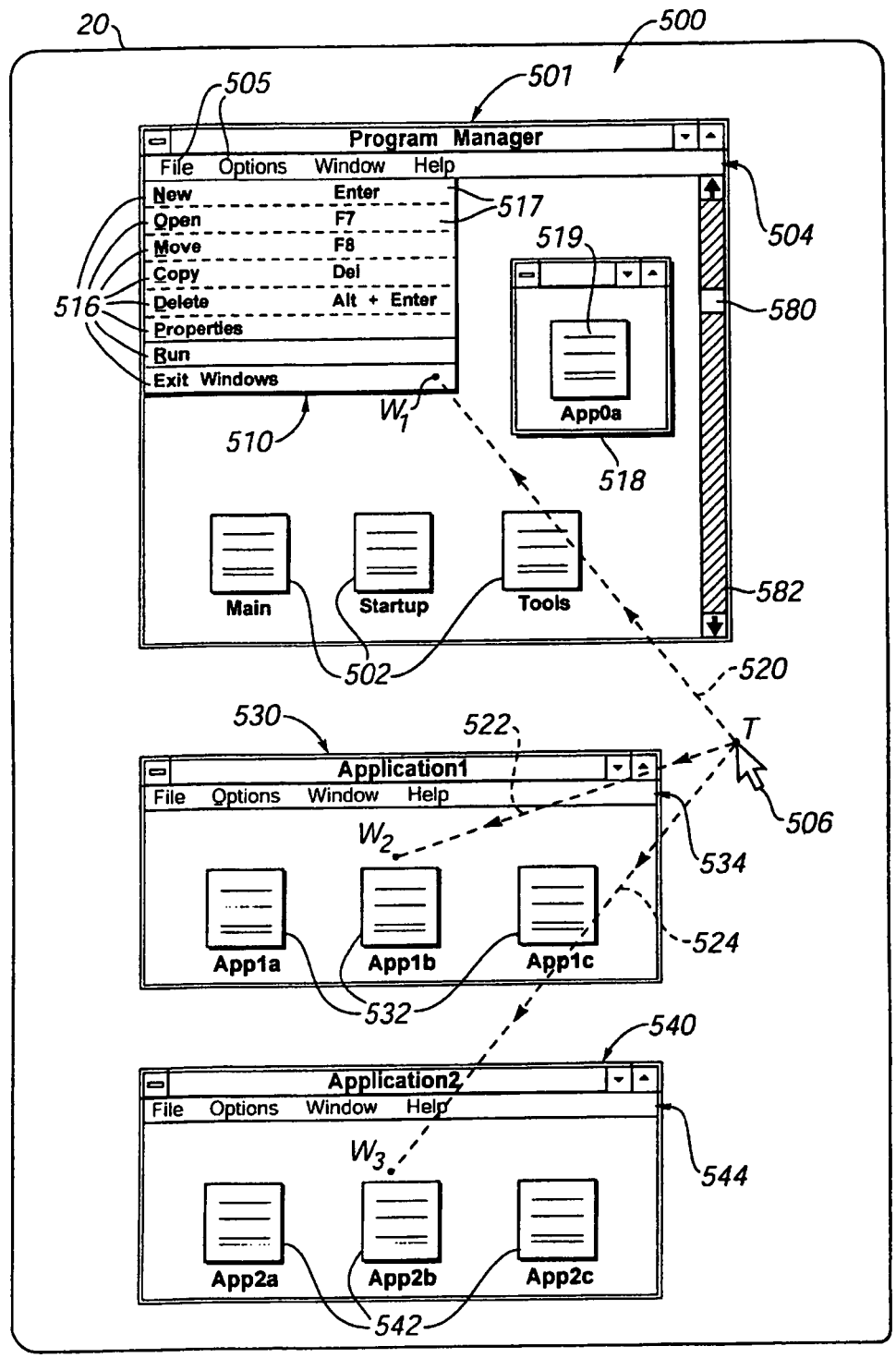
FIG. 19 is a diagrammatic illustration of a display screen showing the GUI of FIG. 18 having three windows with forces affecting the user-controlled cursor.

FIG. 19 diagrammatically illustrates the GUI 500 wherein multiple windows 501, 530 and 540 are displayed on display screen 20. Grouped within window 501 are icons 502, menu bar 504, window 518, and pull-down menu 517; window 518 includes an icon 519. Grouped within window 530 are icons 532 and menu bar 534. Window 540 includes icons 542 and menu bar 544.

All three windows 501, 530, and 540 are at the same hierarchical level. Therefore, in a preferred embodiment, when the cursor 506 positioned outside the perimeter of all three windows as shown, cursor 506 and user object 34 are influenced by a combination of the three external attractive forces, one attractive force from each window. These attractive forces are represented by dashed lines (vectors) 520, 522, and 524. Dashed line 520 represents the attractive force in a direction toward field origin point W1 of window 501, line 522 represents the attractive force toward field origin point W2 of window 530, and line 524 represents the attractive force toward field origin point W3 of window 540. The magnitudes of these forces are preferably dependent on a formula, such as the inverse of the distance between each target and point T of the cursor. These attractive forces are preferably summed together as vectors to provide a resulting total attractive force in a resultant direction having a resultant magnitude (not shown). Thus, cursor 506 and user object 34 would be moved or biased in the resulting direction until either reaching the resulting field origin point or until a condition occurred to change the forces applied to cursor 506. In alternate embodiments, other methods can be used to combine force vectors from multiple targets. For example, other organizations of hierarchies can be used. Or the magnitudes of forces might not be summed, such that the resultant attractive force can be assigned a predetermined magnitude or a magnitude that depends on the types of targets that have contributed forces.

No forces associated with icons 502, 532, and 542, menu bars 504, 534, and 544, pull-down menu 510, internal window 518, nor "thumb" and corresponding scroll bar 582 affect cursor 506 and user object 34 while cursor 506 is positioned external to the windows as shown. The principal task to be performed in FIG. 19 is the activation or selection of a particular window, not a window's contents. Thus, the inclusion of forces arising from targets inside a window would interfere with window selection. Once the cursor 506 is positioned within a window, then the forces associated with the targets inside the window take effect. For example, once cursor 506 is moved within window 501, the external attractive force associated with window 501 is preferably removed and the external attractive forces of icons 502, window 518, and menu headings 505 are applied. The attractive force of icon 519 within window 518 is preferably not applied, since it is not at the highest hierarchy level external to cursor 506, i.e., icon 519 is at a lower hierarchy level than window 518.

Only forces associated with highest level external targets preferably affect cursor 506. One reason is that, if attractive forces associated with targets inside a window were added to the window's external force, then a window with several icons could "overpower" other windows by exerting a much greater magnitude of attractive force on user object 34 than the other windows. The cursor 506 might then be trapped into always moving to the window with several icons. If each window affects cursor 506 equally, then it is easier for the user to move the cursor to the desired window. Of course, in alternate embodiments, if a window having more targets were desired to exert a greater force on cursor 506 than windows having less targets, then such an effect can be implemented. For example, the magnitude of the forces in such an embodiment could be limited so that the user would still be able to select all of the windows displayed in GUI 500, yet the user would feel slightly stronger forces from windows having greater numbers of icons.

The embodiment described above assumes that the magnitude of external force associated with each window on cursor 506 is calculated the same way. However, in other embodiments, the magnitude of attractive or other forces associated with targets can differ depending on characteristics of the targets or can be commanded by the software programmer or user to be a desired magnitude. For example, the size of windows 501, 530, and 540 may determine the magnitude of attractive force affecting cursor 506. If a user drags a window to be a smaller size, the attractive force associated with that window might be made proportionally smaller. For example, a virtual "mass" can be assigned to a target based on size, and the mass can be multiplied by the inverse of the distance between the target and the cursor to equal the resulting attractive force. The cursor can also be assigned a mass, if desired, to simulate real physical forces between objects. Also, other features or characteristics of the target, such as color, type, shape, etc., might control the magnitude of the force depending on how the programmer or user sets up a desired GUI force environment.

In addition, a programmer of the GUI 500 or of an application program running under the GUI is preferably able to control the magnitude of the forces associated with particular targets displayed (or the "masses" of targets). For example, the force field host command and command parameters, described above, may be able to designate a magnitude for particular displayed windows. Each target could thus have a different, predetermined force associated with it. This might allow a software developer to designate a desired force to be associated with a particular window for his application program running under GUI 500. In addition, in some embodiments, a user of GUI 500 might be allowed to designate particular magnitudes of forces associated with targets. A menu command or other standard method to allow the user to associate forces with particular targets can be implemented.

Figure 20A:
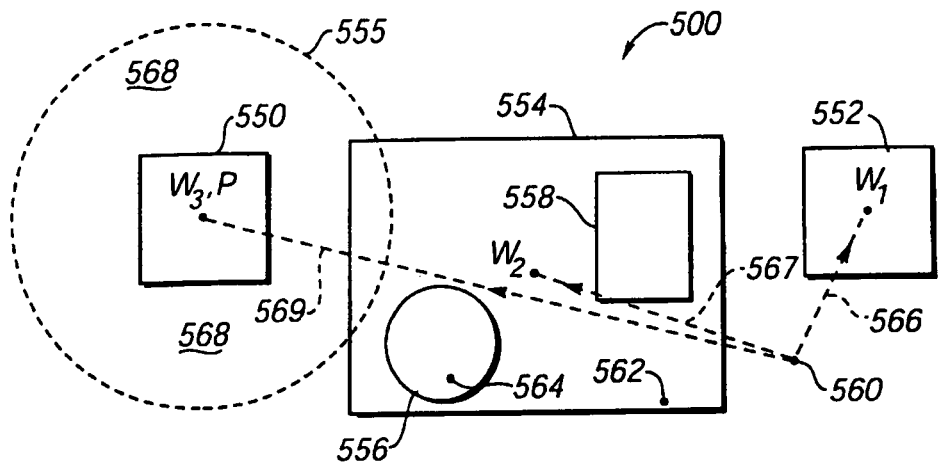
FIG. 20a is a diagrammatic illustration of a display screen showing targets of a GUI and external forces provided by those targets.

FIG. 20a is a diagrammatic illustration of displayed targets illustrating the concepts of internal and external forces of the present invention associated with targets. As referred to herein, "external forces" are those forces associated with a target which affect cursor 506 when the cursor 506 is positioned externally to that target, i.e. when the cursor positioned outside the perimeter of the target. In contrast, "internal forces" are those forces associated with a target which affect cursor 506 when the cursor is positioned internally to the target, i.e., within the perimeter of the target. Each target preferably has external forces and internal forces assigned to it, as described below. Of course, the internal forces and/or external forces associated with a target may be designated as zero, effectively removing those forces.

Target regions 550, 552, 554, 556, and 558 are displayed in GUI environment 500. Targets 550, 552, and 554 are at the same hierarchical level, and are associated with graphical objects such as windows or icons. Targets are "associated with" an appropriate graphical object such as an icon, meaning that they can be characterized as a property of the icon. The target is typically the same size as the associated graphical object, but may be defined to be smaller or large than the object, or to be a different shape than the object, in other embodiments. Targets 556 and 557 are grouped within target 554 and are thus at the same hierarchical level as each other but at a lower hierarchical level than the other targets 550, 552, and 554. For example, targets 556 and 558 can be associated with icons, windows, menus, menu items within a menu 554, or other targets grouped within window 554. Rectangular and circular targets are shown in FIG. 20a, although other shapes, even irregular ones, may be provided as targets.

Points 560, 562, and 564 represent possible locations of cursor 506 in GUI 500. As explained above with reference to FIGS. 18 and 19, external forces associated with lower level targets 556 and 558 will not affect cursor 506 when the cursor is positioned external to higher level target 554. Therefore, when cursor 506 is at point 560 external to target regions 550, 552, and 554, the total force on cursor 506 is equal to the sum of external target forces associated with each target 550, 552, and 554. As an example, the associated forces may be an attractive (or repulsive) force field as described above. The forces would thus be in a direction toward the field origin points W1, W2, and W3 shown as dashed lines 566, 567, and 568. Alternatively, the external forces can be one or any combination of the force models previously described with respect to FIGS. 9 and 14. For example, a texture external force or a damping external force can be applied, or a combination of these or other forces. Additionally, other forces and force models may be assigned as external forces. It should be noted that many types of force models do not require a field origin as in the examples of FIGS. 18 and 19.

In addition, external target ranges are preferably assigned to each external force associated with each of the targets 550, 552, and 554. These external ranges define an external region from a target point P to the range limit in which the external force will be in effect. In one embodiment, the target point P for defining ranges can be the same point as the field origin point, a shown for target 550. For example, external range 555 may represent the border of a defined external region 568 for target 550, which is a predetermined distance from point P. If cursor 506 is positioned within the external region 568 from the perimeter of target 550 to external range 555, then the external force associated with target 550 is in effect. If cursor 506 is outside region 568, then the external force is not in effect. For example, the external target force associated with target region 550 is zero at point 560 because its external region 568 does not extend to point 560. By defining such ranges, the processing time of local microprocessor 26 and/or host computer 12 is reduced, since the external forces need only be computed and applied when the cursor is in these regions. The external region 568 can be defined as a distance from point P, or may alternatively be defined with respect to the perimeter of a target, or may have a predetermined shape about its associated target region. In addition, a total force resulting from the external forces of multiple targets may have a newly-computed external range. In alternate embodiments, the region outside the external range of a target can be assigned a different force model and/or magnitude instead of zero.

Point 562 is located within target 554 (internal to target 554) and externally to targets 556 and 558. At point 562, the total force affecting cursor 506 would be a combination of an internal target force for target 554 and external target forces for targets 556 and 558. Cursor 506 is "insulated" from the external forces of targets 550, 552, and 554 since it is inside target 554. The external forces associated with targets 556 and 558 are similar to the external forces described above. The internal force associated with target 554 affects cursor 506 only when the cursor is within the perimeter of the target. Internal target forces of the preferred embodiment are described below with reference to FIG. 20b.

Point 564 is internal to target 556. A cursor 506 placed at point 564 would experience an internal force associated with target 556 and no other forces. There are no external forces affecting the cursor 506 at this location, since there are no targets of lower hierarchical level grouped in target 556. In addition, the internal force of target 554 is removed when the cursor is affected by an internal force of a target of lower hierarchical level, which in this case is the internal force of target 556.

Figure 20B:
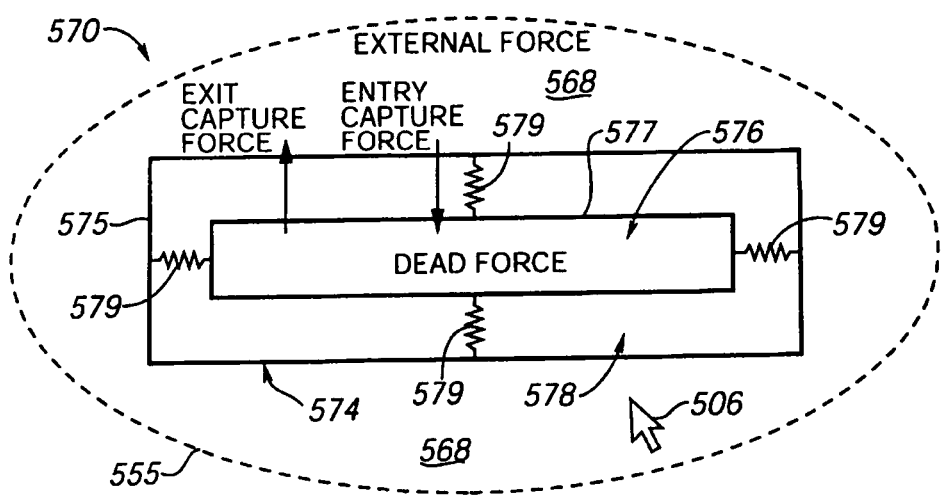
FIG. 20b is a diagrammatic illustration of a target and the internal forces provided by that target.

FIG. 20b is a diagrammatic illustration of a single target 570 which is associated with internal and external forces. In the provided example, target 570 may be associated with a menu item, button, icon, or window. An external region shape delineated by range 555 denotes a region for an external force associated with target 570. Cursor 506 is influenced by the external target force for target 570 when it is inside the external region 568 defined between dashed line 572 and an outer perimeter 575 of target 570. Alternately, the external region can be defined between dashed line 572 and an inner perimeter 577 of target 570. Recall that the target associated with a graphical object need not be the same size and shape as the graphical object, so a target perimeter may lie inside or outside the perimeter of the graphical object displayed on the screen 20.

An internal target region 574 may include a dead region 576 and a capture region 578. Dead region 576 is defined as the innermost, central region of target 570 and extends to an inner perimeter 577. In the dead region, forces associated with the dead region ("dead region forces") applied to cursor 506 would preferably be zero so as to allow substantially free movement of the cursor within this region (also, any external forces of any targets included within target 570 would be in effect). This dead region thus corresponds to the deadband regions discussed above with reference to FIGS. 9 and 14, as applied to the restoring and restoring spring forces and the groove/divot forces.

Alternatively, a particular force or force model can be associated with dead region 576. For example, a damping force or texture force sensation can be provided when the cursor is positioned within this region, providing force feedback awareness to the user that cursor 506 is inside target 570. Other force models can also be applied, such as the forces described above with respect to FIGS. 9 and 14. In addition, the entire displayed GUI portion 500 on the screen 20 is preferably considered a target, and a dead region force such as a damping force or a texture force can be applied to user object 34 when pointer 506 is moving over the background or desktop of the GUI. Such a damping force may greatly help users with a dexterity disability and allow these users to move pointer 506 more accurately. Or, individual windows can be assigned different dead region forces. This feature can be useful to distinguish the "feel" of different windows displayed on the screen, thus reducing the confusion of the user. For example, one window can have a texture dead region force of closely spaced bumps, while a different window can have a texture dead region force of widely-spaced bumps. This allows the user to identify which window the cursor is in just by the feel of the dead region texture.

The capture region 578 is preferably provided at or near the perimeter of target 570. The forces associated with capture region 578 are applied to cursor 506 when the cursor is positioned within or is moved through the capture region. Since the capture region is typically narrow, it may sometimes be difficult to determine if the cursor is within the capture region. For example, the host computer or local microprocessor 26 determines the location of cursor 506 (and user object 34) by taking samples of sensors 28. If the user is moving user object 34 very quickly, the readings from the sensors may at too slow a frequency to provide data showing that the cursor was located inside the capture region. The width of capture region 578 (i.e., the distance from inner perimeter 577 to outer perimeter 575) can thus be made large enough so that the cursor can be detected within the capture region even when the user moves the cursor quickly. Alternatively, a history of sensor readings can be checked to determine if the cursor was previously outside (or inside) the target 570, and if the cursor is subsequently inside (or outside) the target 570, thus indicating that the cursor has passed through capture region 578 and that a capture force should therefore be applied to user object 34.

In the preferred embodiment, two different forces can affect cursor 506, depending on whether the cursor has moved from the dead region to the external region of the target (exiting target 570), or vice-versa (entering target 570). When the cursor is moved from dead region 576 to external region 568, an "exit capture force" is applied to user object 34. The exit capture force is preferably a barrier or "snap over" force positioned at inner perimeter 577, which preferably includes a spring force as represented symbolically by springs 579 in FIG. 20b. The spring force causes a spring resistance to the motion of cursor 506 in the exit direction, which starts as a small resistive force in the direction toward the dead region 576 and which increases as the cursor is moved closer to outer perimeter 575. The spring force may cause the cursor/user object to move back toward dead region 576 if the user lets go of the user object. This barrier force thus prevents the cursor from easily "escaping" the target 570. In embodiments having passive actuators, a damping barrier force can be provided instead of the spring force. The barrier force can be useful to keep cursor 506 within an icon, scroll bar, or menu heading so that the user may more easily select the operation designated by the icon, etc. In addition, by providing a zero dead region force and a barrier exit capture force, a user can move the cursor within the internal area of a target and "feel" the shape of the target, which adds to the sensory perception of graphical objects. Outer perimeter 575 of target 570 preferably defines a snap distance (or width) of the barrier, so that once cursor 506 is moved beyond perimeter 575, the exit capture force is removed. The divot force model can be used when a capture force is desired on all four sides of the perimeter of target 570, and a groove force model can be used if capture forces are only desired in one dimension.

When the cursor 506 enters target 570, an "entry capture force" is applied to user object 34. Preferably, the entry capture force is the same spring force as the exit capture force, in the same direction toward the dead region 576. Thus, when cursor 506 first enters the capture region, the spring force will immediately begin to push the user object/cursor toward the dead region. The closer the cursor is positioned to the dead region, the less spring force is applied. In some embodiments, the magnitude of the entry spring force can be limited to a predetermined value or offset to prevent the cursor 506 from moving past ("overshooting") target 570 due to excessive attractive force.

Alternatively, an attractive force field similar to the external attractive force fields described above can be provided as the entry capture force. In such an embodiment, the direction of movement of cursor 506 must be established so that it is known whether to provide the exit capture force or the entry capture force. The history of sensory readings can be checked as described above to determine cursor direction. In alternate embodiments, different or additional types of entry capture forces can be applied.

In addition, a different "inertia" force can be applied to user object 34 when cursor 506 is positioned in dead region 576 for particular types of targets and when specific conditions are met. For example, the inertia force can be applied when a command gesture, such as the pressing or holding of a button, is input by the user. In one preferred embodiment, the inertia force is provided when the user moves pointer 506 into dead region 576, holds down a button on the joystick or mouse, and moves or "drags" the graphical object (and associated target 570) with pointer 506 across screen 20. The dragged target 570 has a simulated "mass" that will affect the amount of inertia force applied to user object 34. In some embodiments, the inertia force can be affected by the velocity and/or acceleration of cursor 506 in addition to or instead of the simulated mass. Other factors that may affect the magnitude of inertia force, such as gravity, can also be simulated. For example, if a large icon is dragged by cursor 506, then the user may feel a relatively large damping force when moving user object 34. When the user drags a relatively small icon with pointer 506, then a smaller damping force should be applied to user object 34. Larger objects, such as windows, can be assigned different masses than other objects, such as icons. Alternatively, an icon's mass can be related to how large in terms of storage space (e.g. in bytes) its associated program or file is. For example, an icon of a large-sized file is more difficult to move (is "heavier") than an icon for a smaller-sized file. A target's mass can also be related to other target/graphical object characteristics, such as the type of graphical object, the type of application program associated with the graphical object (i.e., larger mass for word processor icons, less mass for game program icons, etc.), or a predetermined priority level. Thus, force feedback can directly relate information about a target to the user, assisting in performing and selecting desired operating system tasks. In addition, an inertia force feature may be useful if a user wishes to retain a specific screen layout of graphical objects in GUI 500. For example, all the objects on the screen can be assigned a very high "mass" if the user does not want objects to be moved easily from the preferred layout.

Other types of forces can also be applied to user object 34 when other command gestures are provided and/or when the target is dragged or moved, such as texture forces and jolts. In addition, if simulated masses are being used to calculate the external force of a target, as for the attractive gravity force described above, then that same mass can be used to compute an inertia force for the target when the target is dragged. In yet another embodiment, a target may have a spring force associated with its position before it was moved. For example, when the user drags an icon, the movement of user object 34 would feel like a spring is attached between the icon and its former position. This force would bias the cursor toward the former position of the icon. In a different, similar embodiment, a spring or other type of force can be provided on user object 34 when a graphical object is resized. For example, a window can typically be changed in size by selecting a border or corner of the window with cursor 506 and dragging the window to a desired size. If the window is dragged to a larger size, then a "stretching" spring force can be applied to the user object. If the window is dragged to a smaller size, then a "compressing" spring force can be applied. The implementation of these types of forces can include a simple proportionality between displacement and force and is well known to those skilled in the art.

Also, the targets for inertia forces can be defined separately from the targets for the internal and external forces as described above. For example, most windows in a GUI can only be dragged by cursor 506 when the cursor is located on a "title bar" (upper portion) of the window or similar specific location. The window can be associated with a inertia target and a separate internal/external force target. Thus, the target for the internal/external forces can be defined to cover the entire window, while the target for the inertia forces can be defined to cover just the title bar of the window. If the cursor 506 were located on the title bar, then both inertia and internal forces could be in effect.

Figure 20C:
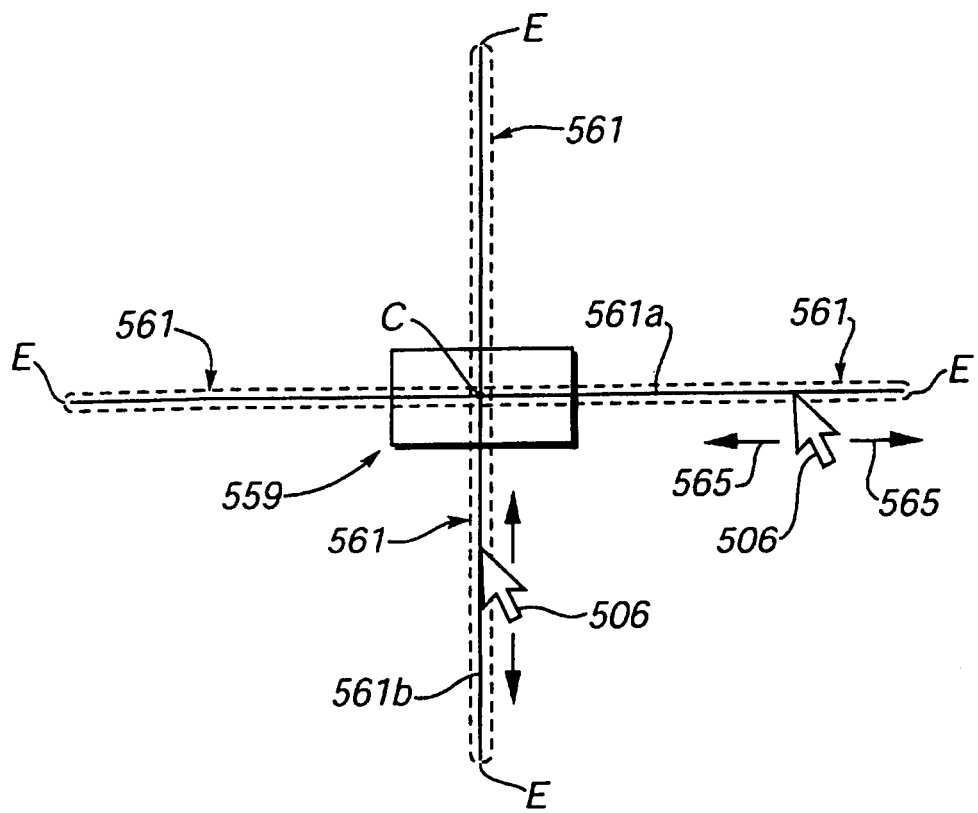
FIG. 20c is a diagrammatic illustration of another embodiment of a target and external forces for that target.

FIG. 20c is a diagrammatic illustration of a target 559 in a GUI 500 providing a "groove" external force. This type of external force is suitable for an interface device 14 having passive actuators 30. Passive actuators may only provide resistance to motion of user object 34, and thus cannot provide an attractive or repulsive force field as an external force of a target. Thus, an external force of target 559 can be provided as external grooves 561, e.g. the groove force model as described above with reference to FIG. 14 can be used. These grooves are preferably positioned in horizontal and vertical directions and intersect at the center C of target 559. It should be noted that grooves 561 are preferably not displayed within GUI 500, and are shown in FIG. 20c for explanatory purposes (i.e., the grooves are felt, not seen). (Alternatively, the grooves can be displayed.) When cursor 506 is moved into a groove, resistive forces are applied to resist further movement out of the groove but to freely allow movement along the length of the groove. For example, if cursor 506 is positioned at horizontal groove 563a, the cursor 506 may freely be moved (i.e. with no external forces applied from target 559) left and right as shown by arrows 565. However, the groove "walls" provide a resistive force to the cursor when the cursor is moved up or down. This tends to guide or bias the movement of the cursor 506 toward (or directly away from) target 559. Similarly, if cursor 506 is positioned at vertical groove 563b, the cursor may freely be moved up and down as shown by arrows 557, but must overcome a resistive barrier force when moving left or right. The grooves 561 preferably have a predefined length which determines the external range of the external force of the target.

Figure 22:
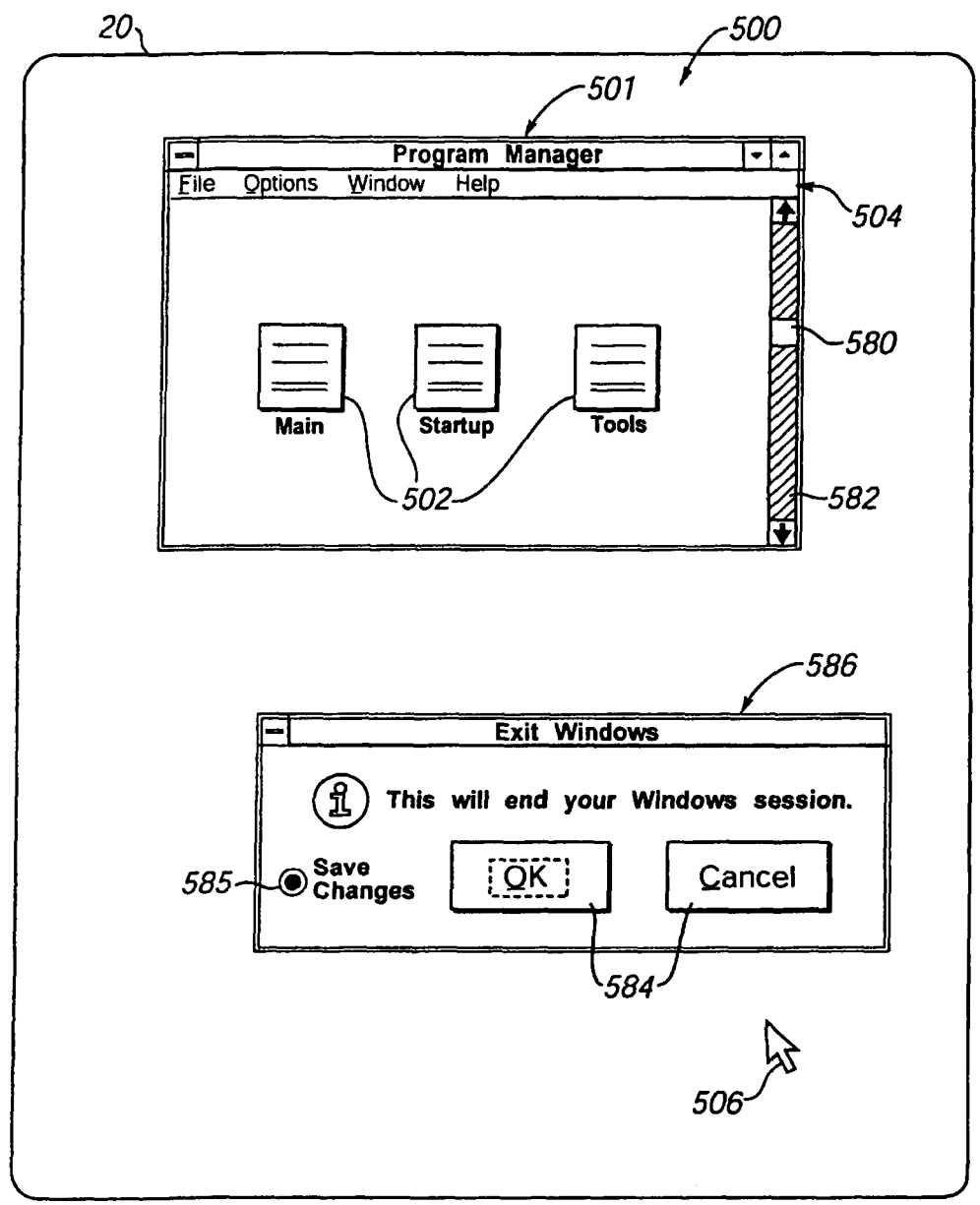
FIG. 22 is a diagrammatic illustration of a display screen showing the GUI of FIG. 18 having a pop-up window with buttons and associated forces of the present invention.

When cursor 506 is moved along a groove toward the center of target 559, the cursor eventually reaches the center C of the target. At this position, both grooves 561 provide combined barrier forces to the cursor in all four directions, thus locking the cursor in place. Once the cursor is locked, the user can conveniently provide a command gesture to select the graphical object associated with target 559. In a preferred embodiment, the external groove forces are removed once the user selects the target. For example, if target 559 is associated with a button as shown in FIG. 22, the cursor would be guided to target 559, and, once the button is selected, the grooves would be removed, allowing the cursor to be moved freely. Once the cursor moved out of the external region defined by the ends E of the grooves, the external force would again be in effect.

Figure 21:
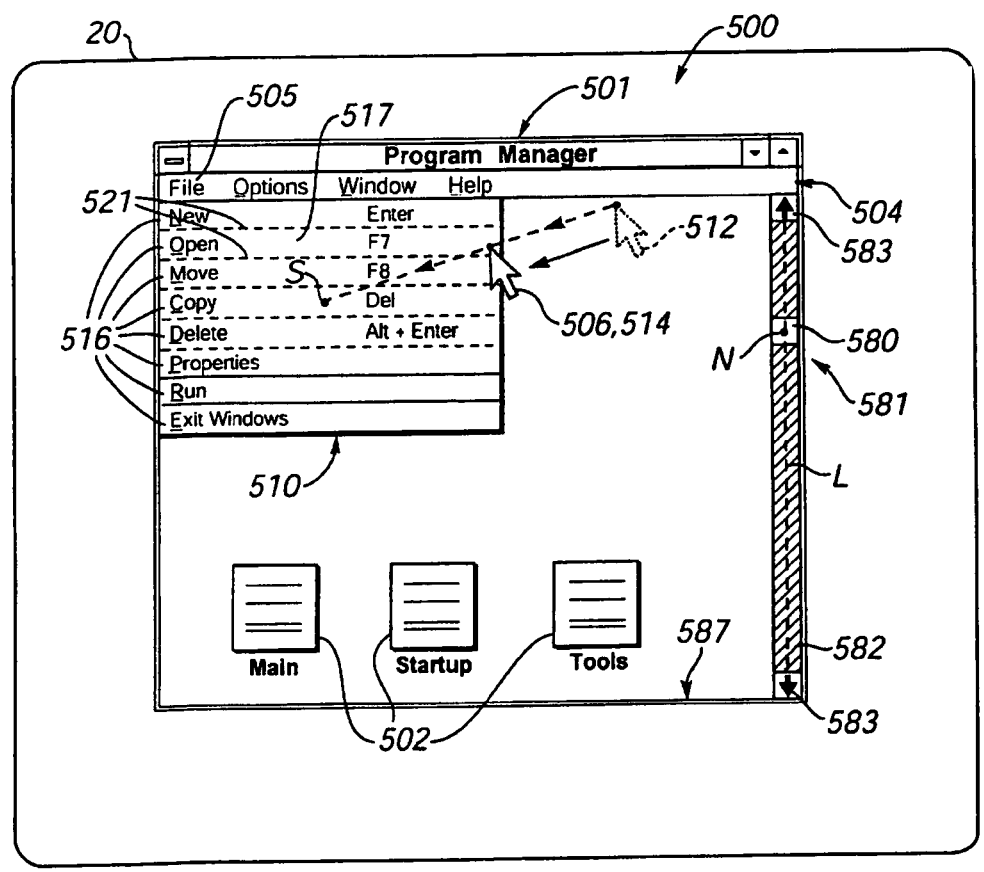
FIG. 21 is a diagrammatic illustration of a display screen showing the GUI of FIG. 18 having a pull-down menu and associated forces of the present invention.

FIG. 21 is a diagrammatic illustration of display screen 20 showing GUI 500 and window 501 with a pull-down menu. The forgoing concepts and preferred embodiments will now be applied to selection of menu items in a GUI environment. Once the cursor 506 is inside the window 501, forces applied to user object 34 depend upon the cursor 506 location relative to targets within window 501 on the next lowest level of the hierarchy below window 501. Menu bar 504 is preferably considered to be on the same hierarchy level as icons 502, so that both icons 502 and menu bar 504 exert attractive external forces on cursor 506. Alternatively, menu bar 504 can be assigned a hierarchy level below that of window 501 but above that of icons 502, which would allow only the menu bar to attract cursor 506 (hierarchy levels of other graphical objects might also be changed in other embodiments).

FIG. 21 depicts window 501 with a file pull-down menu 510, where menu 510 includes one or more menu items 516. The display of menu 510 results from a selection of the "File" menu heading 505 of the menu bar 504, and is typically performed by moving cursor 506 onto menu heading 505 and selecting or holding down a button, such as a mouse or joystick button. Once a pull-down menu such as the "File" pull-down menu 510 has been displayed, force models associated with the menu 510 or its items 516 will affect cursor 506 and user object 34. For example, if the cursor 506 is located within window 501 as denoted by the dashed cursor outline 512 in FIG. 21 after activating the pull-down menu 510, the cursor 506/user object 34 is preferably attracted from its position at outline 512 toward field origin point S of the menu 510 with an attractive external force of the menu 510. Alternatively, a field origin region defined as the entire menu 510 can be defined, as described above. Once the cursor 506 is located within the perimeter of menu 510, as shown by location 514, then the attractive external force of the menu is no longer in effect. Any internal menu forces of menu 510, or menu items 516, are then in effect, as described below. Preferably, menu 510 has one external force associated with it that attracts cursor 506 to the center (or other designated field origin position) of the menu 510. Alternatively, each menu item 516 can be associated with its own external force, which may all sum to a total force that can affect cursor 506 if the cursor is positioned outside menu 510. For example, each menu item might have its own attractive external force with its own field origin point located at the center of each menu item; or, other force models can be used in other embodiments. In addition, some menu items 516 might be designated to have an external force of greater magnitude than other items.

External force magnitudes might be designated, for example, according to characteristics of the menu items (size, order in the list, etc.), frequency of use, or according to personal desires of a programmer or user of GUI 500.

Once positioned inside the pull-down menu 510, the cursor 506 will inevitably lie within one of several menu items 516 demarcated by dashed and solid perimeters 519 in FIG. 21. The dashed lines are typically not displayed in standard menus of GUI's, but are shown here for explanatory purposes. Preferably, the menu 510 has no internal forces, but each menu item 516 has its own internal forces which are in effect within the perimeters 519 of the item areas. The dashed lines define the perimeter of each menu item with respect to other menu items 516. The menu items are preferably similar to the target 570 shown in FIG. 20b. Preferably, each menu item includes a zero magnitude force in its dead region 576 and includes a barrier or "snap-over" force (such as a spring or damping force) located at perimeter 519 as its exit capture force in accordance with that described with reference to FIG. 20b. This capture force keeps cursor 506 within a particular menu item 516 once the cursor has moved there. In addition, each menu item 516 can include a "snap-to" entry capture force positioned at the middle of the menu item to attract the cursor 506 to this middle point. The snap-to force can be implemented as a groove force model along the length of the menu item. Thus, the cursor is assisted in remaining within a particular menu item target, such as the Open F7 item target 517, by the use of force feedback as previously discussed with reference to FIG. 20b. Each menu item 516 such as New, Open Move, Copy, etc. can have its own dead region for free movement within a item 516 and a capture region to assist in keeping the cursor in the particular item target that it is located. Preferred force models are the grooves and barriers discussed with reference to FIG. 14. For example, a groove force model can be provided at each menu item so that extra force is necessary to move the cursor 506 "out" of the groove past a perimeter 519, but does not prevent cursor 506 from moving left or right out of the menu. By impeding movement between selection areas 516, the force feedback prevents accidental shifting between menu items and prevents the inadvertent selection of an incorrect menu item and operating system function. The menu items typically have no external force, since they abut at their borders. An external force can be provided at the left and right borders of each menu item if desired.

In other embodiments, other forces can be provided in addition to those discussed to ease the movement of cursor 506 over the menu items 516. For example, the user may inadvertently skip the cursor over some menu items 516 if a great deal of force has to be used to move the cursor 516 over perimeters 519 between menu items. To prevent the undesired skipping over of selections 516, a damping force can be provided in the dead region 576 of each selection 516 to slow down the cursor in a menu item. Alternatively, a repulsive entry capture force can be provided by the menu items that are not immediately adjacent to the menu item that the cursor is in, such that the skipping problem is reduced.

The scroll bar or "slider" 581 also preferably is designated as a target of the present invention. The scroll bar preferably includes a "thumb" 580, a guide 582 in which to move the thumb, and arrows 583. Cursor 506 can be positioned over thumb 580 in the scroll bar 581 for the window 501 and the user can scroll or move the view of icons, text, or other information shown in window 501 by moving thumb 580 in a vertical direction along guide 582, as is well known to those skilled in the art. Guide 582 is preferably a target of the present invention such that external forces and internal forces are associated with the guide. Preferably, an attractive external force is associated with the guide so that cursor 506 is attracted to a field origin point N within thumb 580. Thus, the field origin point of the guide can vary its position within guide 582 when the user moves the thumb. The guide 582 can be designated the same hierarchical level as icons 502, or a higher or lower level. Internal forces of the guide are preferably equivalent to those of FIG. 20b. The capture forces on the top and bottom sides of the groove prevent cursor 506 from easily moving onto arrows 583 when moving thumb 580. In an alternate embodiment, the dead region of guide 582 has zero width, so that the cursor is always attracted to a point halfway across the width of the guide, i.e. an entry capture force to the middle line L of the guide. This would be close to a groove force model, except that the sides of guide 582 near arrows 583 would have a barrier force and thus be like a divot. In a passive actuator (or other) embodiment, such a groove can be provided along guide 582, and the cursor can be locked onto thumb 580 as described with respect to FIG. 20c. The cursor would, of course, still be able to be moved with the thumb when locked on the thumb, and could be released with a command gesture.

Preferably, thumb 580 and arrows 583 are considered children objects of guide 582, i.e., the thumb and arrows are at a lower hierarchical level than the guide and are considered "within" the guide. Thus, the external forces of the thumb and arrows are only applicable when cursor 506 is positioned within the guide. The external forces of arrows 583 are preferably zero, and thumb 580 preferably has an attractive external force. The internal forces of thumb 580 and arrows 583 are preferably similar to those described with reference to FIG. 20b.

Thumb 580 can also be assigned inertia forces as described with reference to FIG. 21. The user could feel the inertia "mass" of the thumb when moving it along guide 582. Since thumb 580 can be viewed as an icon with constrained movement, many forces attributable to icons can be assigned to thumbs.

As described above, graphical objects/targets such as icons 502 and window 501 can be assigned simulated "masses" which can be used to provide inertia forces when the targets are dragged across the screen. The inertia forces can also be applied due to collisions or other interactions with other graphical objects and targets. For example, if pointer 506 is dragging icon 502, and the icon collides with the edge 587 of window 501, then a collision force can be applied to user object 34. This collision force can be based on the speed/direction of the icon/cursor as it was moved, the mass of the icon, and any simulated compliances of the icon 502 and the edge 587. For example, edge 587 can be assigned to be very compliant, so that when icon 502 is dragged into the edge, a spring-like force is applied to user object 34 which causes icon 502 and cursor 506 to bounce back away from edge 587.

Alternatively, these same sort of "collision" forces can be applied to cursor 506 regardless of whether any object is being dragged or not. For example, certain edges, objects, or regions in GUI 500 can either be designated as "pass-through" objects or as "solid" objects. Cursor 506 would be able to move over any pass-through objects without user object 34 feeling any forces. However, forces would be applied to user object 34 if cursor 506 moves over or into any solid object. Cursor 506 could be assigned a mass of its own so that the user object will feel collision forces in accordance with the mass of cursor 506, the velocity of the cursor across the screen, and a assigned compliance of the cursor and the object moved into. This can be useful in a GUI to prevent or hinder access to certain objects or functions. Such objects could be designated as solid objects which would allow cursor 506 to be moved freely about the screen without concern about selecting undesired functions.

FIG. 22 is a diagrammatic illustration of display screen 20 showing window 501 and a "pop-up" window 586. Window 501 includes icons 502. Window 586 includes buttons 584 and a "radio button" 585, and the window is typically removed from the screen after a button 584 has been selected. Buttons 584 can also be displayed in more "permanent" (i.e., non-pop-up) regions of GUI 500. Similarly to the targets associated with the graphical objects described above, each button 584 in a window 586 in FIG. 22 has external and internal forces associated with it, as described with reference to FIG. 20*a*. Thus, an attractive external force (or other desired force) and a zero dead region force and divot capture force can be associated with each button 584. Essentially, the buttons 584 are analogous to menu items 516 in FIG. 21, except that a certain distance on the screen separates the buttons 584 from each other. Also, buttons 584 preferably have radially-shaped external region for their external forces.

Radio button 586 is similar to buttons 586 in that a particular function may be selected or toggled if the user moves cursor 506 onto the radio button 586 and provides a command gesture such as pushing a button. Button 584 preferably is implemented similarly to buttons 584 except that button 586 has a round perimeter and preferably a round external region. In other embodiments, buttons can have other shapes.

In an alternate embodiment, the forces associated with buttons 584 and 585 can be "turned off" or otherwise changed after the button has been selected by the user using cursor 506. For example, an attractive external force and entry capture force of a button 584 can draw or guide the cursor to the button. The exit capture force impedes the cursor from moving outside of the button. Once the button is selected, however, the capture and external forces can be removed, so that the cursor can be moved freely (and/or be affected by the forces associated with other targets on the screen). The forces can then be reapplied upon desired conditions. For example, once the cursor moves out of the external region of the button, then the forces would be back in effect and would be reapplied when the cursor was moved back into the external region of the button. Likewise, some or all of the forces associated with the button could be changed to different types of force models once the button was pressed. This embodiment can also be applied to other types of graphical objects, such as icons, e.g., once the icon is selected, forces are removed until the cursor is moved out of the external region and back into the external region, when the forces would be reapplied.

Figure 23:
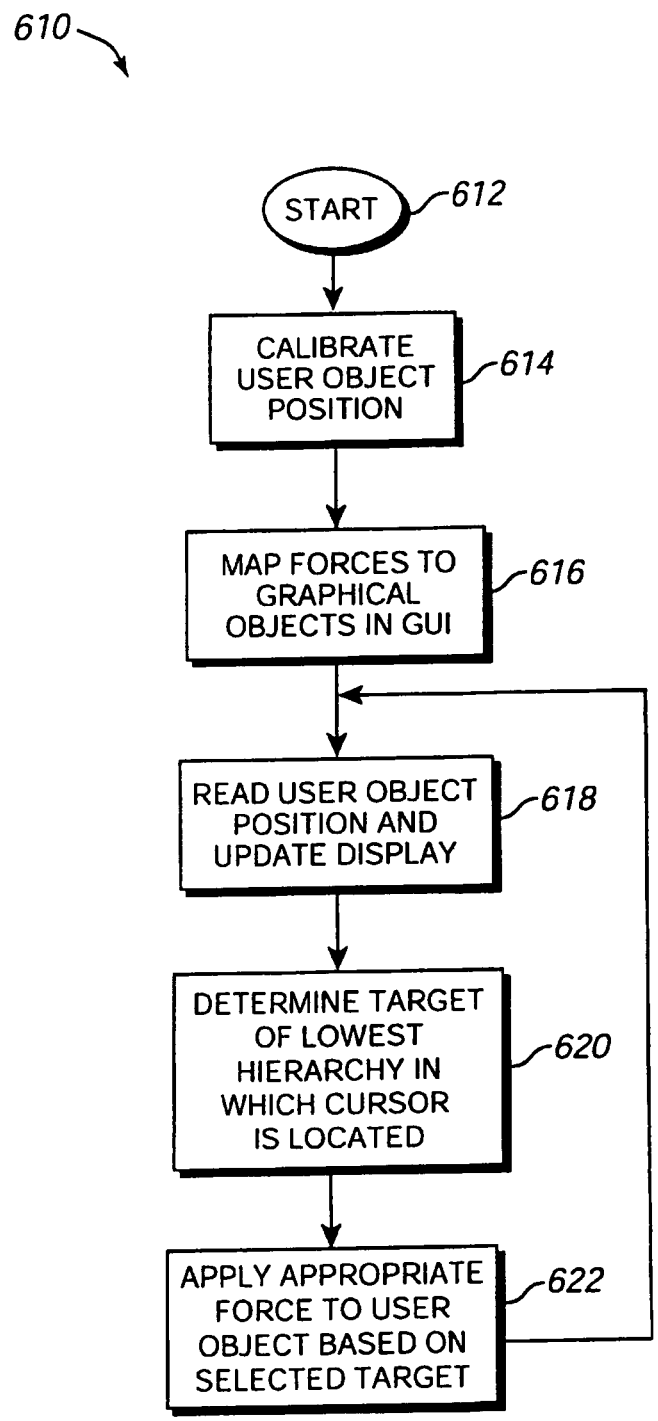
FIG. 23 is a flow diagram illustrating a method of the present invention for providing force feedback within a GUI.

FIG. 23 is a flow diagram illustrating a method 610 for providing force feedback within a graphical user interface (GUI) environment beginning at a step 612. Initially, in a step 614, a position of the user object 34 is calibrated. This is accomplished so that an origin position for the user object can be determined by host computer 12. In next step 614, forces are mapped or associated with graphical objects in the GUI. For instance, referring to the diagram of FIG. 20*a*, external and internal target forces are associated with the targets 550, 552, 554, 556, and 558. More specifically referring to the example of FIG. 19, the host computer associates types of graphical objects in GUI 500 with external and internal forces. The mapping will generally include assigning one or more force models and range sizes/shapes to each external and internal region of types of graphical objects. For example, icons may be assigned particular forces and ranges, and sliders may be assigned different forces and ranges. Also, particular icons or other objects can be assigned particular forces or ranges if the programmer has so designated. If only a portion of a graphical object is to be used as a target, then that portion can be defined in this step. The process of mapping forces to graphical objects in the GUI is described in greater detail with respect to FIG. 24.

In step 618, the position of the user object 34 is read by host computer 12 and/or microprocessor 26 and the cursor position on the screen is updated accordingly. This is typically accomplished by first reading sensors 28 on interface device 14 to determine where user object 34 is positioned. These readings are then converted to the coordinates on screen 20 and the cursor is moved to the appropriate location corresponding to the position of the user object, as is well known to those skilled in the art. Since the sensor readings may include non-integer values, the sensor readings can be converted to integer values which are associated with coordinates on the screen so that the cursor position can be updated. However, when forces are calculated (as in step 622 below), the original non-integer sensor readings are used, since these values include the necessary accuracy.

In step 620, process 610 determines a target of lowest hierarchy in which the cursor is located. As mentioned above in the discussion of FIGS. 18-20*a*, the hierarchies assigned to targets influence the forces that are in effect on cursor 506. This process is described in greater detail with respect to FIG. 25. In step 622, an appropriate force is determined from the external and internal forces for each target that affects the cursor, where the target selected in step 620 helps determine which forces are in effect. The contributing forces are combined and the combined total force is applied to the user object 34 by actuators 30. This step is described in greater detail with respect to FIG. 26. After step 622, the process returns to step 618 to again read the user object position and apply appropriate forces.

Figure 24:
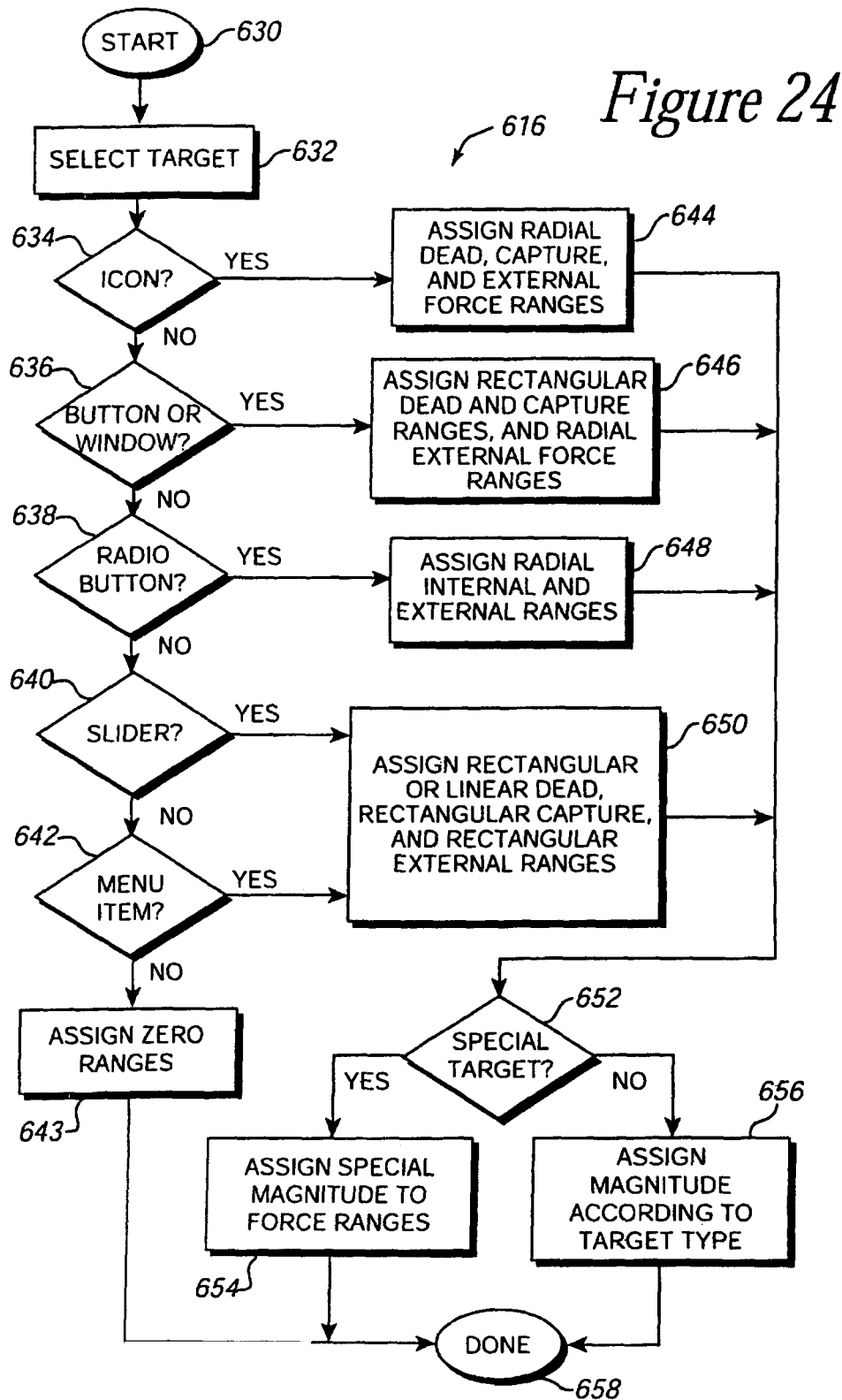
FIG. 24 is a flow diagram illustrating a step of FIG. 23 for assigning force ranges and magnitudes to graphical objects with a GUI.

FIG. 24 is a flow diagram illustrating an example of step 616 of FIG. 23, in which forces are mapped to graphical objects. The process begins at 630, and in step 632, an available target is selected to assign forces that target. After a target has been selected, process 616 implements a series of steps 634, 636, 638, 640, and 642 to determine the particular target's type. These steps can be performed in any order, or simultaneously. Step 634 checks if the selected target is an icon. If so, step 644 assigns a radial dead range, a radial capture range, and a radial external range to the icon. The "dead range" is the size of the dead region 576 about the center of the icon, defined by inner perimeter 577 as shown in FIG. 20*b*. The "capture range" is defined between inner and outer perimeters 577 and 575, so that a radial capture range indicates that the inner and outer perimeters are circular about the center of the icon. The capture and external ranges are preferably radial even though the icon itself may be rectangular or shaped otherwise. In other embodiments, other shaped ranges can be assigned. The process then continues to step 652, described below. If the target is not an icon, the process continues to step 636.

In step 636, the process checks if the selected target is a button or window; if so, step 646 assigns rectangular dead and capture ranges and a radial external range to the selected target. Buttons are illustrated in FIG. 22. Since the windows and buttons are rectangular, a rectangular capture range is desired to match the shape of the perimeter of the window or button. A radial external range can be provided as a predetermined distance from a center point of the window or button. The process then continues to step 652. If the target is not a button or window, the process continues to step 638. Step 638 checks whether the target is a radio button; if so, step 648 assigns radial internal and external ranges, since the radial button is typically circular in shape. The process then continues to step 652. If the target is not a radial button, the process continues to step 640, in which the process checks if the target is a slider. If so, step 650 assigns rectangular dead, capture, and external ranges to the guide, thumb, and arrows as explained previously. If the slider is implemented as a one dimensional groove, then the dead range would be linear, i.e., zero in one dimension. The process then continues to step 652, described below. If the target is not a slider, the process continues to step 642, where the process checks if the target is a menu item or menu heading (or a menu 510, in which preferably no internal ranges are assigned). If so, step 650 is implemented as described above, except that no external ranges are preferably assigned to menu items. In other embodiments, the process can test for other types of graphical objects to which the programmer wishes to assign ranges. If none of the steps 634, 636, 638, 640, or 642 are true, then control passes to step 643, in which the external and internal force ranges of the target are set to zero. Alternatively, the process can check for a particular graphical object to which predetermined or desired force ranges are assigned. This special object can be designated as such by the programmer or user. If such a special object is provided, then the process can continue to step 652.

After force ranges are assigned to the selected target in any of steps 644, 646, 648, or 650, step 652 determines whether the selected target is special. If not, step 656 assigns force magnitudes and/or force models or reflex processes to the external and internal forces for the particular target according the target's type. For example, an icon may be assigned standard, predetermined force magnitudes or force models for its external attractive force and for its internal dead and capture forces. Alternatively, the object can be assigned a "mass" which will influence the magnitudes of the assigned forces. If the target is special, step 654 assigns any special magnitude (or mass) to the target according to any particular instructions or values provided by a programmer or user. This allows individual targets to be assigned desired force magnitudes. After either step 654 or 656, method 616 ends at step 658.

The assigned force ranges, magnitudes and models can also be stored in memory 27 as a "parameter page" by microprocessor 26 or host computer 12. For example, each parameter page might assign different types or ranges of forces to the graphical objects. These parameters pages can be loaded quickly to provide different force environments, or may allow host computer 12 to build another force environment by sending host commands while the processor 26 implements a different force environment. Parameter pages are described in greater detail with respect to U.S. Pat. No. 5,734,373, entitled "Method and Apparatus for Controlling Force Feedback Interface Systems Utilizing a Host Computer," filed Dec. 1, 1995 on behalf of Rosenberg et al.

Figure 25:
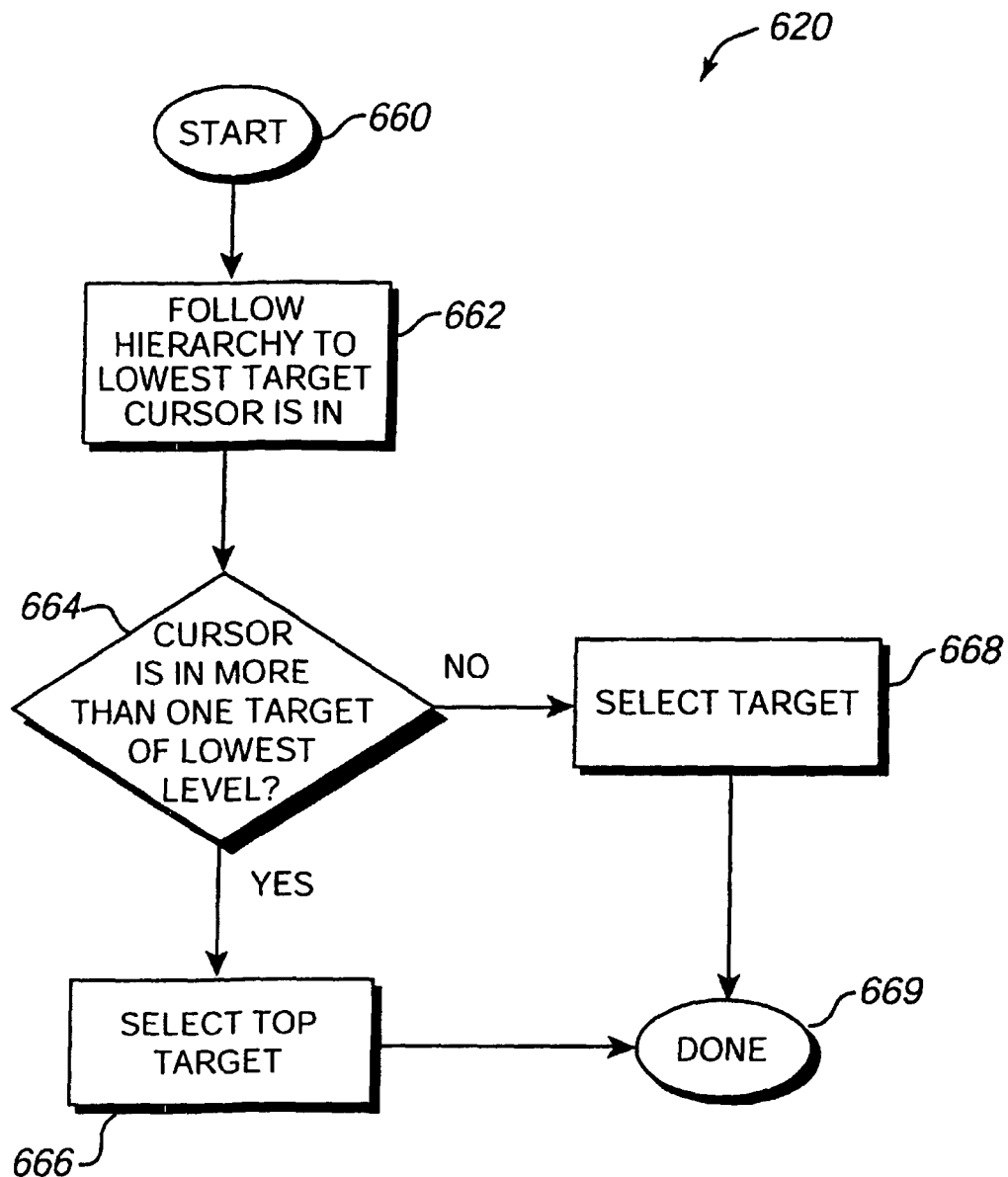
FIG. 25 is a flow diagram illustrating a step of FIG. 23 for determining the target of lowest hierarchy in which the cursor is positioned.

FIG. 25 is a flow diagram illustrating step 620 of FIG. 23, in which the target of lowest hierarchy is determined in which the cursor resides. The process begins at 660. By well-known binary tree or set theoretic hierarchy methods, step 662 determines whether the cursor 506 is positioned within the perimeter of a target and whether that target includes other children targets which the cursor is also within. For example, referring to FIG. 19, process 620 may determine that the cursor 506 is within window 501, but is also within window 518 of window 501, and that the cursor is additionally within an icon 519 of window 518. The target of lowest hierarchy of which the cursor was positioned would thus be the icon 519.

Step 664 essentially determines whether the cursor 506 is in a region where two targets of the same hierarchical level overlap. This can occur if, for example, two icons or windows of the same (lowest) hierarchical level happen to be displayed on the same portion of the screen. Process 620 queries whether the cursor 506 is in more than one of the lowest level targets. If the cursor 506 is in an overlap region, then step 666 selects the "top" target whose object is displayed on screen 20. The "bottom" target will be partially or totally hidden by the top target. If there is no overlap in step 664, then step 668 selects the lowest level target normally. The process is complete at 669 after step 666 or 668.

Figure 26:
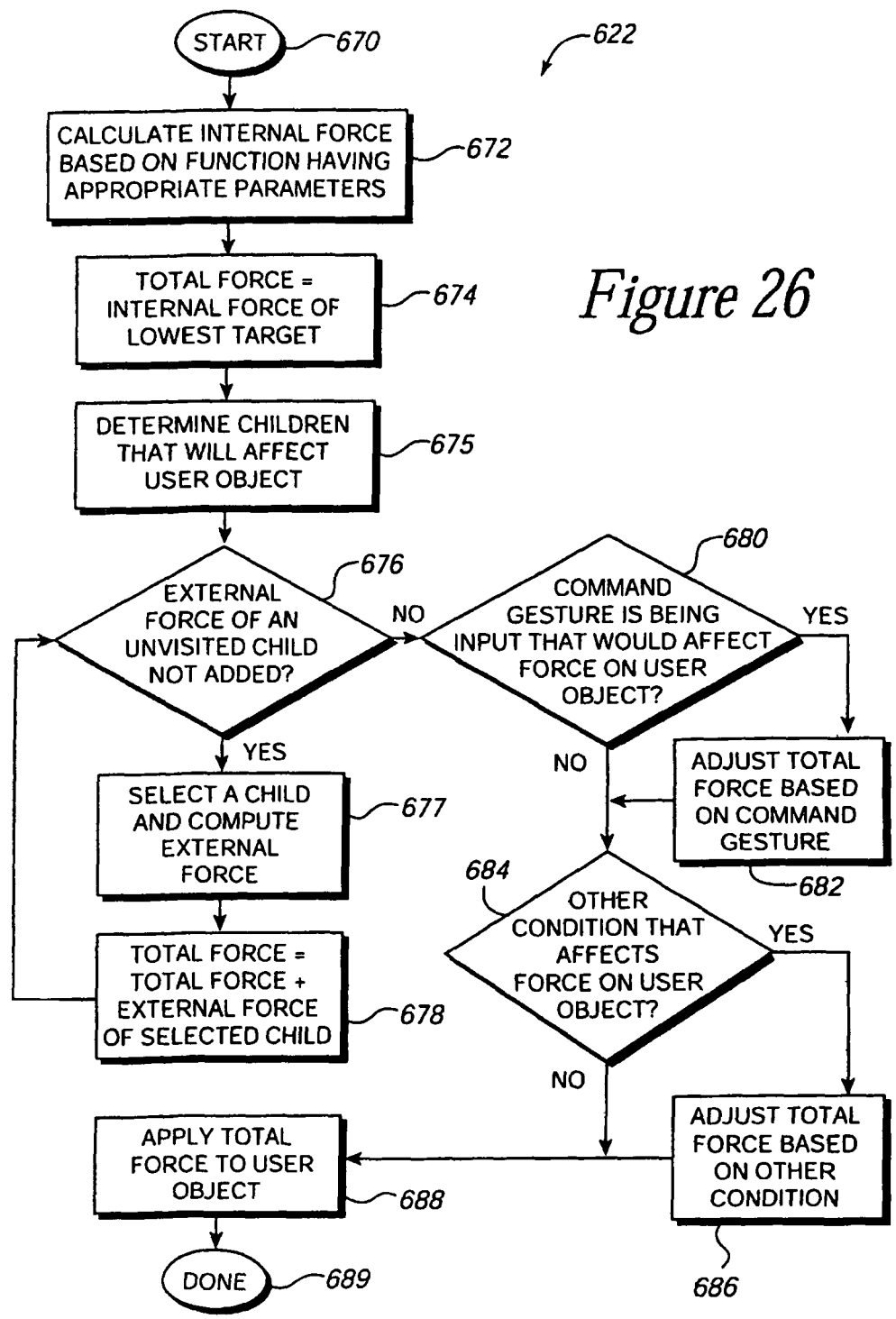
FIG. 26 is a flow diagram illustrating a step of FIG. 23 for applying appropriate forces to the user object based on targets in the GUI.

FIG. 26 is a flow diagram illustrating step 622 of FIG. 23, in which an appropriate force is applied to the user object 34 based on the cursor's position and the target in which the cursor is located. The process begins at 670. Having determined the target of lowest hierarchical level in which the cursor is positioned in step 620, step 672 calculates an internal force for that target containing the cursor 506 (the "lowest target"). The internal force is calculated using a force model or function, such as a reflex process, given appropriate parameters such as magnitude, duration, coefficients, sensor data, and timing data. Force models, reflex processes, and parameters were discussed above at length with respect to FIGS. 4-5 and 9-17. The internal force might be calculated in accordance with the dead region 576 if the cursor is positioned there; or, the internal force might be calculated according to a capture force if the cursor is positioned in capture region 574 or has just passed through the capture region.

In step 674, a total force value is initialized to the internal force of the lowest target that was calculated in step 672. Thus, only the internal force of the lowest hierarchical target in which the cursor is positioned is included in the total force that is to be applied to the user object. The internal forces of any higher level targets are preferably not included in the total force. As an example, consider a cursor 506 inside a window containing only icons. If the cursor 506 is not in an icon's target, the window itself is the lowest hierarchy target in which the cursor 506 resides. Only the internal target force for the window is calculated. If the cursor is moved into an icon, only the internal force from that icon is included in the total force; the internal force of the window is ignored.

Step 675 determines the children targets of the lowest target whose forces will affect the user object. These "external" children are included in the lowest target which the cursor is positioned in, but which are external to the cursor, i.e., the cursor is not positioned in any of the external children. Thus, the external forces of the external children will affect cursor 506 and user object 34. Any targets included in the external children are preferably not added as a force. If the cursor is in the "desktop" or background target of GUI 500, then the external children are the next highest level targets on the screen. For example, the windows 501, 530 and 540 would be external children when cursor 506 is positioned on the desktop as shown in FIG. 19. In alternate embodiments, the external children might also include additional lower level targets within other external children.

In step 676, the process determines whether any external forces of the external children have not been combined into the total force. If so, step 677 selects a previously unvisited external child and computes the external force for the child. The external force from this child is only computed if cursor 506 is within the external range of the child; if the cursor is outside the external range, the external force is set at zero. This saves processing time if the cursor is not in the external range. Alternatively, if a particular force is assigned to regions outside the external range, that force is computed. The external force is computed according to the particular force model assigned to the external force, such as the attractive force field model described in the examples above.

Step 678 computes the total force by adding the external force from the child of step 677 to the total force to be applied to the user object 34. It should be noted that the directions and magnitudes of the previous total force and the external force are taken into account when determining the direction and magnitude of the resulting total force. For example, if the previous total force had a magnitude of 5 in a left direction, and the external force had a magnitude of 8 in the right direction, then the sum of step 678 would result in a total force of magnitude 3 in the right direction. The process then returns to step 676 to check for another unvisited external child and add an external force to the total force in steps 677 and 678. Steps 676-678 are repeated until external force contributions from all the external children have been combined into the total force.

After all the external children forces have been added to total force, then, from the negative result of step 676, the process checks if a command gesture has been input by the user which would affect the force applied to the user object. For example, such a situation might occur if the inertia forces described above were implemented. These forces would be applied when the user held down a button or provided similar input and dragged an icon or window. If such input has been received, then the total force is adjusted based on the command gesture and the particular conditions or location of the cursor or other factors (such as the velocity of the cursor, mass of the dragged icon, simulated gravity, etc.) The "adjustment" to the total force may be an addition or subtraction to the magnitude of the total force and/or a change in direction, depending on how strong and in what direction the inertia force is applied.

In next step 684, or after a negative result of step 680, the process checks of another condition affects the force on the user object is in effect. Such a condition, for example, might be when cursor 506 collides with a "solid" graphical object of GUI 500 as discussed above, if such a feature is being implemented. The forces from such a collision would affect the total force output by actuators 30 on user object 34. If such a condition exists, then the total force is adjusted appropriately in step 686. After step 686, or after a negative result of step 684, the total force is applied to the user object 34 in step 688 using actuators 30 as explained previously. The process is then complete at 689. In alternative embodiments, steps 680-686 can be performed at other stages in process 622, such as before step 672.

Figure 27:
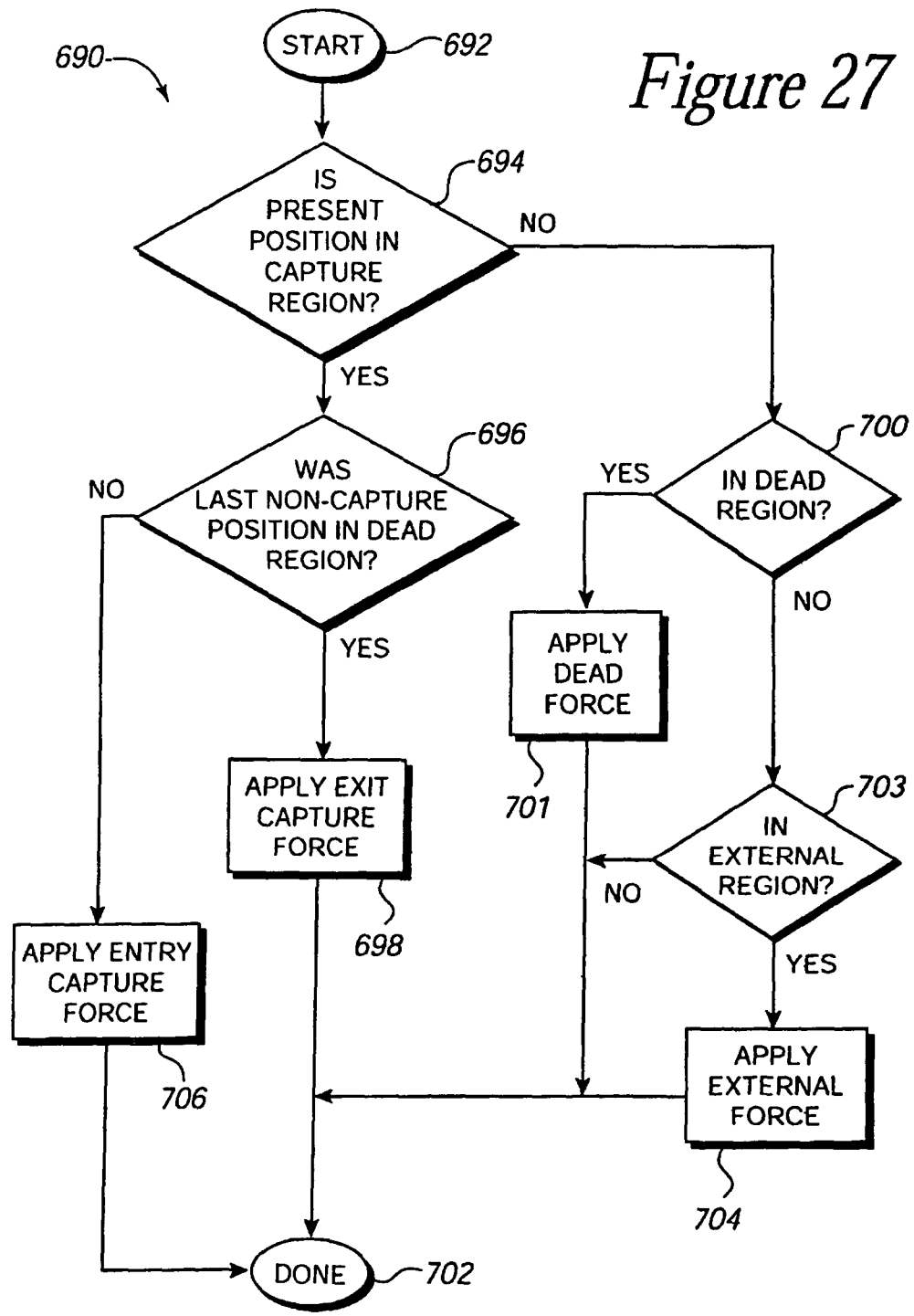
FIG. 27 is a flow diagram illustrating a method for applying external and internal forces for a target based on the position of the cursor.

FIG. 27 is a flow diagram illustrating an example method 690 for applying internal or external forces to user object 34 from a single target, where cursor 506 is positioned near the target's boundary. To simplify the discussion, process 690 assumes that only one target is displayed on screen 20, and thus does not take into account forces from other targets that may influence the force applied to the user object depending on the cursor's position. The steps of adding forces from multiple targets is described above with reference to FIG. 26. Also, other necessary steps as described above, such as updating the cursor position, are omitted from process 690 for expediency.

Process 690 begins at step 692, and in step 694 determines whether cursor 506 is in a particular target's capture zone. If so, an optional step 696 determines whether the host computer 16 and/or local microprocessor 26 last detected the cursor 506 in the target dead zone. If this was the case, then the cursor 506 is moving from the dead zone to the external zone. Thus, step 698 is applied, where the exiting capture force is applied according to the appropriate reflex process. For example, the exiting capture force in the preferred embodiment is a barrier such as a spring force to prevent the cursor 506 from easily escaping the perimeter the target. The process is then complete at 702. It should be noted that in the preferred embodiment, the exit and entry capture forces are the same (a barrier force), so that step 694 is not necessary in such an embodiment, and steps 698 and 706 are the same step. Steps 694, 698, and 706 as shown are needed if the entry and exit capture forces are different.

If the last non-capture position of the cursor was not in the dead region, then the cursor is most likely being moved from the external region of the target to the dead region of the target. If this is the case, step 706 applies the entry capture force to the user object 34 as described above with reference to FIG. 20b. For example, in an alternate embodiment, the entry capture force can be an attractive force that pulls the cursor 506 and user object 34 toward the center of the target. The process is then complete at 702.

If, in step 694, the present position of the cursor is not in the capture region, then the process checks if the cursor is in the dead region of the target in step 700. If so, then the internal dead region force assigned to the dead region is applied in step 701. In the preferred embodiment, the dead region force is zero and thus step 701 is omitted; however, in other embodiments, a dead region force can be calculated based on a reflex process such as a damping or texture force. The process is then complete at 702. If the cursor is not in the dead region in step 700, then the process checks if the cursor is in the external region, as defined by the external range of the target, in step 703. If so, step 704 applies the external force of the target to the user object. If the cursor is positioned outside the external range, then the process is complete at 702. Alternatively, if a force is assigned to the target's region outside the external range, then that force can be applied to the user object.

The force feedback sensations of the present invention are advantageously provided in a GUI 500. These forces can both assist a user in selecting and performing operating system functions, and can inform the user of the various graphical objects displayed by the GUI. In particular, those users who suffer from spastic hand motion and other dexterity-debilitating conditions are greatly advantaged by the addition of these force feedback sensations in a GUI environment. Formerly difficult tasks such as maneuvering a cursor onto an icon become much easier using the force feedback of the present invention by implementing attractive forces, damping forces, and other forces that assist a user in hand-eye coordination.

While this invention has been described in terms of several preferred embodiments, it is contemplated that alterations, modifications and permutations thereof will become apparent to those skilled in the art upon a reading of the specification and study of the drawings. For example, many different types of forces can be applied to the user object 34 in accordance with different graphical objects or regions appearing on the computer's display screen. Also, many varieties of graphical objects in a GUI can be associated with particular forces to assist the user in selecting the objects or to notify the user that the cursor has moved into a particular region or object. In addition, many types of user objects can be provided to transmit the forces to the user, such as a joystick, a mouse, a trackball, a stylus, or other objects. Furthermore, certain terminology has been used for the purposes of descriptive clarity, and not to limit the present invention. It is therefore intended that the following appended claims include all such alterations, modifications and permutations as fall within the true spirit and scope of the present invention.

What is claimed is:

1. A method for providing a user of a manipulandum with haptic feedback simulating an interaction of a simulated object with a simulated compliant paddle whose movement is controlled by movement of the manipulandum, the method comprising:
determining a first haptic force during a first stage of the interaction, the first haptic force based on (i) the interaction, (ii) a simulated mass and stiffness of the simulated compliant paddle, and (iii) a mass of the simulated object, the first stage of the interaction beginning with a collision of the simulated object with the simulated compliant paddle and continuing to a maximum flexibility point of the simulated compliant paddle;
determining a second haptic force during a second stage of the interaction, the second haptic force based on (i) the interaction, (ii) a simulated mass and stiffness of the simulated compliant paddle, and (iii) the mass of the simulated object, the second stage of the interaction corresponding to a rebounding of the simulated compliant paddle and a release of the simulated object from the simulated compliant paddle, the second stage of the interaction beginning in response to the simulated compliant paddle reaching the maximum flexibility point;
actuating one or more actuators that are coupled to the manipulandum to impart the first haptic force to the manipulandum during the first stage of the interaction; and
actuating at least one of the one or more actuators to impart the second haptic force to the manipulandum during the second stage of the interaction.

2. The method of claim 1, further comprising: rendering the simulated compliant paddle and the simulated object on a display.

3. The method of claim 2, wherein said rendering depicts the interaction of the simulated compliant paddle and the simulated object.

4. The method of claim 3, wherein said rendering depicts deformation of the simulated compliant paddle caused by the interaction.

5. A system comprising:
a manipulandum;
at least one actuator coupled to the manipulandum;
a sensor configured to generate sensor signals indicative of a position of the manipulandum; and
a processor configured to:
determine a first haptic force during a first stage of an interaction of a simulated object with a simulated compliant paddle controlled by the position of the manipulandum, the first haptic force based on (i) the interaction, (ii) a simulated mass and stiffness of the simulated compliant paddle, and (iii) a mass of the simulated object, the first stage of the interaction beginning with a collision of the simulated object with the simulated compliant paddle and continuing to a maximum flexibility point of the simulated compliant paddle;
determine a second haptic force during a second stage of the interaction, the second haptic force based on (i) the interaction, (ii) a simulated mass and stiffness of the simulated compliant paddle, and (iii) the mass of the simulated object, the second stage of the interaction corresponding to a rebounding of the simulated compliant paddle and a release of the simulated object from the simulated compliant paddle, the second stage of the interaction beginning in response to the simulated compliant paddle reaching the maximum flexibility point;
actuate the at least one actuator based on the sensor signals and on the interaction of the simulated object and the simulated compliant paddle, said actuation configured to impart to the manipulandum the first and second haptic forces corresponding to the first and second stages of the interaction, respectively.

6. The system of claim 5, wherein the processor is further configured to cause the simulated compliant paddle and the simulated object to be rendered on a display.

7. The system of claim 6, wherein said rendering depicts the interaction of the simulated compliant paddle and the simulated object.

8. The system of claim 7, wherein said rendering depicts deformation of the simulated compliant paddle caused by the interaction.

9. The method of claim 1, wherein the simulated object comprises at least one of a ball or a puck.

10. The system of claim 5, wherein the simulated object comprises at least one of a ball or a puck.

11. A non-transitory computer-readable medium comprising program code for executing a processor-executable method for providing a user of a manipulandum with haptic feedback simulating an interaction of a simulated object with a simulated compliant paddle whose movement is controlled by movement of the manipulandum, the method comprising:
determine a first haptic force during a first stage of the interaction, the first haptic force based on (i) the interaction, (ii) a simulated mass and stiffness of the simulated compliant paddle, and (iii) a mass of the simulated object, the first stage of the interaction beginning with a collision of the simulated object with the simulated compliant paddle and continuing to a maximum flexibility point of the simulated compliant paddle;
determine a second haptic force during a second stage of the interaction, the second haptic force based on (i) the interaction, (ii) a simulated mass and stiffness of the simulated compliant paddle, and (iii) the mass of the simulated object, the second stage of the interaction corresponding to a rebounding of the simulated compliant paddle and a release of the simulated object from the simulated compliant paddle, the second stage of the interaction beginning in response to the simulated compliant paddle reaching the maximum flexibility point;
actuating one or more actuators that are coupled to the manipulandum to impart the first haptic force to the manipulandum during the first stage of the interaction; and actuating at least one of the one or more actuators to impart the second haptic force to the manipulandum during the second stage of the interaction.

12. The non-transitory computer-readable medium of claim 11, further comprising: rendering the simulated compliant paddle and the simulated object on a display.

13. The non-transitory computer-readable medium of claim 12, wherein said rendering depicts the interaction of the simulated compliant paddle and the simulated object.

14. The non-transitory computer-readable medium of claim 13, wherein said rendering depicts deformation of the simulated compliant paddle caused by the interaction.

15. The non-transitory computer-readable medium of claim 11, wherein the simulated object comprises at least one of a ball or a puck.

16. The method of claim 1, wherein the collision includes a simulated compression of the simulated compliant paddle based on the simulated stiffness, and therein the release includes a decompression of the simulated compliant paddle.

17. The system of claim 5, wherein the collision includes a simulated compression of the simulated compliant paddle based on the simulated stiffness, and therein the release includes a decompression of the simulated compliant paddle.

18. The non-transitory computer-readable medium of claim 11, wherein the collision includes a simulated compression of the simulated compliant paddle based on the simulated stiffness, and therein the release includes a decompression of the simulated compliant paddle.

* * * * *